US009990655B2

(12) United States Patent
MacTiernan et al.

(10) Patent No.: US 9,990,655 B2
(45) Date of Patent: Jun. 5, 2018

(54) LIVE MEDIA STREAM INCLUDING PERSONALIZED NOTIFICATIONS

(71) Applicant: iHeartMedia Management Services, Inc., San Antonio, TX (US)

(72) Inventors: Daniel N. MacTiernan, Somers Point, NJ (US); Thomas Drapeau, Harrison, NY (US); Lasse Hamre, New York, NY (US); Pablo Calamera, New York, NY (US); Kevin R. Lockhart, Ogallala, NE (US); Richard D. Wooden, Ogallala, NE (US); Jeffrey D. Zigler, Omaha, NE (US); Jacqueline J. Lockhart, Poway, CA (US)

(73) Assignee: iHeartMedia Management Services, Inc., San Antonio, TX (US)

(*) Notice: Subject to any disclaimer, the term of this patent is extended or adjusted under 35 U.S.C. 154(b) by 111 days.

(21) Appl. No.: 14/521,722

(22) Filed: Oct. 23, 2014

(65) Prior Publication Data
US 2015/0046267 A1 Feb. 12, 2015

Related U.S. Application Data

(63) Continuation-in-part of application No. 14/014,162, filed on Aug. 29, 2013, which is a
(Continued)

(51) Int. Cl.
G06Q 30/02 (2012.01)
G06F 17/30 (2006.01)
(Continued)

(52) U.S. Cl.
CPC ... G06Q 30/0269 (2013.01); G06F 17/30749 (2013.01); G06F 17/30761 (2013.01);
(Continued)

(58) Field of Classification Search
None
See application file for complete search history.

(56) References Cited

U.S. PATENT DOCUMENTS 4,788,675 A 11/1988 Jones et al.
5,283,639 A 2/1994 Esch et al.
(Continued)

OTHER PUBLICATIONS

International Search Authority; International Search Report and Written Opinion; PCT/US08/10002; dated Nov. 18, 2008; 16 pgs.

Primary Examiner — Kevin Bates
Assistant Examiner — Lesa Kennedy
(74) Attorney, Agent, or Firm — Garlick & Markison; Edward J. Marshall

(57) ABSTRACT

A live media broadcast includes core content streamed to multiple users. While all consumers can be presented with the same core content, each individual consumer can be provided with individually customized content from various notification services during commercial breaks. For example, while one consumer can be provided with customized banking updates from her bank account during part of a commercial break, during that same commercial break another user might be provided with social media notifications or reminders from his calendar. Notifications or updates can be received in a text format and converted to an audio or other suitable format at an ad server, and delivered to a media automation system for insertion into a media stream in a way that integrates notifications into the listening or viewing experience without interrupting presentation of the core content.

20 Claims, 31 Drawing Sheets

Related U.S. Application Data continuation-in-part of application No. 12/229,515, filed on Aug. 22, 2008, now Pat. No. 8,719,349.

(60) Provisional application No. 60/957,955, filed on Aug. 24, 2007.

(51) Int. Cl.
| | |
|---|---|
| H04L 12/18 | (2006.01) |
| H04L 29/06 | (2006.01) |
| H04L 12/58 | (2006.01) |
| H04L 29/08 | (2006.01) |

(52) U.S. Cl.
CPC ... *G06F 17/30772* (2013.01); *G06Q 30/0207* (2013.01); *H04L 12/18* (2013.01); *H04L 12/1895* (2013.01); *H04L 51/10* (2013.01); *H04L 51/32* (2013.01); *H04L 65/4076* (2013.01); *H04L 65/601* (2013.01); *H04L 67/306* (2013.01)

(56) References Cited

U.S. PATENT DOCUMENTS

| | | |
|---|---|---|
| 5,616,876 A | 4/1997 | Cluts |
| 5,699,089 A | 12/1997 | Murray |
| 5,819,160 A | 10/1998 | Foladare et al. |
| 5,953,005 A | 9/1999 | Liu |
| 6,026,368 A | 2/2000 | Brown et al. |
| 6,122,658 A | 9/2000 | Chaddha |
| 6,134,431 A | 10/2000 | Matsumoto et al. |
| 6,169,989 B1 | 1/2001 | Eichstaedt et al. |
| 6,177,931 B1 | 1/2001 | Alexander et al. |
| 6,189,008 B1 | 2/2001 | Easty et al. |
| 6,192,340 B1 | 2/2001 | Abecassis |
| 6,198,906 B1 | 3/2001 | Boetje et al. |
| 6,230,205 B1 | 5/2001 | Garrity et al. |
| 6,236,991 B1 | 5/2001 | Frauenhofer et al. |
| 6,243,725 B1 | 6/2001 | Hempleman et al. |
| 6,275,496 B1 | 8/2001 | Burns et al. |
| 6,278,976 B1 | 8/2001 | Kochian |
| 6,300,880 B1 | 10/2001 | Sitnik |
| 6,324,182 B1 | 11/2001 | Burns et al. |
| 6,341,316 B1 | 1/2002 | Kloba et al. |
| 6,345,256 B1 | 2/2002 | Milsted et al. |
| 6,381,651 B1 | 4/2002 | Nishio et al. |
| 6,385,596 B1 | 5/2002 | Wiser et al. |
| 6,389,469 B1 | 5/2002 | Vekslar et al. |
| 6,389,538 B1 | 5/2002 | Gruse et al. |
| 6,421,717 B1 | 7/2002 | Kloba et al. |
| 6,434,621 B1 | 8/2002 | Pezzillo et al. |
| 6,434,747 B1 | 8/2002 | Khoo et al. |
| 6,441,832 B1 | 8/2002 | Tao et al. |
| 6,452,083 B2 | 9/2002 | Pachet et al. |
| 6,486,892 B1 | 11/2002 | Stern |
| 6,490,587 B2 | 12/2002 | Easty et al. |
| 6,496,802 B1 | 12/2002 | van Zoest et al. |
| 6,526,411 B1 | 2/2003 | Ward |
| 6,534,700 B2 | 3/2003 | Cliff |
| 6,553,412 B1 | 4/2003 | Kloba et al. |
| 6,574,660 B1 | 6/2003 | Pashupathy et al. |
| 6,587,127 B1 | 7/2003 | Leeke et al. |
| 6,605,121 B1 | 8/2003 | Roderick |
| 6,609,105 B2 | 8/2003 | Van Zoest et al. |
| 6,657,116 B1 | 12/2003 | Gunnerson |
| 6,662,231 B1 | 12/2003 | Drosset et al. |
| 6,671,715 B1 | 12/2003 | Langseth et al. |
| 6,674,994 B1 | 1/2004 | Fell et al. |
| 6,686,531 B1 | 2/2004 | Pennock et al. |
| 6,701,315 B1 | 3/2004 | Austin |
| 6,704,576 B1 | 3/2004 | Brachman et al. |
| 6,721,955 B2 | 4/2004 | Khoo et al. |
| 6,728,729 B1 | 4/2004 | Jawa et al. |
| 6,735,628 B2 | 5/2004 | Eyal et al. |
| 6,738,635 B1 | 5/2004 | Lewis et al. |
| 6,745,237 B1 | 6/2004 | Garrity et al. |
| 6,757,691 B1 | 6/2004 | Welsh et al. |
| 6,760,429 B1 | 7/2004 | Hung et al. |
| 6,760,916 B2 | 7/2004 | Holtz et al. |
| 6,763,345 B1 | 7/2004 | Hempleman et al. |
| 6,791,904 B1 | 9/2004 | Herron et al. |
| 6,792,469 B1 | 9/2004 | Callahan et al. |
| 6,807,542 B2 | 10/2004 | Bantz et al. |
| 6,832,373 B2 | 12/2004 | O'Neill |
| 6,839,680 B1 | 1/2005 | Liu et al. |
| 6,839,744 B1 | 1/2005 | Kloba et al. |
| 6,859,838 B1 | 2/2005 | Puranik et al. |
| 6,865,600 B1 | 3/2005 | Brydon et al. |
| 6,868,403 B1 | 3/2005 | Wiser et al. |
| 6,868,440 B1 | 3/2005 | Gupta et al. |
| 6,876,901 B2 | 4/2005 | Dilorenzo |
| 6,895,406 B2 | 5/2005 | Fables et al. |
| 6,910,064 B1 | 6/2005 | Astarabadi et al. |
| 6,910,220 B2 | 6/2005 | Hickey et al. |
| 6,912,517 B2 | 6/2005 | Agnihotri et al. |
| 6,922,779 B1 | 7/2005 | Lapstun et al. |
| 6,925,489 B1 | 8/2005 | Curtin |
| 6,925,495 B2 | 8/2005 | Hegde et al. |
| 6,931,399 B2 | 8/2005 | Cheng et al. |
| 6,933,433 B1 | 8/2005 | Porteus et al. |
| 6,934,697 B1 | 8/2005 | Warren |
| 6,938,209 B2 | 8/2005 | Ogawa et al. |
| 6,944,585 B1 | 9/2005 | Pawson |
| 6,947,705 B2 | 9/2005 | Tsuchiuchi |
| 6,950,804 B2 | 9/2005 | Strietzel |
| 6,954,763 B2 | 10/2005 | Nunome et al. |
| 6,957,041 B2 | 10/2005 | Christensen et al. |
| 6,959,288 B1 | 10/2005 | Medina et al. |
| 6,961,758 B2 | 11/2005 | Krishnan |
| 6,963,898 B2 | 11/2005 | Yoshimine et al. |
| 6,964,061 B2 | 11/2005 | Cragun et al. |
| 6,965,770 B2 | 11/2005 | Walsh et al. |
| 6,970,915 B1 | 11/2005 | Partovi et al. |
| 6,976,028 B2 | 12/2005 | Fenton et al. |
| 6,983,371 B1 | 1/2006 | Hurtado et al. |
| 6,990,497 B2 | 1/2006 | O'Rourke et al. |
| 6,993,290 B1 | 1/2006 | Gebis et al. |
| 6,993,536 B2 | 1/2006 | Yamanaka |
| 6,993,570 B1 | 1/2006 | Irani |
| 6,996,390 B2 | 2/2006 | Herley et al. |
| 7,013,290 B2 | 3/2006 | Ananian |
| 7,017,120 B2 | 3/2006 | Shnier |
| 7,020,637 B2 | 3/2006 | Bratton |
| 7,020,704 B1 | 3/2006 | Lipscomb et al. |
| 7,028,082 B1 | 4/2006 | Rosenberg et al. |
| 7,028,252 B1 | 4/2006 | Baru et al. |
| 7,039,594 B1 | 5/2006 | Gersting |
| 7,058,694 B1 | 6/2006 | De Bonet et al. |
| 7,519,916 B1 | 4/2009 | Hartwell et al. |
| 7,711,838 B1 | 5/2010 | Boulter et al. |
| 2003/0018966 A1* | 1/2003 | Cook ............... H04N 7/165 725/2 |
| 2003/0061615 A1 | 3/2003 | Van Der Meulen |
| 2004/0039796 A1* | 2/2004 | Watkins ............... H04H 60/07 709/218 |
| 2004/0162878 A1 | 8/2004 | Lewis et al. |
| 2004/0215736 A1* | 10/2004 | Kortan ............... H04L 12/587 709/207 |
| 2005/0197961 A1 | 9/2005 | Miller et al. |
| 2006/0003753 A1 | 1/2006 | Baxter, Jr. |
| 2006/0161635 A1 | 7/2006 | Lamkin et al. |
| 2006/0253542 A1 | 11/2006 | McCausland et al. |
| 2007/0033531 A1 | 2/2007 | Marsh |
| 2008/0052741 A1* | 2/2008 | Dharmaji ............... G06F 15/02 725/32 |
| 2008/0140717 A1 | 6/2008 | Rosenberg et al. |
| 2008/0147711 A1 | 6/2008 | Spiegelman et al. |
| 2009/0104870 A1 | 4/2009 | Christensen et al. |
| 2012/0079385 A1 | 3/2012 | Ellis et al. |
| 2012/0209979 A1 | 8/2012 | Zabawskyj et al. |

\* cited by examiner

RadioMyWay - My Preferences http://www.radiomyway.cc

File Edit View Favorites Tools Help

Simple, Easy and Fun!

RadioMyWay

Welcome back, [user name]
Customer ID 139

New Features | Logout

Home | My Preferences | My Themes | My Devices | My Account | FAQ's

| RSS Feeds | Commercials |

My Commercial Preferences

You can select one or more commercial category preferences. If you select less than the minimum (3), we will randomly select additional commercials for you.

| Select/Deselect | Commercial Category | Category Description |
|---|---|---|
| ☐ | Automotive | Automotive Manufacturers, Automotive Dealers, Automotive Services |
| ☐ | Entertainment | TV, Movies, and Night Club |
| ☐ | Financial | Finance/Mortgages, Banks, Credit, Loans |
| ☐ | Food Beverage | Food/Beverage Retailers |
| ☐ | Insurance | Life, Home, Auto |
| ☐ | Pharmaceuticals | Medications, Nutritional, Sky Ridge Medical and Health/Beauty |
| ☐ | Real Estate | Residential Real Estate, Commercial Real Estate, Home Builders |
| ☐ | Restaurants | Restaurants, Nightclubs |
| ☐ | Retail | Retail Stores |

Save

System Requirements

© 2007-2008 Clear Channel Management Services, L.P.

LIVE MEDIA STREAM INCLUDING PERSONALIZED NOTIFICATIONS

CROSS REFERENCE TO RELATED APPLICATIONS

The present U.S. Utility Patent Application claims priority pursuant to 35 U.S.C. § 120 as a continuation-in-part of U.S. Utility application Ser. No. 14/014,162, entitled "Content Add-In for Media Service", filed Aug. 29, 2013, which is a continuation-in-part of U.S. Utility application Ser. No. 12/229,515, entitled "System and Method for Providing a Radio-Like Experience", filed Aug. 22, 2008, issued as U.S. Pat. No. 8,719,349 on May 6, 2014, which claims priority pursuant to 35 U.S.C. § 119(e) to U.S. Provisional Application No. 60/957,955, entitled "System and Method for Providing a Radio-Like Experience", filed on Aug. 24, 2007, all of which are hereby incorporated herein by reference in their entirety and made part of the present U.S. Utility Patent Application for all purposes.

COPYRIGHT NOTICE

This application contains material that is subject to copyright protection. Such material may be reproduced by any person exactly as it appears in the Patent and Trademark Office patent files or records. The copyright owner otherwise reserves all rights to such material.

FIELD

The systems and methods disclosed herein generally relate to the field of media streaming, and more particularly to the inclusion of personalized content in a live media stream.

BACKGROUND

Consumers currently have access to personalized radio stations generated based on consumer-stated preferences. Consumers also have access to various social networking and calendar-like services that provide alerts, alarms, updates, and notifications. Generally, however, the updates, notifications, and the like are generally presented in a form that interrupts what user is currently doing.

For example, if a user is listening to a streaming radio station on his computer or smart phone, a social networking site may display a pop-up window that displays information about am acquaintance arriving at a local coffee shop. In some instances, for example if a Bank sends a notification that a payment is due, that notification may take the form of a text or email message. Similarly, calendar programs or travel sites can send text messages, emails, or trigger audible alerts and display pop-up windows a specified number of days before a user's scheduled trip.

In many of these cases, however, whatever the user is currently doing is interrupted to present the information to the user. Clearly, currently available notification techniques are less than perfect.

BRIEF DESCRIPTION OF THE DRAWINGS

FIG. 3 depicts an embodiment of a screen that may be provided for a user to register for access to a content distribution system.

FIG. 4 depicts an embodiment of a screen that may be provided for a user to initiate customizing a radio-like station.

FIG. 6 depicts an embodiment of a screen that may be provided for a user to customize perishable content scheduling for a radio-like station.

FIG. 7A depicts an embodiment of a screen that may be provided for a user to customize perishable content scheduling for a radio-like station.

FIG. 7B depicts an embodiment of a portion of a screen that may be provided for a user to customize perishable content scheduling for a radio-like station.

FIG. 8 depicts an embodiment of a screen that may be provided for a user to manage a plurality of customized radio-like stations.

FIG. 10 depicts an embodiment of a screen that may be provided for a user to specify commercial listening preferences.

FIG. 12 depicts an embodiment of a screen that may be provided for a user to obtain a content player and specify devices for content player use.

DETAILED DESCRIPTION

Figure 1:
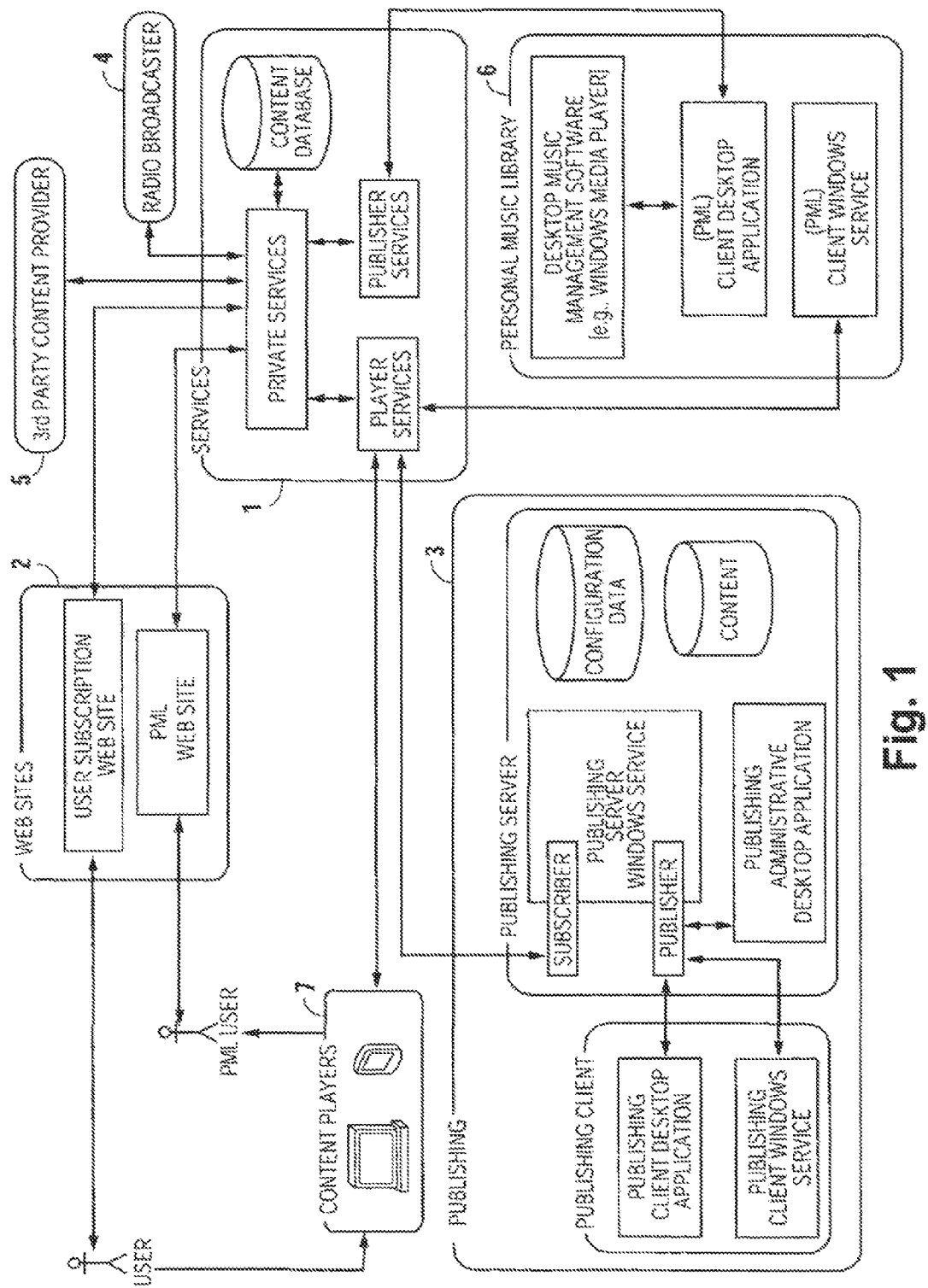
FIG. 1 depicts an embodiment of a functional diagram of various content distribution system components.

Generally, the disclosed systems and methods provide a way to engage content consumers with a more personalized, and more radio-like and professional-sounding listening experience.

From a content consumer's point of view, a media content management system and media player allow a user to choose to listen to content from various content sources, e.g., the user's personal music library, a subscription-based third party music library, a radio broadcaster's perishable content or other programming, a library of user-generated content, and third-party advertisement repository, other third-party sources, etc. Thus, for example, a listener may create a listening experience that includes approximately 50% jazz and 50% rock music from a jazz radio station and a jazz music repository, respectively, and includes local news updates from a radio station in Atlanta, Ga., sports updates from a radio station in New York, N.Y., and weather and traffic reports from a radio station in the listener's home town. A listener may consume that content using a variety of devices, e.g., a PC, a portable media player, a PDA, a mobile phone, etc.

In various embodiments, the listener can register with a media delivery service, or platform, set location source preferences once for perishable content such as traffic, weather, and news, and receive local traffic, weather, and news across all of the listener's devices, and across all of the custom media stations delivered by the media delivery service. The listener can specify to the media delivery platform or service that he prefers to receive a custom media stream that includes perishable content from a single, static location, for example news, weather, and traffic from his hometown regardless of his current location, or to receive perishable content that is local to his current or roaming location. Thus, a traveler based out of Denver can choose to receive news, traffic, and weather from the Denver metropolitan area regardless of whether the traveler is currently in New York, Denver, or San Jose.

If, however, a business traveler is interested in receiving news, weather, and traffic from wherever he happens to be at the time, she can specify to the media delivery system that any media streams delivered to her should include news, traffic, and weather based on her current location. Thus, if the traveler is in Denver, she can receive a customized media station with news, traffic and weather, local to the Denver area, but when travelling to San Antonio, she can receive a customized media channel with all the same content, except that the news, traffic and weather will be local to San Antonio.

Not only can a single location source preference apply globally across multiple media channels, but the same preference can apply globally across multiple or all devices registered to or associated with the listener. For example, setting the location source preference once can result in a particular customized radio station or other media stream being provided the same perishable content, regardless of the type of device used by the listener to receive the custom media stream. For example, if a listener informs the system that he prefers a "follow me" or "roaming" setting, the location of a device used by the listener can be used to identify a current location, and perishable content associated with the user's current location can be inserted in the custom media stream. This could mean, for example that if a "news" add-in block is scheduled to play once per hour, and the user is driving from Austin to San Antonio, the first hour's add-in block could include news from Austin, while the next hour's add-in block would include news from San Antonio, even though the user has not changed the station.

From the point of view of a content provider, a content distribution system or media delivery platform, which may be implemented as a cloud based service in a computing device, may link together various content sources, such as those described above, and use content from one or more of those various sources to create pleasing listening experiences customized for listeners. A content provider may, for example, be a radio broadcaster or other organization having expertise in scheduling content to engage and hold a listener's interest. A radio broadcaster may, for example, rely on a media automation system configured to execute professional radio broadcast scheduling software to create such an experience with content from disparate sources, and may offer such content at various subscription levels, e.g., a free subscription level that includes a certain number of advertisements per hour, and a fee-based subscription level that includes no advertisement and allows inclusion of user-generated content. The content provider may, for example, schedule a playlist with music from a third-party music library, advertisements from an ad repository, weather reports from a radio station in the listener's home town, commentary from a nationally-syndicated radio host, and music mashups from the listener's personal content library. Thus, in one embodiment, a content provider may provide a radio-like listening experience customized for a particular listener.

In some embodiments, add-in blocks associated with local perishable media items can be inserted into a custom radio station or media stream created or customized according to the teaching set forth herein, or by some other means. These add in blocks can be inserted into one or more types of custom media streams, according to user preferences. Generally, though not in all embodiments, user preferences related to add-in blocks are globally applicable across all custom media streams of a particular type, and across all user devices, subject to device capabilities, privacy settings, and the like. For example, a user can specify that whenever she is being provided with a custom radio station dedicated primarily to songs, that custom radio station will include add-in blocks that contain perishable content associated with a particular, static locale or with a current location of the user. A different setting can be specified for custom radio stations dedicated primarily to talk shows. In various embodiments, the different types of custom radio stations can also include visual media of a particular genre, audio media of a particular genre (e.g. talk, music, country, classical, hip-hop, or the like). In at least one embodiment, however, it is desirable to limit the number of types of custom radio stations to two types (e.g. talk and music) to simplify user decision making and implementation.

In some embodiments, multiple different users listening to a single live broadcast on different streams can each be provided with individually customized content during commercial breaks or other portions of the broadcast that would not interrupt the core content of the broadcast. Thus, in some embodiments, all of the consumers listening to a live broadcast can hear the same core content, but each could hear individually customized content during spot block, such as commercial breaks. In various implementations, the customized content can be converted text notifications or messages from various social networking sites, calendar-type services, or the like. For example, some companies offer notification services linked to search engine metrics, calendar entries, user preferences, purchases, or the like. Notifications from these companies can be converted to audio and inserted into an audio stream to which a consumer is currently listening. When the audio stream reaches a natural break in core content, for example a commercial break, the converted notifications can be presented to the consumer, thereby presenting an integrated user experience in which personal notifications appear to be presented as part of the live broadcast.

Integrating user notifications into the radio listening experience can also help prevent unwanted interruptions from notification services. For example, a consumer may have set preferences in his calendar application for notifications to be delivered one day before an event is set to occur. In general, the consumer may not be interested in receiving such a notification at the exact instant that is 24 hours prior to the event. In such a case, the consumer can be notified during a commercial break close to 24 hours prior to the event as part of listening to his favorite live radio stations.

As used herein, the term "live media broadcast" and similar terms refer to the current occurrence of the broadcast itself, and do not necessarily require the content of the broadcast to be currently occurring. Thus, both a current broadcast of a currently occurring event, such as the SUPER BOWL, and a currently airing broadcast of a previously recorded syndicated radio talk show, are considered to be live media broadcasts. Likewise, an automated country-western music station using only pre-recorded content is also considered to be a live media broadcast during the time it is airing. In some embodiments, a broadcast can be considered to be a live broadcast even if the current broadcast is not the first time the content was broadcast.

The term, "core content" is used herein to refer to the primary, or main, content of a show, program, or broadcast. Core content is, in some embodiments, the content broadcast to substantially all recipients of the broadcast, and generally does not include content broadcast during spot blocks, or other content that may be replaced by local stations or individuals. Thus, the core content of a music radio station can be considered to be the music itself, as well as some or all of the content generated by talent, hosts, disk-jockeys, and the like. Note that in some embodiments, the talk portion of a show may be considered to be non-core—particularly where the talent is less well known or less important to the listening audience. However, in some cases the talent's primary banter may be considered to be core content, while short introductions might be considered to be non-core content. The core content of a talk show is the talk show itself, the core content of a sports broadcast can be considered to be the commentary and content between spot blocks.

The foregoing general description is merely exemplary, and should be viewed as a partial overview of the features and functionality of the systems and methods disclosed herein. Additional details, features and functionalities will become apparent below. Nevertheless, the foregoing description serves as a useful starting point in describing various preferred systems, graphical user interfaces, content sources, distribution methods and other aspects.

Functional Overview

In one embodiment, a content distribution system may comprise a suite of components that may provide a customized and radio-like listening experience to listeners, including providing listeners with the option of inserting add-in blocks into a media stream according to user location source preferences. In one embodiment, the suite may comprise (1) a services component, (2) a subscription-based content component, (3) a personal media library component, (4) a content player component and (5) a publishing component. One or more of the elements in the suite can be implemented by programming a computing device to perform the necessary functions. Functional segmentation of the content distribution system may be used to facilitate design, development, deployment, and reuse of system functionality. That is, the content distribution may be designed around a set of services or platforms that are assembled to interoperate as various applications. Some of the services or platforms can be implemented in a server machine connected to a wide area network (WAN) such as the Internet, using cloud-based techniques, including programming various machines to perform tasks in a distributed manner. An exemplary functional overview of each component is provided below.

A services component may provide a centralized location for accessing common content distribution system business logic and data storage functionality that is needed by all content distribution system components. These services may be grouped into seven functional areas: Content Services, Customer Services, Logging Services, Content Player Services, Personal Publishing Services, Scheduling Services, and Data Services. Content Services may provide the business logic storage related to content files and content categorization for both music (and other content) and perishable content sources and categorization criteria. Customer Services may provide the business logic related to registered users, their accounts and historical listening data. Logging Services may provide the business logic storage related to internal logging needed for system monitoring and configuration. Content Player Services may provide the business logic needed to properly synchronize content players with the listening experiences configured by users. All user access to content distribution system services from external sources may be directed through Player Services. Personal Publishing Services may provide an interface for communication with the publishing component. Scheduling Services may provide the business logic related to radio station schedules. Data Services may provide for the retrieval and persistence of data related to the content distribution systems. An add-in service can be a part of one or more other services, or provide a stand-alone service that can be called or accessed by various computing systems or other services as needed. In at least one embodiment an add-in service is implemented as a cloud based service. The services component is discussed in more detail below.

A subscription-based content component may provide an end user system that delivers a radio-like experience utilizing a subscription based content model that may include content from third-party content providers. Users may create and maintain their accounts through a browser-based GUI or website provided by the content distribution system. The website may allow users to configure various radio-like "stations" by selecting the music, other content and perishable content to create a particular listening experience. When registering for an account, a user may subscribe to a free or fee-based account. A free subscription may allow a user to participate but may require a user to periodically listen to commercials. A fee-based subscription, on the other hand, may provide a user with the option of excluding commercials. Content delivery may be configured administratively by the content distribution system operator. For example, a content distribution system operator may be a radio broadcaster that operates one or more radio broadcasting stations.

In one embodiment, music, perishable content such as news, weather, traffic, and other content may be provided by a third party music or content provider, and may be downloaded or streamed directly from the third party source. Commercial content may be provided by a third party, or by the operator of the content distribution system. Users may select a category (or categories) of commercials or perishable content that they would prefer to hear. If a user does not select any commercial preferences, the commercials they hear may be randomly selected from all available categories. Commercials may comprise audibly-manifested media elements, visibly-manifested media elements, or a combination of the two. Thus, for example, a listener may view a commercial on a PC-instantiated media player while also listening to that commercial. Or, a listener may view a commercial (e.g., a scrolling banner ad, a music album cover with "Buy Now" flashing over it, or a video clip) on a media player while listening to music.

Perishable content may be provided by the content distribution system operator, or by a third party. In at least one embodiment, perishable content is created in an individual market, sometimes referred to herein as a locale associated with the perishable content. If, for example, the third party is a radio broadcaster, perishable content categorization information may be maintained within Content Services, but the content itself may be created and maintained by the radio broadcaster (e.g., at its participating radio stations). Users may define perishable content themes that describe the type of perishable content and the frequency it should be injected into radio-like "station." In at least one embodiment, perishable content to be included in add-in blocks, or the add-in blocks themselves, are obtained from a distribution management company or other provider that is local to a source location associated with the perishable content. For example, a local Dallas television station may be the source of perishable content when "Dallas" is specified as a source locale/location. In at least some embodiments, a media automation system, for example as NexGen®, assigns number ranges to various perishable content based on the locale associated with the perishable content, and delivers the local perishable content to a media delivery platform, for example iHeart® Radio or some other cloud based platform. In the currently discussed embodiment, the perishable content is formed into blocks of perishable content by the media distribution signal, and the media delivery platform generates add-in blocks to be inserted into a custom media stream or radio station based on user source location preferences, and subject to the limitations of user receiving devices.

When a user creates new station preferences or edits their station or perishable content add-in block preferences, Scheduling Services may create or update a schedule (playlist) of audio content for that station based on the user's specifications. These schedules may be stored until downloaded or streamed to a user and played by a content player.

From the content distribution system website, a user may download a content player to desktop computers, laptop computers, or various portable content playback devices. The number and types of content players that a user can download may be configurable. For example, once certain limits are reached, existing content players may be deactivated before additional content players may be downloaded or re-enabled.

Once a user has established an account, configured stations, and downloaded a player, the user may synchronize the player and begin listening to her radio-like "stations." The synchronization process may obtain the station schedules from the server, and download or stream content, e.g., music, commercial content and perishable content, to the player. As users listen to their stations, the content player may check for the most recent versions of their configured perishable content and play it. In some embodiments, location updates received from user devices are used to provide a roaming, or current user location to determine which perishable content to provide to the user. These location updates can be initiated at or near the time when the user activates his media player, during the add-in provision process at or near a time the add-in block is scheduled to be inserted in a custom media stream, in response to a client-application location and/or status message received from the user device, or otherwise.

Upon subsequent synchronizations, the station schedules on a content player may be updated by replacing the played portion with new content. During the synchronization, station playback history may be returned to the content distribution system for review by a user via the website, and made available for overall application reporting purposes. When synchronization is complete, Schedule Services may generate additional schedules to provide content to replace what has been played on the player. New schedule content will be available for subsequent downloads.

A personal media library (PML) component may provide an end user system that delivers a radio-like listening experience that includes the user's own personal media in addition to other content, e.g., perishable content. Preferably, a user legally owns a collection of content, and has categorized and managed that content. Thus, a user may configure stations using their own criteria for the content.

In one embodiment, content may be limited to the user's personal media library. This approach may provide a way to deliver a radio-like experience without the relatively high costs of paying for third-party content. In that embodiment, a user may subscribe as a PML-only subscriber.

Similar to the subscription-based content component, a PML-only user may connect to a content distribution system website and register as a PML-only user. In one embodiment, a PML-specific website may be provided. A user may set up a free or fee-based subscription. A free subscription may allow a user to participate in the PML experience, but require that the user periodically listen to commercials. By selecting the fee based subscription, the user may elect to not listen to commercials.

In one embodiment, a user may download PML software to their computer after registration. Preferably, a user may create/edit content playlists within a media management application, such as iTunes or Windows Media Player. A user may then create stations based upon those playlists, or by audio file properties (e.g., as defined by Windows Media Player, or by a tempo analysis done by the Selector® music scheduling program from RCS). Generally, stations defined from Windows Media Player playlists may be static in nature and may play the same songs in the same order as defined by the playlist. Stations defined by audio file properties may randomly choose songs that match the defined audio file characteristics.

PML commercial content may be provided by the content distribution system operator, and may be configured administratively. Preferably, users may not select the types of commercials they want to hear; rather, the commercials may be randomly selected from all available commercial spots. In other embodiments, however, a user may select commercial listening preferences as with the subscription-based content component.

With respect to perishable content, a PML-only subscription may allow users to define perishable content themes. A perishable content theme may describe the type of perishable content and the frequency with which it should be played. In one embodiment, perishable content and categorization information may be maintained and obtained from the PML software or on a publishing server (discussed in more detail below).

After a user has defined his stations and perishable content themes, he can download a content player to desktop computers, laptop computers, or various portable handheld devices, as discussed above. In this embodiment, the media player need not be provided as part of the PML software. Once a user has established an account, configured stations, and downloaded a player, the content player may be synchronized with the content distribution system, and the user may listen to his stations. As a user listens to his station, the content player may check for the most recent versions of their configured perishable content and play it. Upon subsequent synchronizations, the station playlists on the content player may be updated. If a playlist is large, synchronization may only involve replacing the played portion of the playlist with new un-played portions. During synchronization, station playback history may be returned to the server for review by the user, and made available for overall application reporting purposes.

A content player component may provide a content player to users for various operating environments, e.g., Windows Desktop/Laptop, Windows Mobile and Symbian devices such as a Nokia smart phone. A content player may comprise two main functional operations, namely, Synchronizing and Playing.

Synchronizing may allow a user to update their stations and content by interacting with the content distribution system and content providers to obtain new schedule information, content and to report played-content history back to the content distribution system. Synchronization requires connectivity to remote services and processes, and thus may only take place when the content player is connected to the content distribution system via a network, e.g., through a wireless connection or while connected via a network connected computer. Various levels of synchronization may occur depending upon the speed and quality of the network connection.

Playing may involve playing content according to user schedules, and recording playback history. Playing may not require connection to the content distribution system; however, obtaining fresh perishable content may require a network connection. During playback, the radio-like experience may be manifested in, for example, various transitions between content elements, e.g., audio cross-fading. For example, as a song nears its end, the next song may begin playing, thus removing a discernible pause between tracks. Additionally, a content player may inject perishable content, e.g., News, Weather, Sports and Traffic reports, based on a user's subscription settings.

A publishing component may provide a means for organizations or individual users to publish audio content to a common, searchable repository. This common repository may facilitate searches by and distribution of available content to subscribers, e.g., organizations and users, as well as use by a content distribution system.

A publishing administrator may be responsible for configuring a centralized publishing service and granting publishing rights to various publishers, e.g., organizations and individuals. The content distribution system may provide publishing software, e.g., a content player enhanced with content recording and mixing functions. Organizations may utilize such software to create and define content for publication. Publishers may configure content based on specified categories and sub-categories (e.g., as may be defined by the administrator), and a target region (e.g., by country, state, city as may also be defined by the administrator). A publisher may identify a content category item to be a single audio file, or may configure a schedule which determines the appropriate audio file to be published at a given time.

When a content category item is configured, the publishing component may watch for newly-published files to appear in the configured locations. When new files are detected, the new files may be scanned for viruses and scanned according to other rules, e.g., DRM review and mature or illegal content. Then, new files may be made available on a publishing server, or otherwise published to subscribers, e.g., for inclusion in a station playlist.

In another embodiment, a content distribution system, or media delivery platform, may comprise a slightly different suite of components, namely, (1) a services component, (2) a websites component, (3) a personal media library component, (4) a content player component and (5) a publishing component. FIG. 1 depicts an embodiment of a functional diagram of those content distribution system components.

A services component 1 may provide a core set of business and data services needed to support all other content distribution system functionality.

A web site component 2 may provide user interfaces that allow administrators and customers to interact with the content distribution system. These web sites may provide the primary point of interaction for administrators and users of the content distribution systems, even though some functional areas may have separate user interfaces.

A publishing component 3 may provide a source of perishable content or user-generated content. The content distribution system may utilize other providers, such as radio broadcasters 4 for music content The content distribution system may utilize third party content providers 5 for music content. A personal music library component 6 may provide an alternative to this, by allowing users to use their own personal music (on their Internet connected computer) as a source of music content instead of relying on third party content providers 5 or other content sources.

A content players component 7 may be where users primarily live and interact with their configured radio-like "stations." Content players may exist for various distinct environments, e.g., Windows Desktop/Laptop, Windows Mobile and Symbian devices.

Thus, users may interact with a content distribution system and personalize their listening experience from easily accessible and easy to use web sites and/or desktop applications. Those having skill in the art will recognize, of course, that "listener" and "user" may interchangeably refer to a device user, a media consumer, a media generator/creator, and the like, whether the media be audible, visual, audio/visual, data or text, and whether an individual or not. These websites and applications may interact with core services that store preferences, organize schedules and content, and deliver the configuration and content for a radio-like experience to content players. The radio-like experience may be delivered as one or more "stations" grouped into user-configurable "bands." The stations may be user-configurable (e.g., by artist and genre), so they contain only the audio files desired by the user. The radio-like experience may further allow users to choose up-to-date localized news, weather, traffic, sports, and other short-life-span or perishable media content for inclusion in the "radio broadcast." The content players thus look and act like a real radio—only better.

Content Distribution System

The focus thus turns to describing an exemplary content distribution system for providing such an experience. Generally, the system may provide a way to access content from various sources, schedule that content into a radio-like listening experience, and provide that content to users. The system may also allow users to set up subscription accounts, set user content preferences, upload content, and provide feedback to a content provider.

Figure 2:
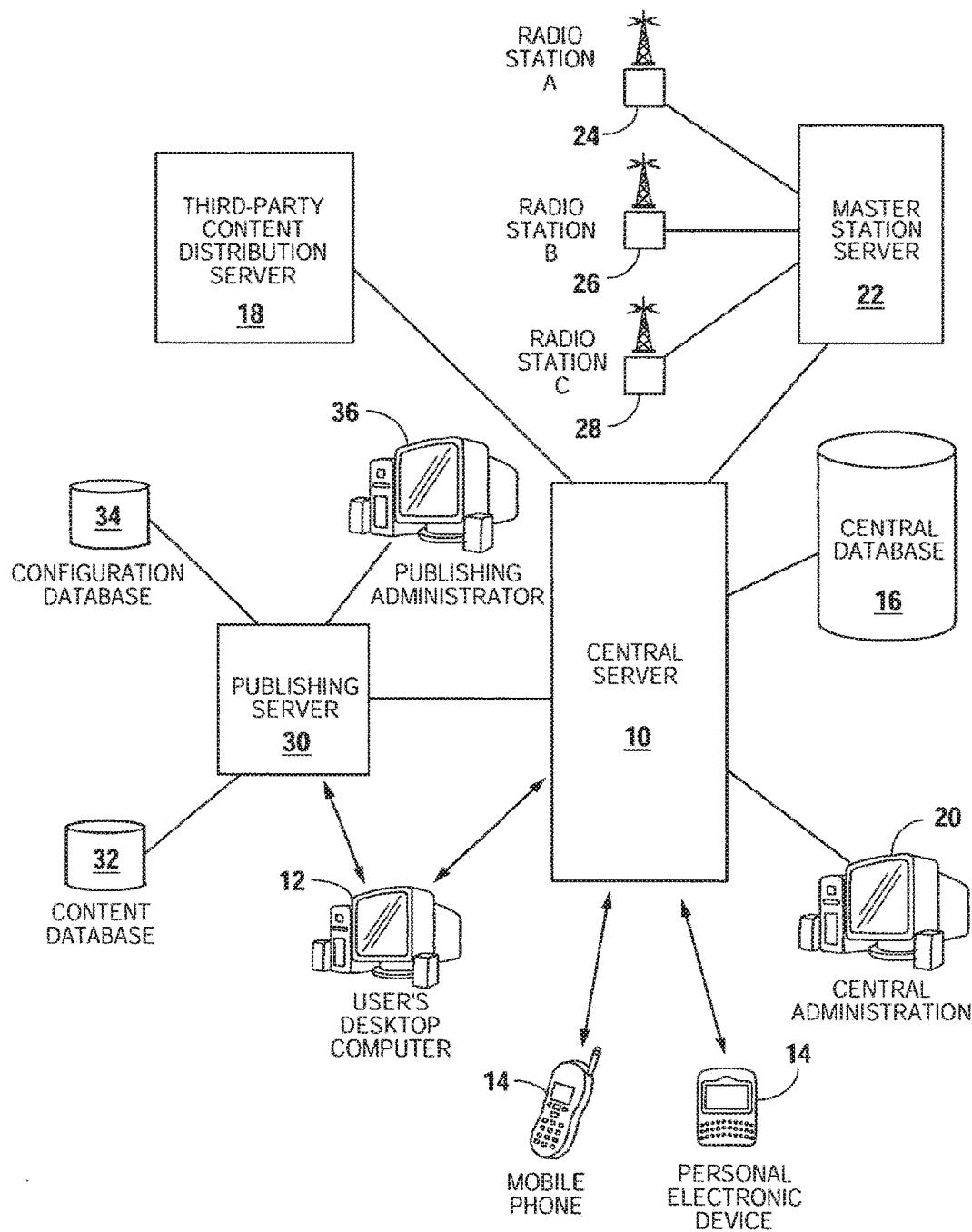
FIG. 2 depicts an embodiment of a system for providing a radio-like experience.

FIG. 2 illustrates one embodiment of a content distribution system operated by a radio broadcaster. Those skilled in the art will recognize that the content distribution system may be operated by any other suitable content provider, such as a business or religious organization. In the embodiment of FIG. 2, a central server 10 provides a media delivery platform acting at a central location through which content may be distributed to various users. In some embodiments central server 10 is implemented as a cloud-based media delivery platform that can be implemented in a distributed manner. A system administrator may interact with the central server 10 using an administrative computer 20. The central server 10 may store, process and retrieve user configuration files, account information, subscription payment, demographic information, media content, perishable content, system configuration data, and other data in a central server database 16.

The central server 10 may be connected to various content sources. In this embodiment, the central server 10 may be connected to a third-party subscription-based content server 18. The third-party server 18 may, for example, host a library of music for downloading or temporary use, or provide a stream of music. The third-party server 18 may also provide content metadata, e.g., data relating to the genre, sub-genre, artist, title, duration, etc. Those skilled in the art will recognize that the third-party server 18 may actually comprise a plurality of servers operated by a content distributor, and each of the plurality of servers may provide a different type of content, e.g., music, advertisements, infomercials, talk-radio programs, pre-arranged playlists, etc. Additionally, the content distributor may distribute content in compliance with DMCA and DRM rules when played, and provide royalty payment and management services. The content distributor may distribute media content in multiple formats, as well, such as in AAC and MP3 formats.

The central server 10 may also be connected to a master radio station server 22 that receives, processes, stores and serves content from one or more of radio stations A 24, B 26 and C 28. In this embodiment, the radio stations provide perishable content, e.g., geographically localized news broadcasts, weather reports, traffic reports, sports broadcasts, advertisements, public-service announcements, DJ content or "chatter," "marquee" content, "ticker" content, alerts and the like that have a relatively short life span or are time- or locale-sensitive.

Of course, in various embodiments a central server 10 may receive perishable content directly from radio stations, as well. For example, the master radio station server may be connected to a plurality of radio stations that may be situated in various geographic locations, and may be connected to a plurality of radio stations situated in a common geographic location. Those skilled in the art will recognize that radio stations may broadcast over-the-air, via Internet, via satellite or by any other suitable transmission means. Those skilled in the art will further recognize that one or more of the radio stations may simply be Internet-based streams or aggregated content feeds, from the master radio station server 22, that pertain to various demographics or geographic locations.

In the embodiment of FIG. 2, the master radio station server 22 may serve as a common location from which the central server 10 may draw perishable content from radio stations in different parts of the world. Station A 24 may be located, for example, in Victoria, BC. Station B 26 may be located, for example, in San Antonio, Tex. Station C 28 may be located, for example, in Tolagnaro, Madagascar. The central server 10 may receive from the master station server 22 a list of radio stations in various geographic locations, e.g., San Antonio, Tex., that a user views in designing a listening experience, as discussed in more detail below.

The central server 10 may also connect to a publishing server 30 that stores user created content uploaded by various users. As discussed in more detail below, a user may create content and upload the content to a publishing server 30 for distribution to a target audience, such as to a particular listener group or the inhabitants of a particular geographic region. The publishing server 30 may store user created content in a content database 32. The publishing server 30 may also store user configuration files and distribution protocols in a configuration database 34. A publishing administrator may interact with the publishing server 30 and databases 32 and 34 from a publishing administrator computer 36.

Users may connect to the central server 10 through their personal computers 12 and/or mobile electronic devices 14. The mobile electronic devices 14 may include, for example, cellular phones, PDAs, and portable music players. Users may use software applications downloaded or otherwise served from the central server 10 to their personal computers 12 and/or mobile electronic devices 14. Users may also download software applications from the central server 10 to their personal computers 12 and/or mobile electronic devices 14 that allow users to create and publish their own media content.

Additionally, users may upload a representation of media content from a user's own personal media library, such as a playlist of music files, to the central server 10, or to the publishing server 30. Alternatively, the media content itself may be uploaded. If uploaded to the central server 10, for example, the central server 10 may schedule the user's content according to the user's preferences, and return a re-arranged playlist to a user for playback. Those skilled in the art will recognize that users may upload media content or its representation from a user computer 12 or from a mobile electronic device 14.

Those skilled in the art will recognize that the various devices disclosed in FIG. 2 may communicate via one or more networks. A network may be any type of electronically connected group of computers or electronic devices including, for instance, the following networks: Internet, Intranet, Local Area Networks (LAN), Wide Area Networks (WAN), cellular communication networks, PSTN, or an interconnected combination of these network types. In addition, the connectivity within a network may be, for example, remote modem, Ethernet (IEEE 802.3), Token Ring (IEEE 802.5), Fiber Distributed Datalink Interface (FDDI), Wi-Fi (IEEE 802.11), Wi-Max (IEEE 802.16), GSM, CDMA, 3G, D-AMPS, Asynchronous Transfer Mode (ATM), or any other communication protocol. Those having skill in the art will recognize that the devices in FIG. 2 may be any suitable device, such as a desktop computer, server, portable device, hand-held device, set-top box, cellular phone, personal digital assistant (PDA), a terminal, thin client, or a suitable device of any other desired type or configuration. Those having skill in the art will recognize that network-connected devices, and devices connected to each other, may vary widely in processing speed, internal memory, communication capability, and other performance aspects, as may be suitable for the various functionalities described herein. Such devices may also be geographically dispersed. Communications within the network and to or from the computing devices connected to the network or each other may be either wired or wireless, and may be established by physical, electronic, optical, or other means. Wireless communication may be especially advantageous for network connected portable or hand-held devices. A network may include, at least in part, the world-wide public Internet which generally connects a plurality of users in accordance with a client-server model in accordance with the transmission control protocol/internet protocol (TCP/IP) specification. A client-server network may provide a dominant model for communicating between two computing devices. Using this relationship, a client computer (a "client") may issue one or more commands to a server computer (the "server"). The server may fulfill client commands by accessing available network resources and returning information to the client pursuant to client commands. During this process, client computer systems and network resources resident on the network servers may be assigned a network address for identification during communications between elements of the network. Communications from other network connected systems to the servers may include the network address of the relevant server/network resource as part of the communication so that the appropriate destination of the data/request may be identified as the recipient. If a network comprises the global Internet, the network address may be an IP address in the TCP/IP format which may, at least in part, route data to an e-mail account, a web-site, or other Internet tool resident on the server. Thus, information and services resident on the network servers may be available to the web browser of a client computer through a domain name which maps to the IP address of the network server.

In one embodiment, the content distribution system architecture may be provided through a Service Oriented Architecture (SOA) and follow guidelines outlined in Windows Server System Reference Architecture (WSSRA). In such an embodiment, the architecture may provide various layers of security, e.g., a player zone, a perimeter trust zone, and an internal trust zone. All external system requests may originate from the player zone through, for example, a browser-based graphical user interface provided on a PDA. All user devices may be treated as part of the player zone. The player zone may be separated from the perimeter trust zone by a firewall. Requests originating from the player zone may pass through the firewall to the player trust zone. Components in the perimeter trust zone, such as the publishing server 30 and sections of the central server 10, may authenticate and verify incoming requests from the player zone. Requests originating from the perimeter trust zone may pass through a firewall to the internal trust zone. Components of the internal trust zone, such as various databases, and SQL and backend servers, may authenticate and verify incoming requests from the perimeter trust zone.

Those skilled in the art will recognize that the various servers, computers and databases described in FIG. 2 may be provided in any suitable configuration. For example, the central server 10 may in practice be provided as load balanced server clusters, some of which may handle backend services, and some which may be web servers that handle requests from the player zone. Other servers, databases and computers may in fact comprise one or more suitable devices.

Likewise, any suitable device configuration may be used. For example, web servers may run Windows Server 2003, have 1 Gb of memory and 50 Gb of hard disk space. SQL servers may run Windows Server 2003, have 2 Gb of memory and 100 Gb of hard disk space. Services cluster servers may run Microsoft SQL Server 2000, have 1 Gb of memory and 100 Gb of hard disk space. A user computer may run Windows XP, have 256 Mb memory and 1 Gb hard disk space, and have Windows Media Player v.10, and Internet Explorer v.6.0 installed.

For further example, the communication protocol between the user devices running the content player described below and components located in the perimeter trust zone may occur via HTTP port 80 or HTTPS port 443. The communication protocol between components in the permit or trust zone and the internal trust zone may occur via .NET remoting over port 80. Communication between the internal trust zone and third-party sources, e.g., over the Internet, may be by any suitable protocol.

Those skilled in the art will recognize that content may be provided to a user device by any suitable means, such as by downloading or streaming or some combination thereof. Content may be buffered or stored to allow a user to skip content while listening to a station and to allow playback of perishable content when a user device is not connected to the central server 10.

Account Setup

The content distribution system may allow a user to set up a new account. In one embodiment, the central server 10 may provide a browser-based graphical user interface for manifestation on user computer 12. For example, a radio broadcaster may provide one or more webpages that contain a link to a new account registration page, such as that depicted in FIG. 3.

Figure 3:
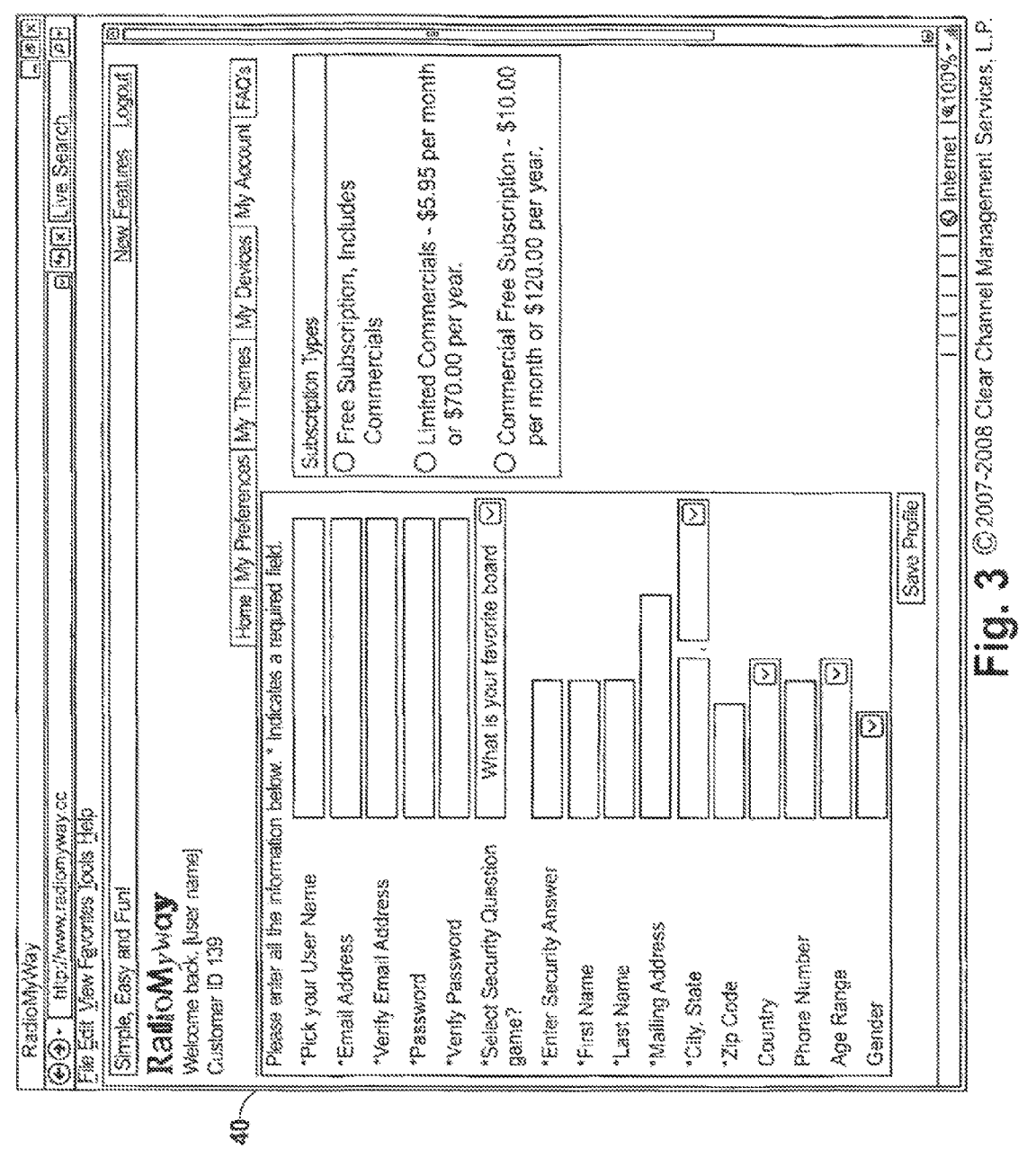

A user may create a new user account through the web site or through a web site launched by the application, as shown in the embodiment of FIG. 3. As shown in the embodiment of FIG. 3, a new user may provide a unique user login name and select a password that may be used to allow access to media content and perishable content. The user's login name may, for example, be the user's e-mail address. A user may also provide contact and demographic information. The user may also provide a user profile. For example, the application may prompt the user to enter demographic information, such as age, sex and zip code. The application may also ask marketing questions during subscription set up. Marketing questions may be used to support content scheduling and advertisement selection. Confirmation that a new account has been set up may be sent to the user's e-mail address.

In the embodiment of FIG. 3, a user may subscribe at one of several levels of access. One level of access may be provided to the user free of charge, if the user agrees to listen to a certain number of advertisements each hour. Another level of access may be provided at a subscription rate that depends on how many advertisements (or how many minutes worth of advertisements) the user is willing to listen to. A premium subscription level may provide access to an advertisement-free listening experience. Additionally, a trial subscription period may be offered. A user may set up multiple subscriptions, e.g., by registering through various radio station websites.

Although not shown in the embodiment of FIG. 3, a user may be presented with various payment options, such as by credit card, PayPal or upon invoice. A user may also be presented with various payment periods, such as monthly payment or annual payment. A user may also be presented with the ability to link an account with a "shopping cart" that may be used to purchase content while listening. Thus, a user's account may include financial account details.

Customizing a Listening Experience

Figure 4:
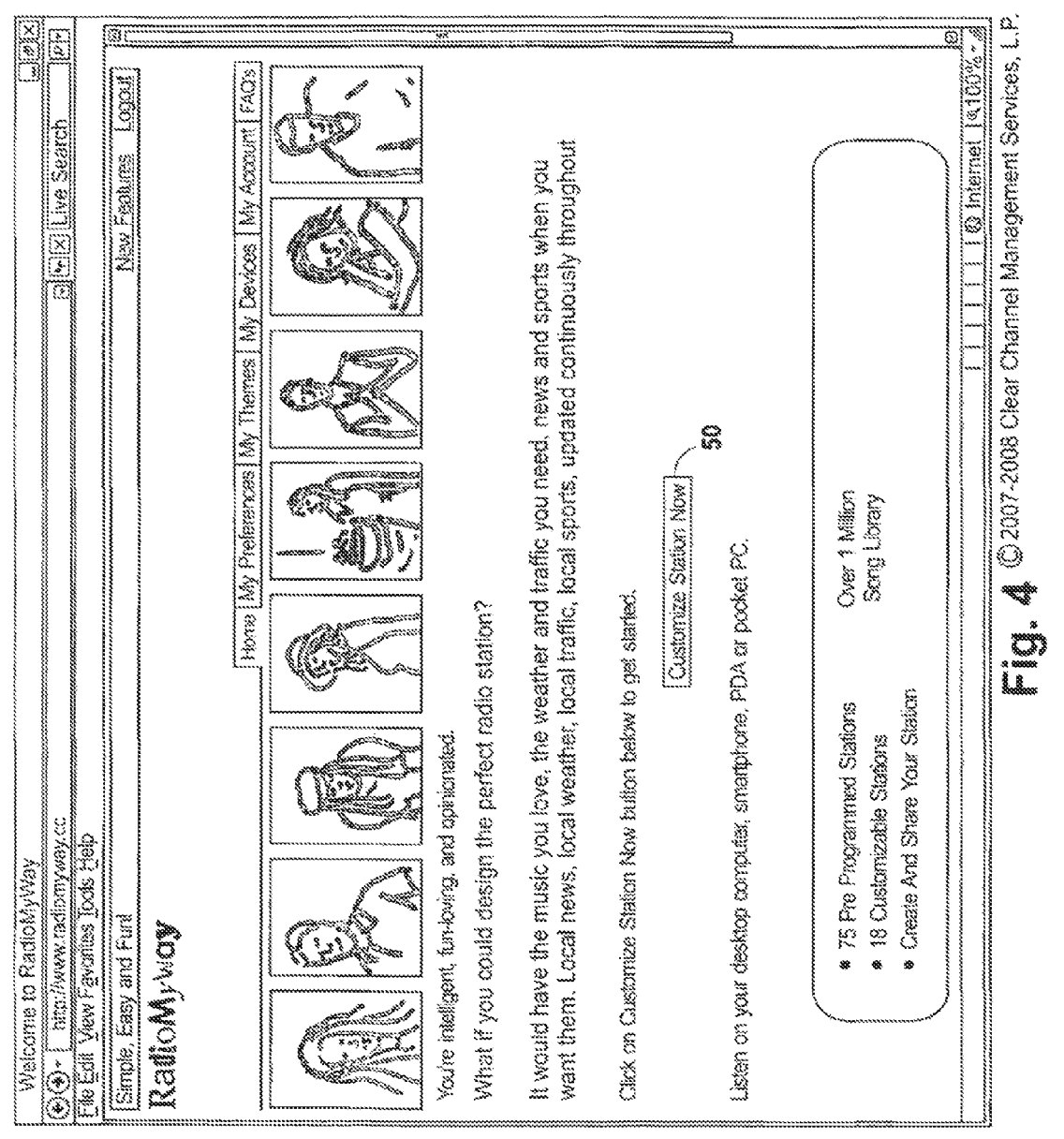

After setting up a new user account, a user may be provided the opportunity to customize his listening experience. The central server 10 may provide the new user with a user interface, such as the exemplary web browser-based screen of FIG. 4, that allows the user to begin the customizing process by clicking on a Customize Station Now button 50. In some embodiments, although not specifically illustrated, the screen illustrated in FIG. 4 includes a user selectable object that activates an option, sometimes referred to as a discovery tuner, that allows a user to rapidly customize a radio station by choosing from options that include "familiar," "mixed," and "less familiar." In other embodiments, the discovery tuner is presented to a user on its own page, and can be used to provide a user with the same or similar options as are provided related to customizing music or other content. For example, a user can be presented with options for "local," "mixed" local and national, and "less local." Note that in at least one embodiment, the options presented to a user for perishable content include "No add-ins," "add-ins enabled for non-talk (music, television shows) stations", and "add-ins enabled for talk content." Further options relating to whether the user wants only traffic, only weather, only news, or some combination of these and other perishable items can also be provided to a user.

Figure 5:
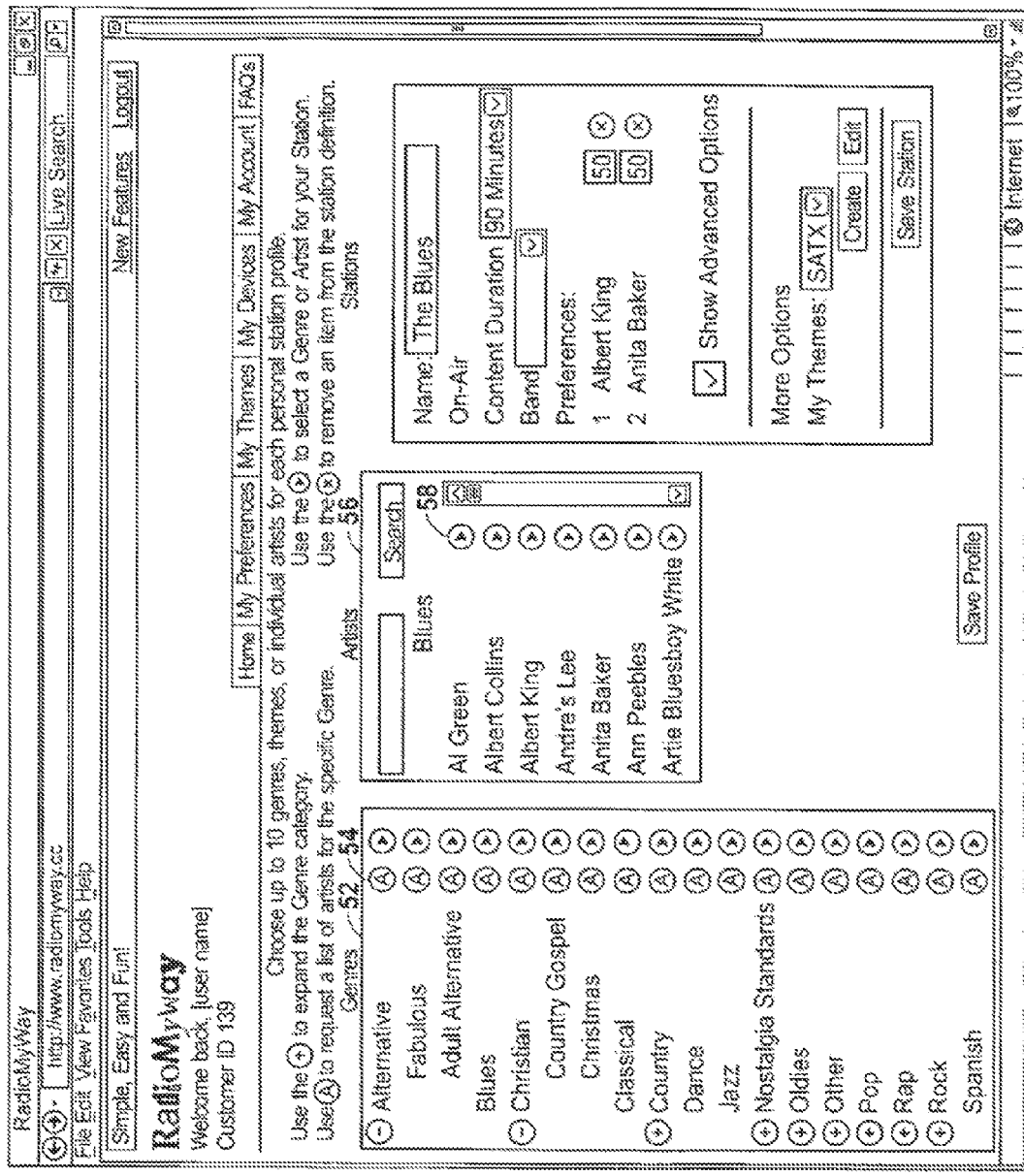
FIG. 5 depicts an embodiment of a screen that may be provided for a user to customize a radio-like station.

In one embodiment, a user may set up one or more pseudo-radio "stations" that may each be associated with a different listening experience or "theme." Thus, in one embodiment, a user may create a radio-like listening experience with content from various sources. As shown in the embodiment of FIG. 5, for example, a user may choose one or more preferred music genres and select various artists from within those genres to create a particular listening experience for a "station." Various controls may be provided to facilitate user selection. In this embodiment, under the "Alternative" genre, clicking on the "⊕" button may expand the listing to include the sub-genres "Fabulous" and "Adult Alternative." Referring still to FIG. 5, after identifying a desired genre in the table of Genres 52, such as "Blues," a user may click on the circled "A" button 54 to view the artists associated with the genre. In this example, blues artists such as Al Green, Albert Collins, and Albert King appear listed in Artists table 56. A user may click on the circled "▶" button 58 next to an artist's name to select that artist. In this example, Albert King and Anita Baker had been selected for a station named "The Blues." The user may, of course, remove an artist by clicking on the "ⓧ" button. In this embodiment, various controls may be provided to allow a user to listen to a short sample of a song, a music genre, or a sampling of songs representing an artist's musical style.

The user may also specify how long the selected content is to play without repeating. In this example, the station may play a blues song rotation for 90 minutes before starting over. Also, the user may specify a particular "band," to which the "station" will be assigned. As will be discussed below in connection with the user interface for the media player, a "band" may be presented to the user as analogous to the station settings on a car radio. Each band may include one or more stations. The number of bands and stations may be determined by a user's subscription level. The user may further specify a preference as to what percent of air time a particular artist should be played. In this example, the user has specified that Albert King's songs play approximately 50% of the station air time, and that Anita Baker's songs receive the remaining air time.

Figure 6:
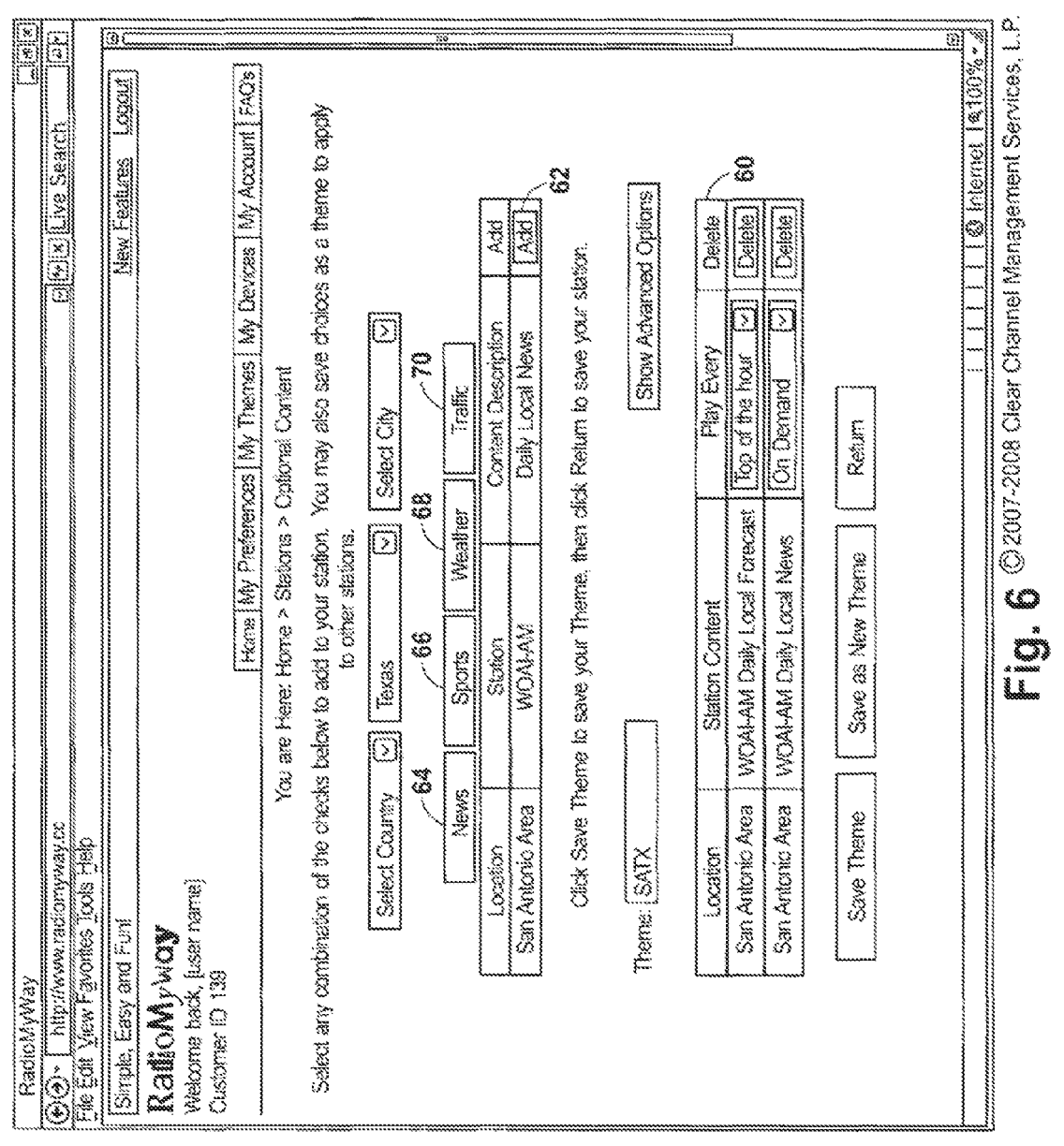

Additionally, a user may choose an overall "theme" for the station. In this embodiment, the particular theme may be a geographic location from which perishable content is drawn. To create, edit or delete a theme, a user may be presented with a user interface, such as that of FIG. 6, that allows selection of perishable content from various radio stations in that geographic area. In the embodiment of FIGS. 5 and 6, the user has selected a theme related to San Antonio, Tex. Those skilled in the art will recognize, of course, that the user need not reside in a particular geographic location in order to enjoy perishable content from that location. A user might, for example, reside in Ogallala, Nebr., yet still enjoy perishable content from San Antonio, Tex., or from any other (or a mixed variety of) geographic locations. In this embodiment, a user may choose a different country, state, and city from which to listen to perishable content, as provided in the embodiment of FIG. 6. A user need not select the most specific available geographic region, i.e., a user may select, for example, only a country, and receive a listing of perishable content available from that country. In various embodiments, other geographic regions or other sources of perishable content (such as trade associations or other special interest groups) may be defined. Thus, a user may select perishable content according to preference. A radio broadcaster operating the content distribution system may choose to make available only those radio stations under its control. A content distributor may also make various content sources available depending on subscription level. A content distributor may provide a number of pre-programmed themes that can be selected by a user, and also provide a number of preprogrammed stations that can be selected by the user, as well.

Referring still to the embodiment of FIG. 6, upon selecting a geographic location or region for listings of available perishable content sources in those areas, a user may sort the results by type of perishable content by clicking on various buttons. In this embodiment, a sports button 66, a news button 64, a weather button 68, and a traffic 70 reports button may be provided that correspond to the types of perishable content commonly offered by radio stations, i.e., news, weather, traffic and sports (also known as "NWTS"). If a user selects the news button 64, for example, the San Antonio, Tex., radio station WOAI-AM (e.g., station B 26 in FIG. 2) appears as a source for news reports. If the user desires to listen to news pertaining to San Antonio, the user may add that San Antonio area news station to his "The Blues" station by clicking the "Add" button 62 to add San Antonio news content to the theme.

The various perishable content components of the theme may be displayed in the lower portion of the exemplary screen of FIG. 6. As may be seen there, a user has chosen both weather reports and news reports from WOAI-AM. A user may further specify how often each type of perishable content is to be played. For example, a user may choose to listen to a weather report at the beginning of each hour, and listen to a news report on demand. Also, a user may choose to have public service announcements or emergency alerts delivered on an expedited basis (not shown in FIG. 6). And, of course, a user may also delete a source of perishable content by using a delete button 60.

In various embodiments, other types of perishable content may be made available, e.g., "DJ Chatter" from a particular radio personality, or talk radio program, or other content of interest. For DJ chatter, for example, a user may be presented with an option for more chatter or less chatter. Perishable content does not have to pertain to a particular geographic location, but may pertain to a particular issue of the day, a particular audience, or a particular event, to name a few examples. For each of those types of content, a user may select a San Antonio area station from which perishable content is to be used, or may select perishable content from another geographic region or other desirable content. As discussed below, such other desirable content may include user created content or content from a personal music library.

Figure 7A:
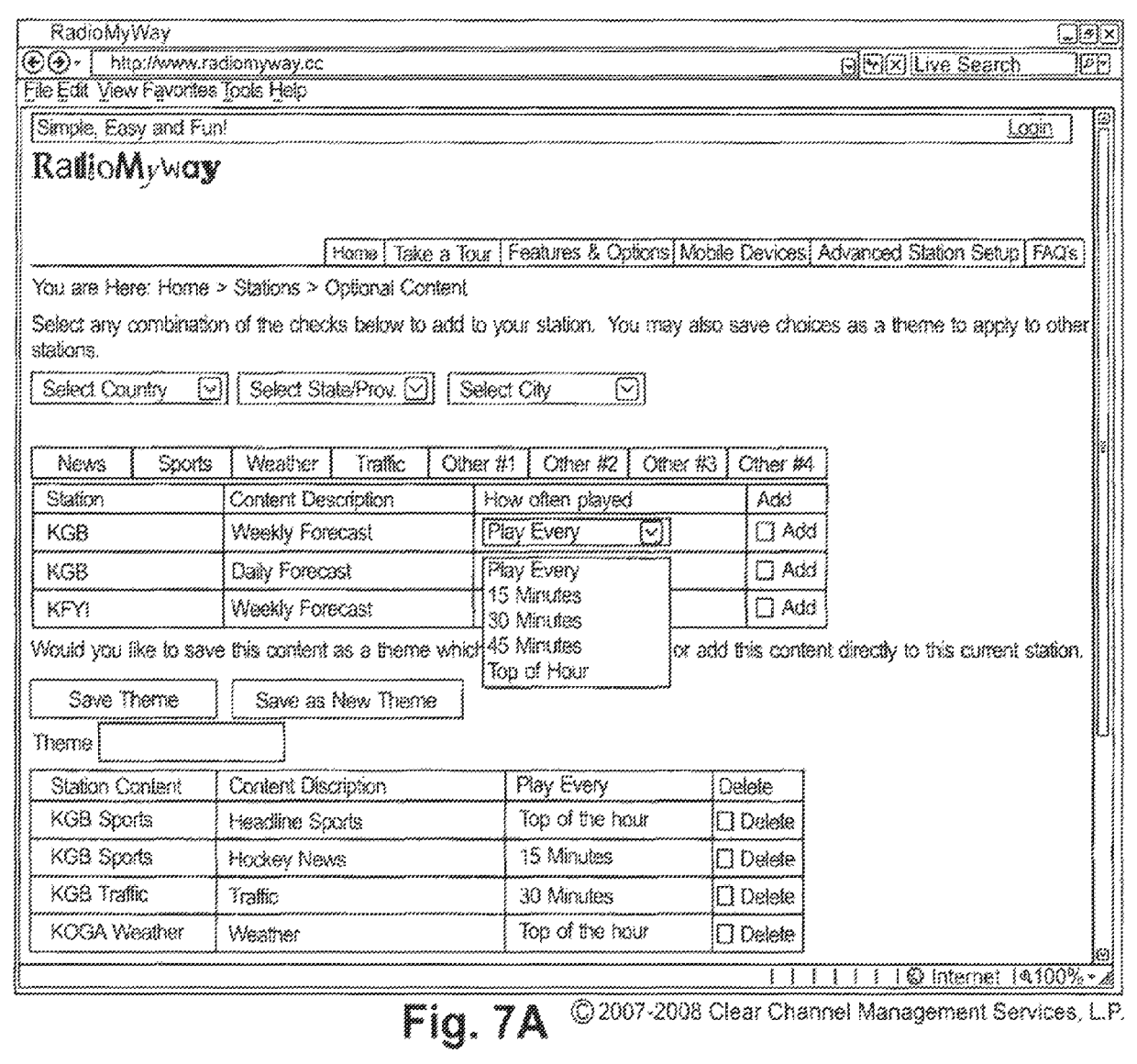

FIG. 7A illustrates another embodiment of a screen through which a user may establish a theme. In this embodiment, a drop-down menu may be seen that allows a user to select how often perishable content is played. For example, if a user prefers to listen to a longer play list of music without interruption, the user may choose to only play perishable content on demand. Or, if a user prefers to break up a playlist of music, the user may specify an interval or time at which each type of perishable content should be played.

Figure 7B:
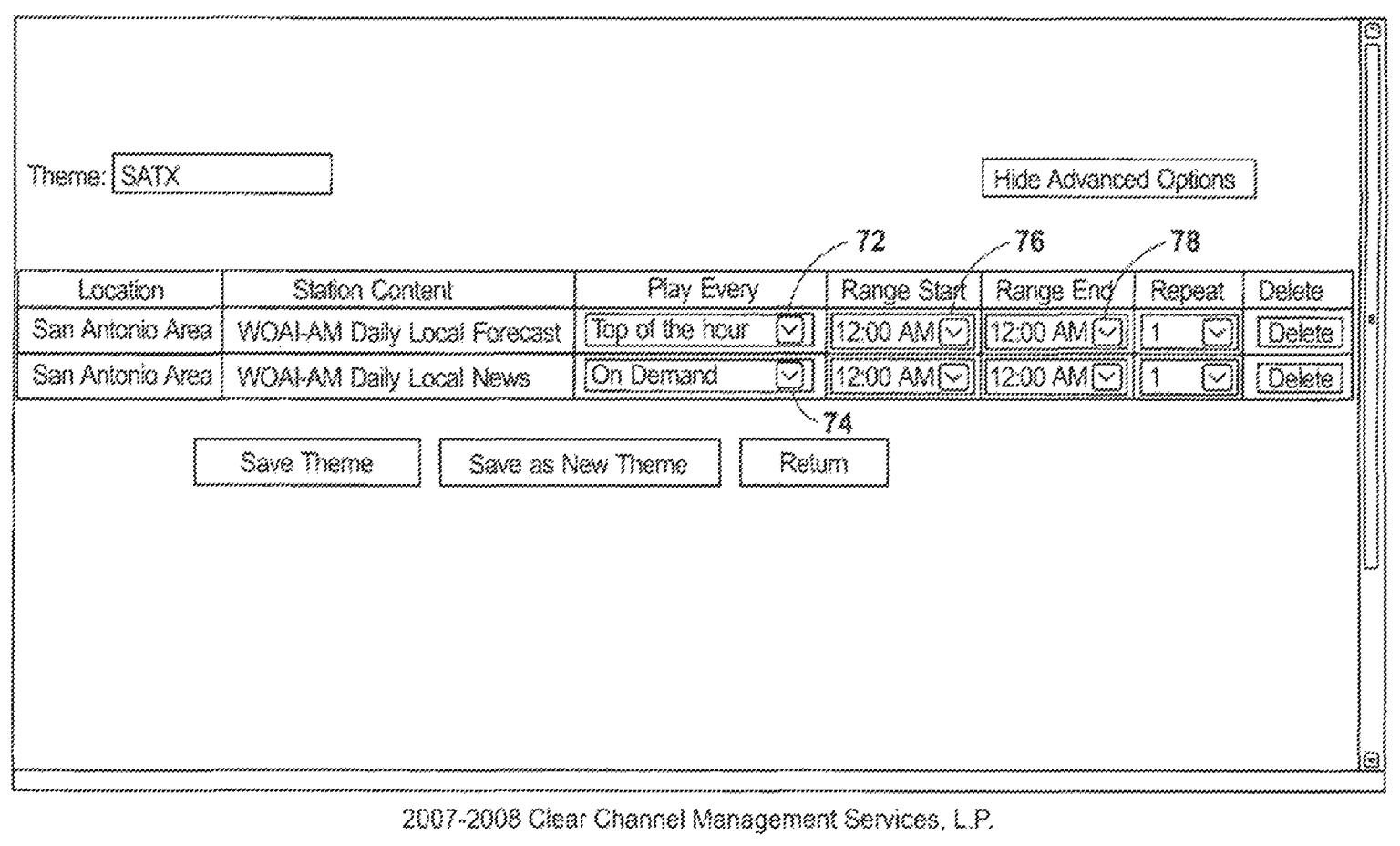

As shown in the embodiment of FIG. 7B, more advanced timing options may be provided to a user. Using drop down menus 72 and 74, for example, the user may elect to have the San Antonio area forecast played at the top of every hour, and the San Antonio area news played on demand. Using more advanced options, for example, as may be provided in drop down menus 76 and 78, a user may choose to define a specific time range to play a perishable content item, and may specify how many times ("repeat") that they wish to hear the same perishable content. For example, a user may desire to hear traffic reports only between the hours of 7 AM and 9 AM, and between 4 PM and 6 PM. The media player may, by default, inject and play each new perishable content file one time and not inject or play the same item again until it has been refreshed; however, the user may override that and specify how many times the same perishable content is to be repeated. After the same perishable content has been played for a specified number of times, the audio file for the perishable content may not be played until it has been refreshed with new content during synchronization with the central server 10. Alternatively, a content distributor may establish an expiration date for perishable content and prevent expired perishable content from being played. A content distributor may provide fresh content of the type and source as specified by the user.

Figure 8:
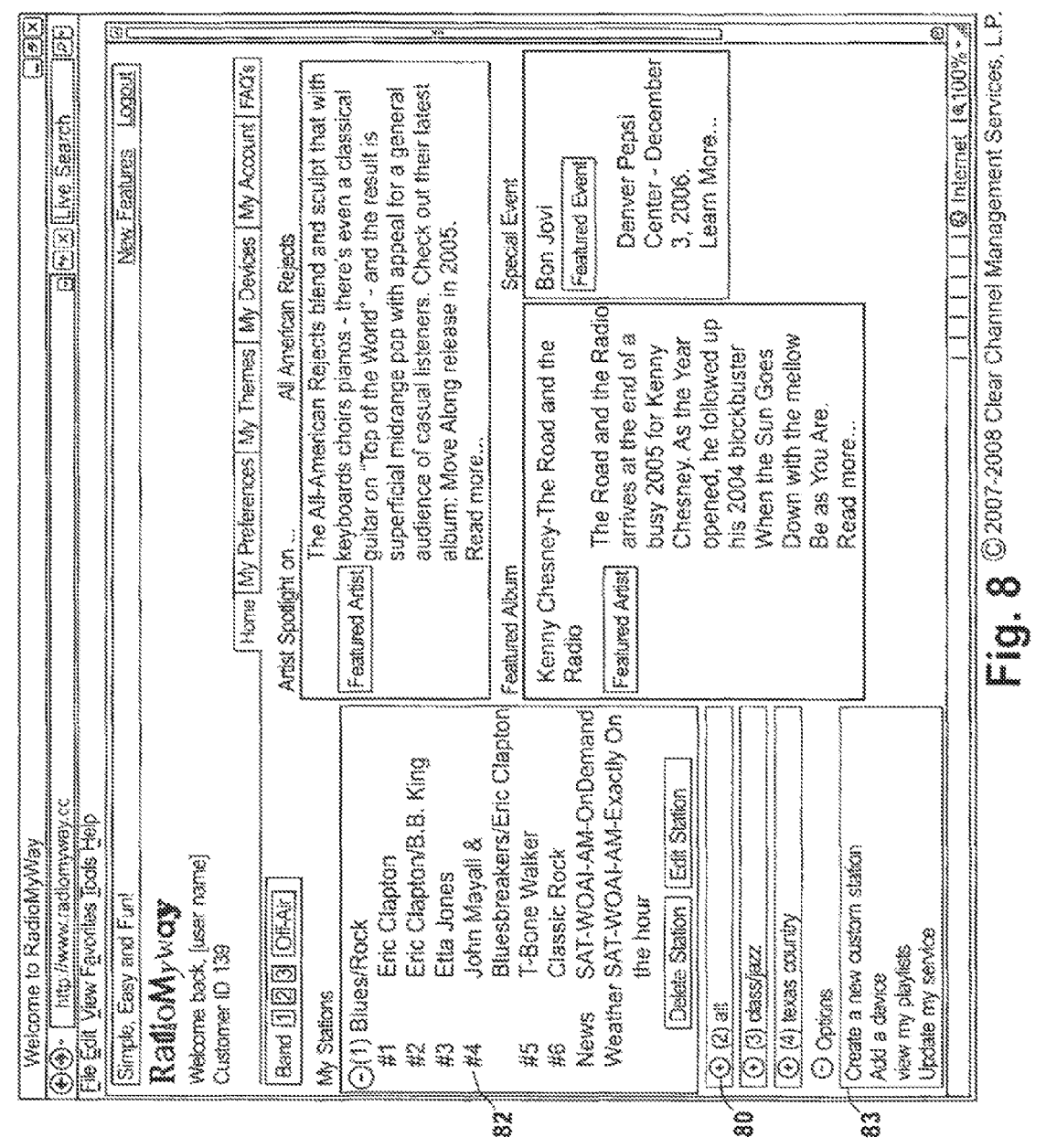

In that manner, a user may specify a number of different themes, and associate a theme with one or more stations. After having defined one station, a user may elect to define further stations by going through the process described above. In the embodiment of FIG. 8, the user has, for the band 1, set up four stations named "Blues/Rock," "alt," "class/jazz" and "Texas Country," respectively. The user may be provided with various controls that may be used to view the station details. In this embodiment, clicking on the "⊕" 80 button may allow a user to expand the list of preferences pertaining to that particular station. For example, in the "Blues/Rock" station assigned to band, a user may see a list of preferred artists 82, and the radio stations from which perishable content is drawn. Other options may be provided for a user as seen in the "Options" field 83, such as an auction for creating a new custom station, an option for adding a new listening device, an option for viewing playlists, and an option for changing service to a new subscription level. Also, the central server 10 may provide on a user's "homepage" additional advertisements, music features, event listings for a particular region, and other information that may be of interest to the user based on the user's profile.

Figure 9:
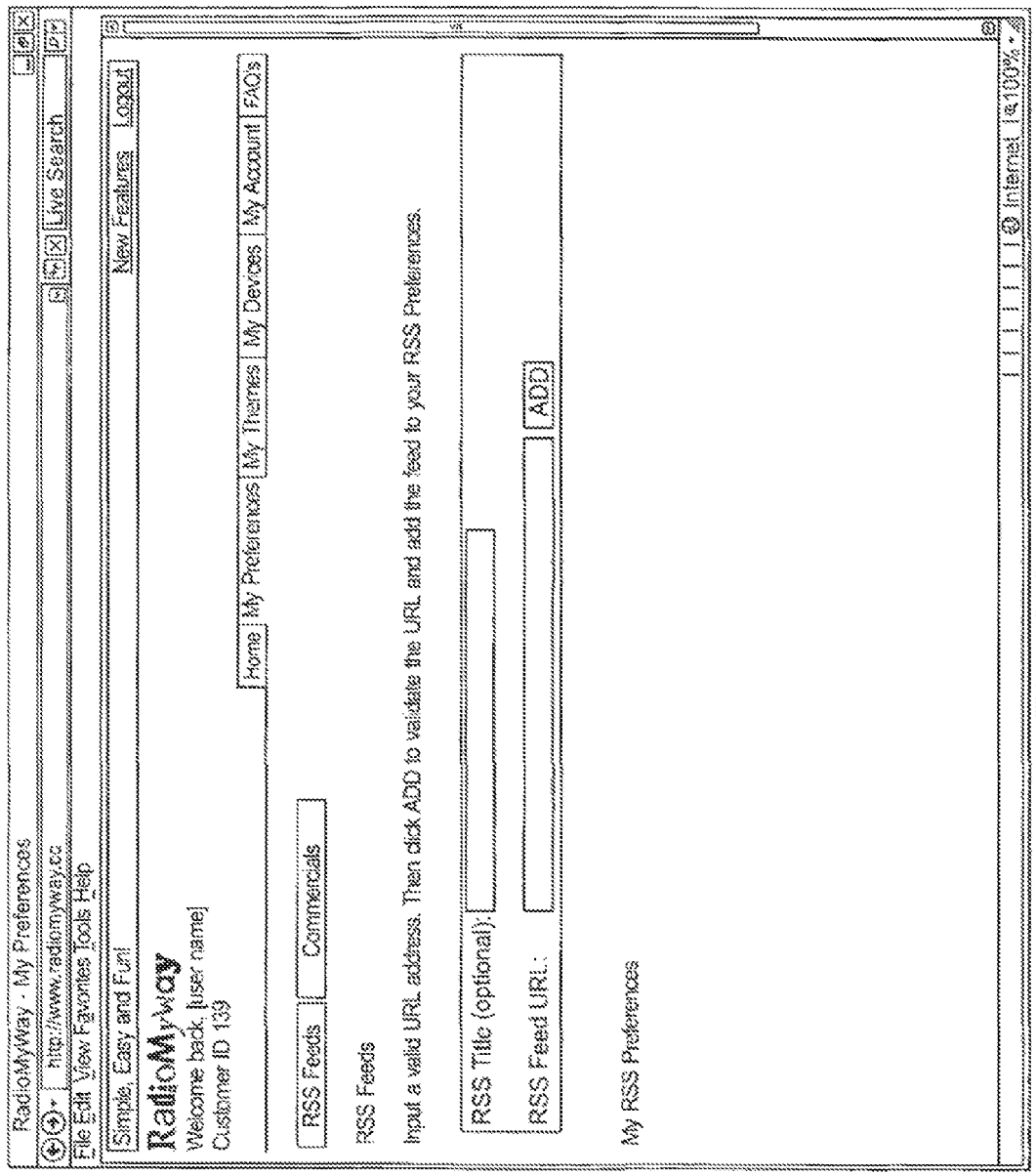
FIG. 9 depicts an embodiment of an interface that may be provided for a user to specify an RSS feed for inclusion in a radio-like station.

The user may also elect to have content incorporated into a station from an RSS feed, as depicted in the embodiment of FIG. 9. In this embodiment, a user may enter the title of an RSS feed, and specify at the RSS URL. In that way, the RSS feed may be added to, or used in place of the typical NWTS perishable content. The RSS feed may provide, for example, a podcast of a long format talk show or an opinion piece, or blog entries or audible news headlines.

Additionally, a user may specify which types of commercials from one or more categories to listen to. In the embodiment of FIG. 10, a user may be provided with various advertisement categories, including "Automotive," "Entertainment," "Financial," "Food Beverage," "Insurance," "Pharmaceuticals," "Real Estate," "Restaurants" and "Retail." Thus, depending on the subscription level, when a commercial is played, commercials may be drawn from the selected categories. Also, the application may be configured to select commercials at random from various categories if the user does not select enough categories. Those skilled in the art will recognize that the amount and format of commercial content may be based on the user's subscription level, and may further be defined by the content distributor. Commercials may be drawn from any source and may be directed to any particular demographic. In one embodiment, commercials may be national, and provided by the content distributor. In other embodiments, the content distributor may incorporate local advertisements in specific markets. For example, a user may desire to hear commercials only from the geographic location in which he resides.

In some embodiments, perishable content and commercials may be selected for playback across various stations. In other words, a user's perishable content selections and commercial listening selections may apply to one or more stations in one or more bands. Thus, for example, a user may listen to news content from WOAI-AM whether listening to a country music station, a rock station, a jazz station or blues station without having to designate news from WOAI-AM separately for each of those stations. The number of commercials played during any given hour may depend on the user's subscription level. For example, if a user has a free subscription, a block of four commercials may be played three times an hour. If a user tries to skip a commercial, the commercial may be played again until the user listens to the entire commercial.

Figure 11:
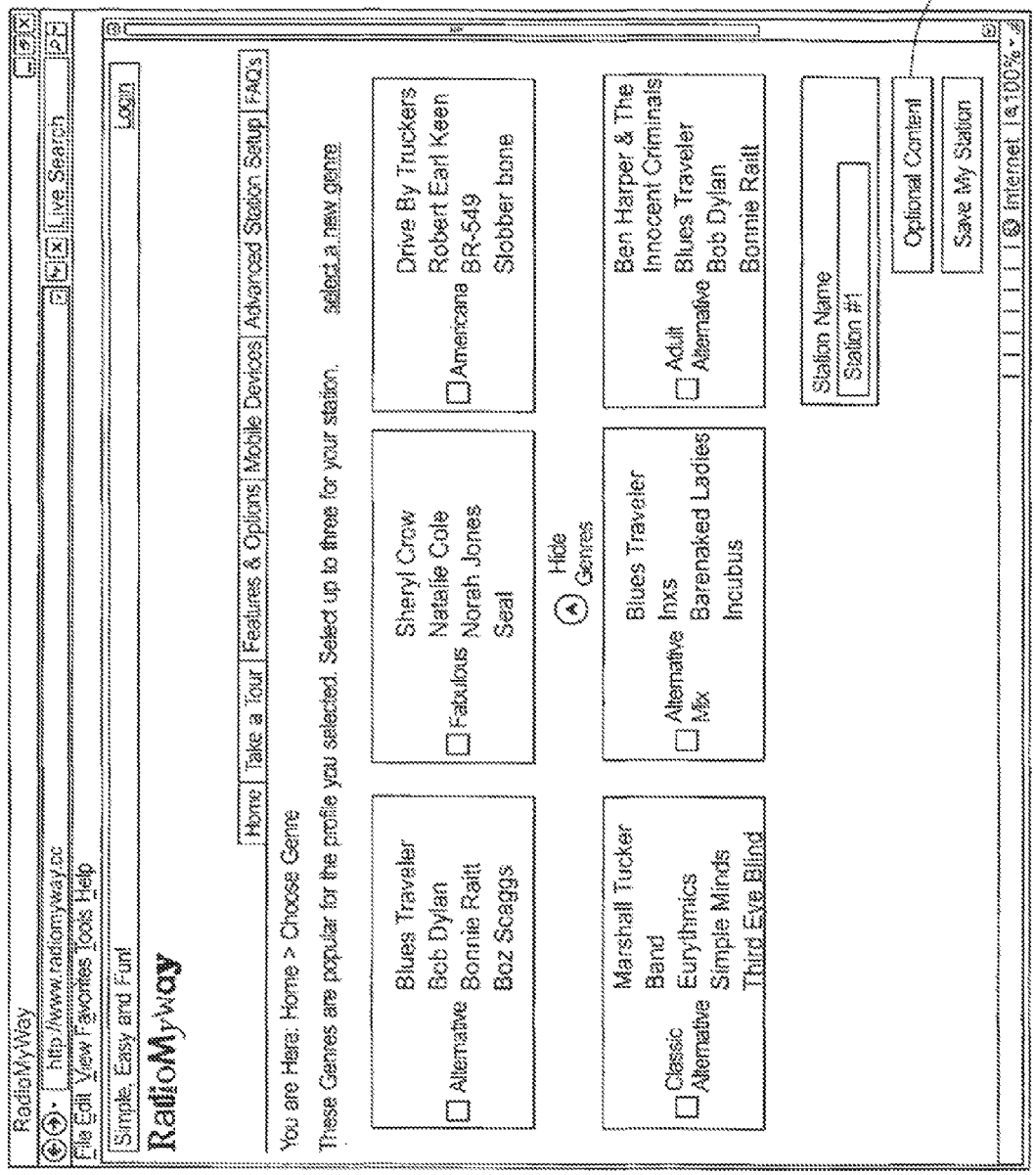
FIG. 11 depicts an embodiment of a screen that may be provided for a user to select pre-configured radio-like stations.

In other embodiments, a user may elect to listen to fully- or partially-configured stations that may be provided as shown in the embodiment of FIG. 11. A central server 10 may provide a number of stations that are popular with other users having a similar profile. During setup, a user may be provided with the opportunity to choose genres that may be of interest, and define various stations according to the genres provided. Those having skill in the art will recognize that a station may have multiple genres associated with it, whether the station is customized by the user as described above, or selected from a list of fully- or partially-configured stations. That way, a user may quickly begin listening to a selection of music within a genre if the user is relatively unfamiliar with, for example, the various artists within that genre. The user may also click on an "Optional Content" button 84 to set up a perishable content theme as described above.

In some embodiments, the content distributor may provide a web page that provides the user with historical detail, pertaining to his account, including payment history, played content, user feedback on the played content, etc. The web page may also provide a history of such fees and history of shopping cart related purchases. The web page may further provide a way for users to purchase played content. The web page may further provide a way for users to search for played content by title, album, artist, or any other content identifying criterion.

In still other embodiments, a user may establish a station with content wholly or partially drawn from the user's (or another's) personal music library. A user may provide a content distributor with access to a personal music library, and specify a location of the personal music library. The content distributor may further provide a way for the user to search his personal music library and designate content for inclusion in a station. The content distributor may retrieve content from personal music library according to preferences specified in the user profile or otherwise specified by the user. For example, if the user desires to establish a station of country music drawn from his personal music library, the user may designate certain music from the library for the content distributor to use, or rely on the content distributor's skill in choosing an appropriate mix of music from the personal music library. For example, a content distributor may rely on metadata associated with music in the personal music library to identify suitable selections. The content distributor may arrange suitable music using any suitable professional broadcast scheduling software to create pleasing transitions between songs, e.g., cross-fades and voiceovers, and provide the arranged music to the listener for playback in connection with the chosen station. For example, the central server 10 may rely on professional broadcast scheduling software, such as NexGen® from Prophet Systems Innovations, to adjust the relationship between songs to incorporate cross fades, lead-ins and lead-outs. The server may further use a rule-based approach to provide the user with a varied listening experience. In some embodiments, the content provider may mix music from the personal music library with perishable content and commercials, in the manner described above. The content provider may also provide the user with the ability to skip around within the playlist that the content distributor has arranged, or to shuffle the playlist into a different arrangement.

Of course, if the user did not want to provide a central server 10 with access to his computer system or mobile listening device, the user could simply upload his personal media library or information about his personal media library to the central server 10 so that the central server 10 may use professional broadcast scheduling software to arrange the media into a playlist having audio properties and content specified by the user.

In another embodiment, a user may incorporate music from a personal music library into a preconfigured station, or into a station configured according to the user's preferences as described above. For example, a user may desire to add music from a personal music library as part of a music playlist generated by the content distributor. As part of setting up an account, a user may thus provide access rights for the central server 10 to access the user's personal media library.

In utilizing a user's personal media library, the central server 10 may verify, using for example, DRM techniques, that the user legally owns the collection of audio content in the personal media library. In various embodiments, a user may organize or manage his content by using a content management application, such as iTunes or Windows Media Player. A user may furthermore have arranged some of that content into playlists or otherwise created a desired listening experience. Thus, a user may have the option of including such playlists as part of a station's content. In other words, a content distributor may incorporate content that has already been arranged by a user. In some embodiments, a central server 10 may evaluate such user-created playlists, and use information about such arrangements in creating a station listening experience. For example, a central server 10 may evaluate the tempo changes from song to song in the user created playlists, and arrange the songs in a station playlist to approximate the tempo changes.

In yet another embodiment, a user may generate content for playback on a given station. For example, a user may generate content, and upload it to the publishing server 30, and specify that the content distributor include that content in a station playlist. Alternatively, the user may generate content and add it to his personal media library for inclusion in a station playlist as discussed above. In yet another alternative, a user may generate content and uploaded directly to the content server 10 for inclusion in a station playlist. Such user generated (or user-created) content may be, for example, a user's own attempt at DJ chatter, or a humorous faux-news report. User generated content may also include content generated by other users. For example, as described in more detail below, the publishing server 30 or central server 10 may contain a variety of user-generated content, and a user subscribing to such content may be able to select such content for inclusion in a station playlist.

Content Player

Figure 12:
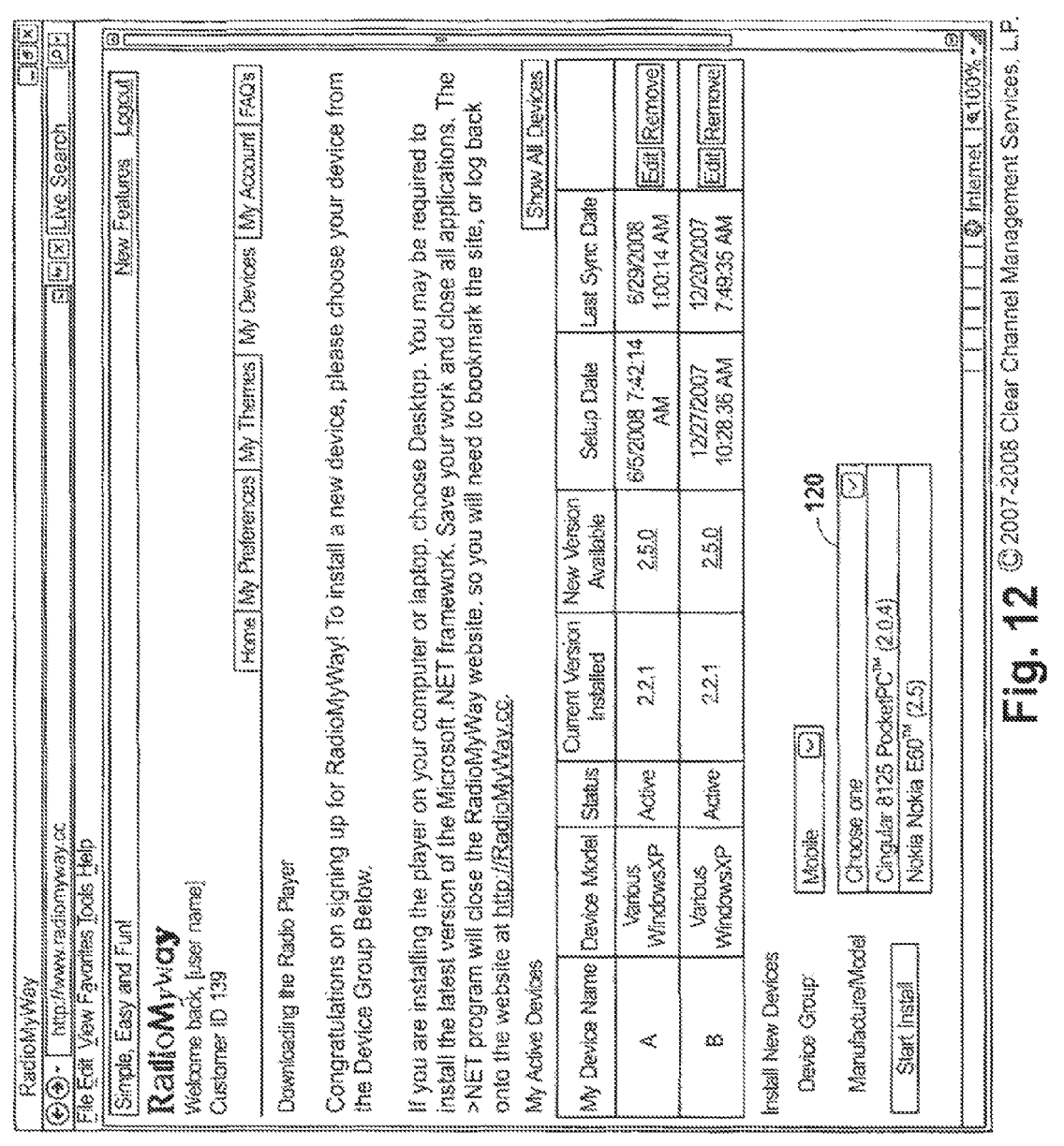

As may be seen in the embodiment of FIG. 12, after the user sets up an account, the content distributor may provide the user with the option of downloading a virtual content player adapted to play content according to the stations configured by the user. The media player may be configured to appear similar to a typical non-virtual radio dial. The content distributor may provide such a media player as a web-based media player from the central server 10. A content distributor may provide a media player in any suitable way, such as by bundling media player, together with other software applications, or factory installing the media player on a mobile media device.

In the embodiment of FIG. 12, users may have the option of downloading a content media player to one or more devices. For example, a user may download the media player to a desktop PC, to a laptop computer, and to a mobile phone. As we discussed below, the user may listen to his stations on each of those devices, and seamlessly switch between listening to those devices. In some embodiments, the content server may evaluate the configuration of the device onto which the media player will be loaded in order to determine if the device meets the requirements to run the media player application.

Figure 13:
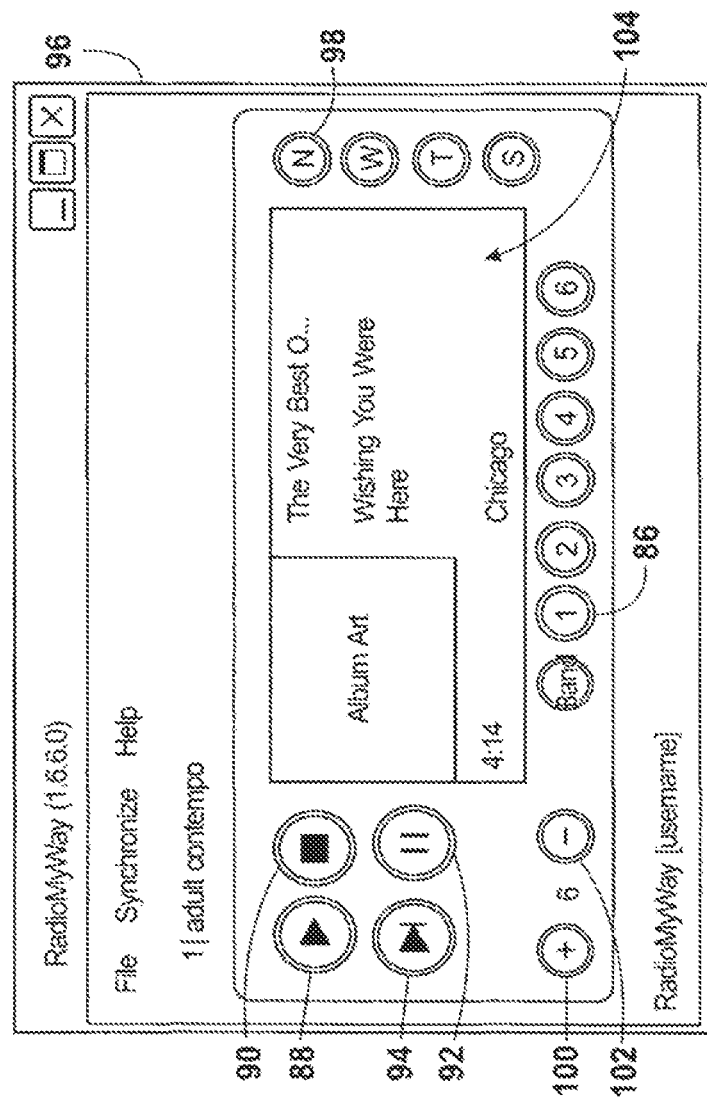
FIG. 13 depicts an embodiment of a content player interface.

FIG. 13 depicts an exemplary virtual radio player interface or content player 96 adapted to play content according to the stations configured by the user. In this embodiment, the interface may provide a number of radio buttons by which the user may listen to the different stations that the user has set up. For example, the user may select Band 1, with which the "Blues/Rock" station is associated, by clicking on the "①" button 86. The user may then click on the "▶" button 88 to begin playing the desired content. Likewise, the user may click on the "■" button 90 to stop play, click on the "||" button 92 to pause play and click on the "▶|" button 94 to skip to the next song. In one embodiment, the central server 10 may allow the user to skip as many songs as the user desires. Preferably, a user will not be allowed to skip commercials. The user may switch between different bands to listen to the different stations.

To listen to perishable content, the user may either wait until the time specified by the user, e.g., at the top of the hour or at a time certain, or play the perishable content on demand by clicking one of the buttons on the right-hand side of the player display 96. For example, if a user clicks on the "N" button 98, news from the selected local station will immediately begin playing. The "N" 98, "W", "T" and "S" buttons on the right side of the media player 96 may be associated with news reports, weather reports, traffic reports and sports reports, respectively. In various embodiments, those buttons may be assignable (by the user or content distributor) to other types of perishable content, and that other buttons may be provided.

In this example, the user interface may also allow the user to rate the song that is being played on a scale of 1 to 10. The user may click on the "⊕" button 100 to raise the rating, and click on the "⊖" button 102 to lower the rating. Rating the songs in such a way allows the application to adjust the song mix, according to the user's preference.

Figure 14:
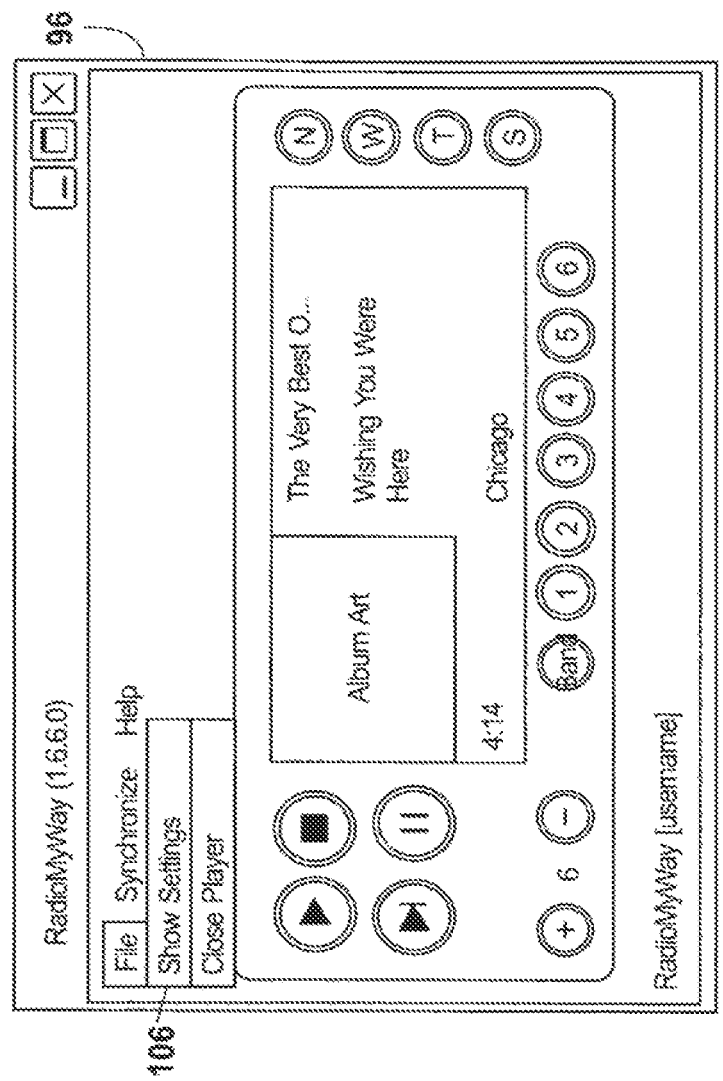
FIG. 14 depicts the settings menu of the embodiment of FIG. 13.

The radio player interface also provides a display area 104 in which the song title, artist and duration of the song may be displayed. Other information may also be displayed, such as the album in which the song may be found, and the album cover art. Additionally, artist information may be displayed. In one embodiment, the user may click on the displayed album cover, which will then launch a web site from which the user may purchase the album. In one embodiment, a content player may incorporate a "Buy it Now" function to allow a user to click on the song title, which will then launch a web site from which the user may purchase the song (or other content, as the case may be). As noted above, "shopping cart" functionality may be provided to facilitate such purchases. In one embodiment, the user may click on the artist's name, which will then launch the artist's web site. The display area of the radio player interface may also display a scrolling "marquee" or "ticker" of information, or visually inform the listener of an alert that may pertain to the geographic location of other perishable content. For example, a NOAA storm warning may scroll across the display area to warn the user of inclement weather conditions in the geographic location to which the perishable content pertains. As shown in FIG. 14, using the radio player interface 96, a user may also view and adjust the player settings as indicated at 106.

Figure 15A:
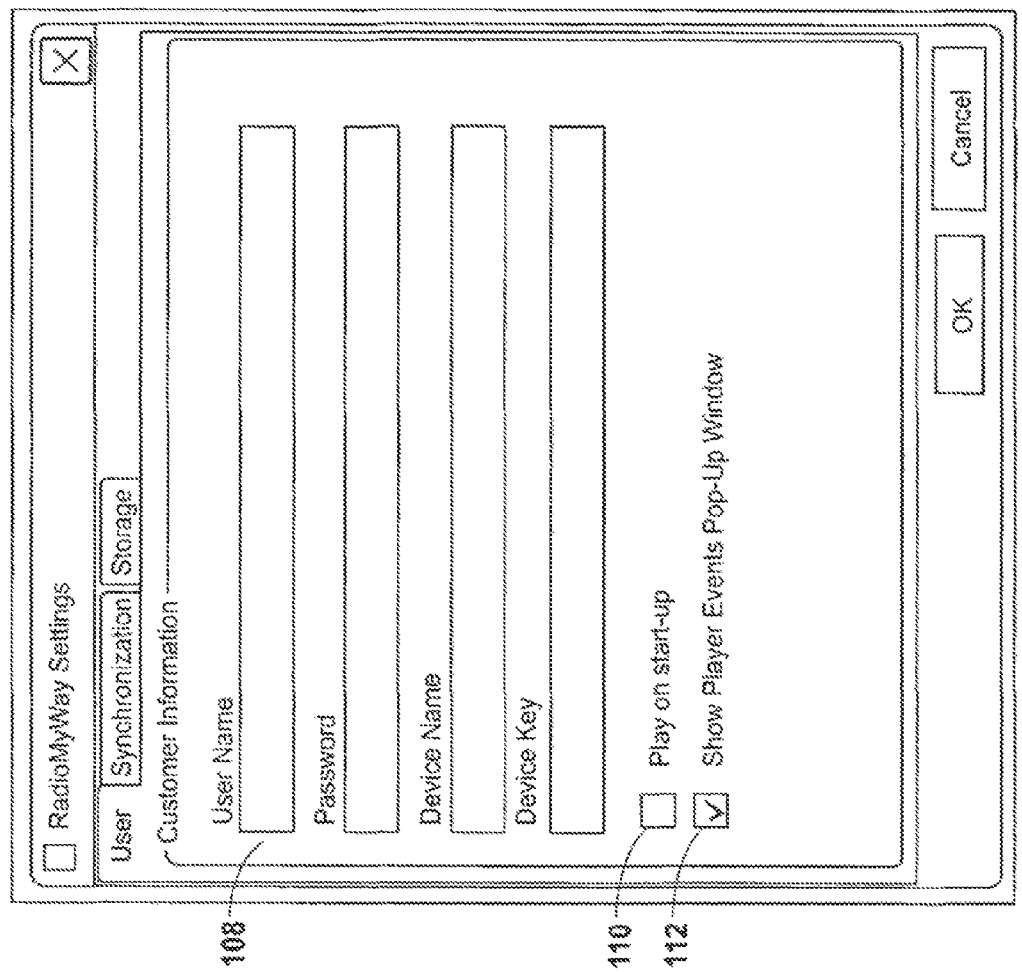
FIGS. 15A-15C depict an embodiment of interfaces that may be provided for a user to manage content player settings.
Figure 15B:
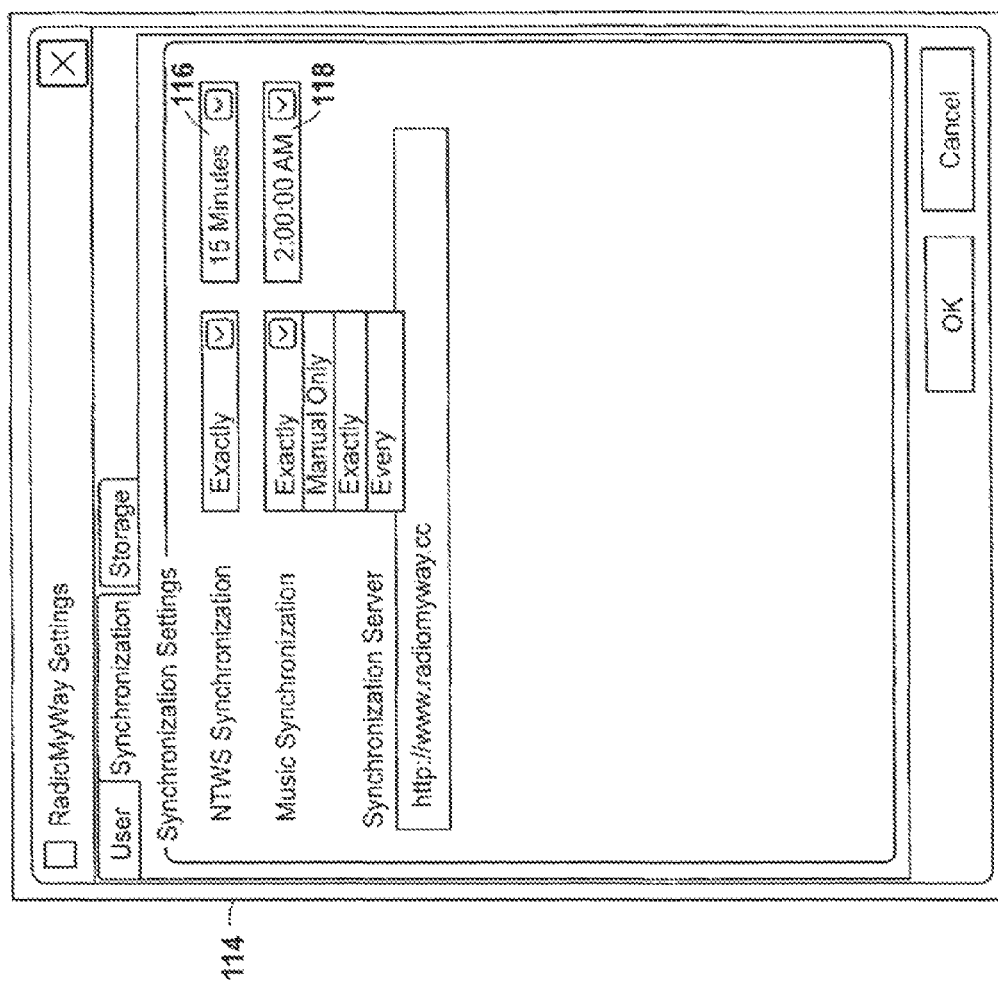
Figure 15C:
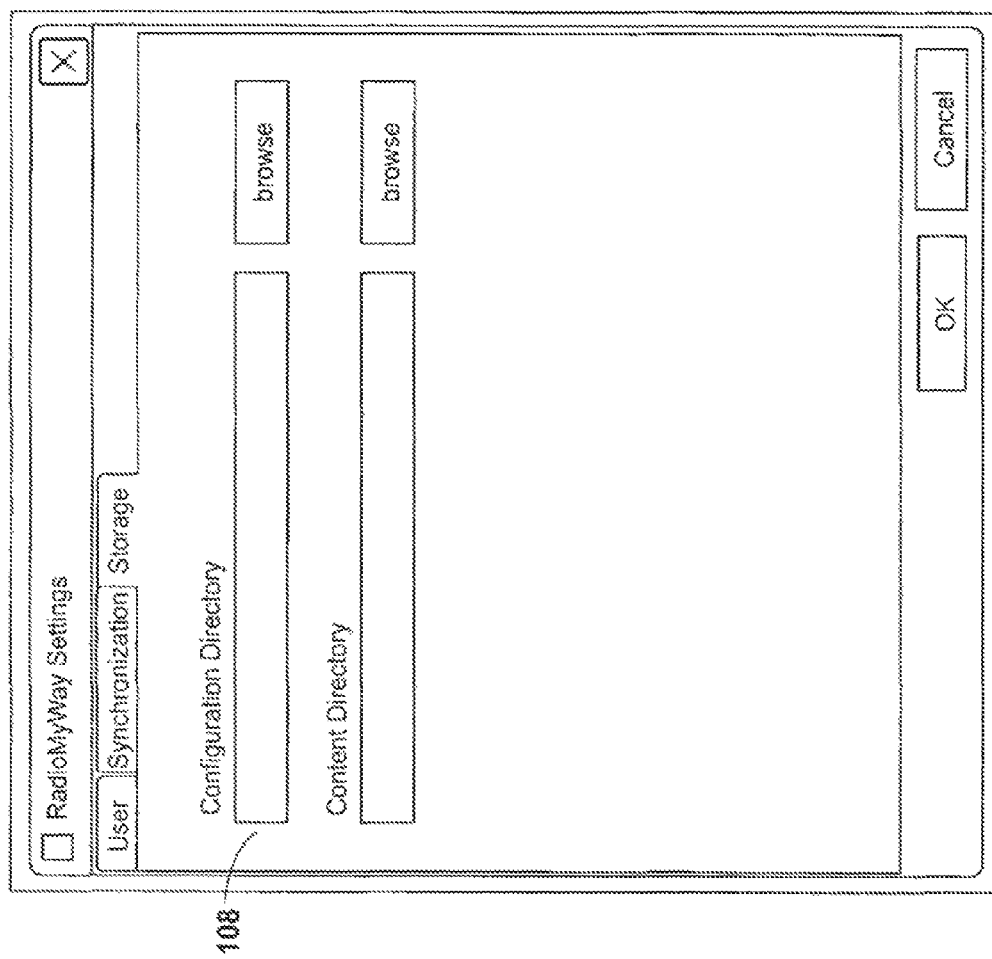

FIGS. 15A-15C illustrate one embodiment of user interfaces for accessing the user settings. A user may verify his account name in box 108 and other information, and designate whether the radio player interface should be launched on start up using check box 110, e.g., when the desktop computer 12 or mobile device 14 is powered on. The user may also specify by using check box 112 whether a window will pop up to indicate to the user that the media player is synchronizing with the central server 10.

Referring to FIG. 15B, the user may also verify and adjust the synchronization settings as indicated at 114, and specify the server, e.g., the central server, with which synchronization is to take place. Likewise, the user may specify whether synchronization takes place at a particular time, whether the user may manually force synchronization, or whether synchronization should take place at particular time intervals. In this example, the user may specify that the perishable content should be synchronized every 15 minutes using drop down menu 116, i.e., the media player should check for new perishable content every 15 minutes. The user may also specify, for example, that the music selection should be synchronized or updated at exactly 2 a.m. each day using drop down menu 118. Those having skill in the art will recognize that synchronization may be two-way. The application may synchronize with the central server 10 to obtain fresh content, and a central server may receive updated user configuration information. Generally, the synchronization process obtains station schedules from the central server 10, and downloads or streams the needed music and commercial content to the player. As users listen to their stations, the player may check for the most recent versions of their configured perishable content and play it. Each synchronization may update the station schedules on the player by replacing the played portion with new music content. During synchronization, the history of the songs played on the station is returned to the central server 10 so it can be reviewed by the user and be available for overall application reporting purposes. Once synchronization is complete, additional schedule content may be generated to replace what has been put on the player. That new schedule content may then be available for subsequent synchronization.

Figure 16:
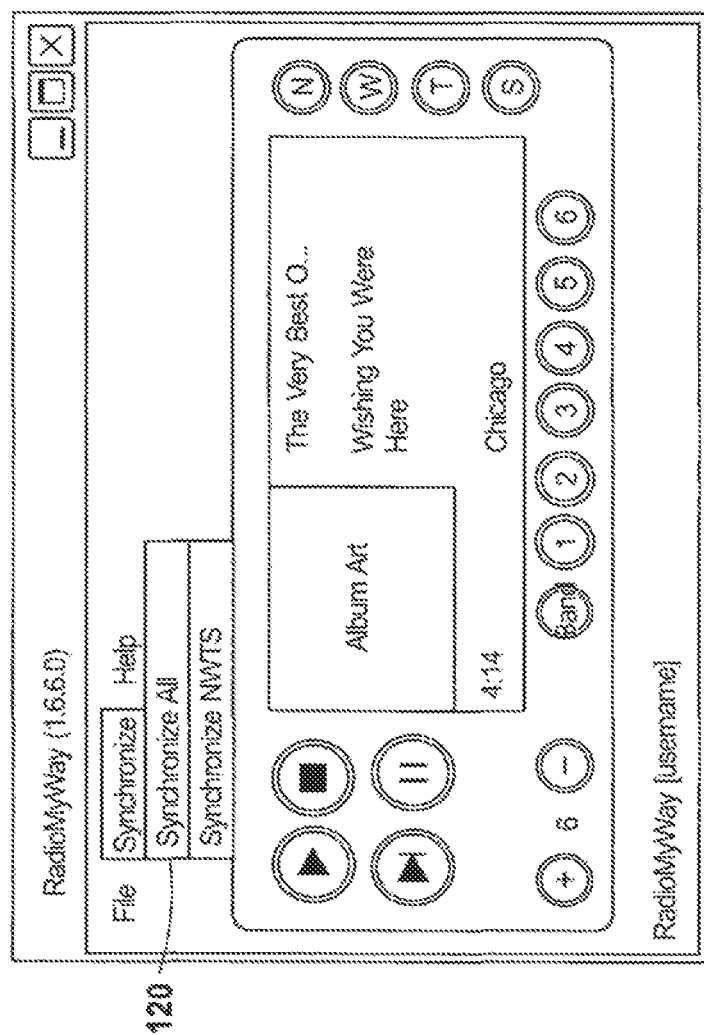
FIG. 16 depicts the synchronization menu of the embodiment of FIG. 13.

Unlike playback of content, synchronization requires connectivity to the central server 10 and its processes, and can only take place when the user device is connected to a network. Those having skill in the art will recognize that such connection may be wireless. Various levels of synchronization may be provided depending upon the speed and quality of the network connection. The radio player interface may also provide a way for the users to force a synchronization of the player with the central server 10. In the embodiment of FIG. 16, a user may synchronize with respect to all content, or may synchronize only with respect to the perishable content using drop down menu 120.

The user may also verify or designate the computer directory in which various configuration files are to be stored, as well as verify or designate the computer directory in which the music for the radio "station" is to be stored. For example, while the media player is playing content, the media player records the history of content played and stores that history record in the designated computer directory. The play history may also include information about the device on which the content was played. In that manner, the central server 10 may track when content was played, on which device the content was played, which songs were skipped, which perishable content was used, song ratings, and the like. During synchronization, the play history may be provided to the central server 10.

Figure 17:
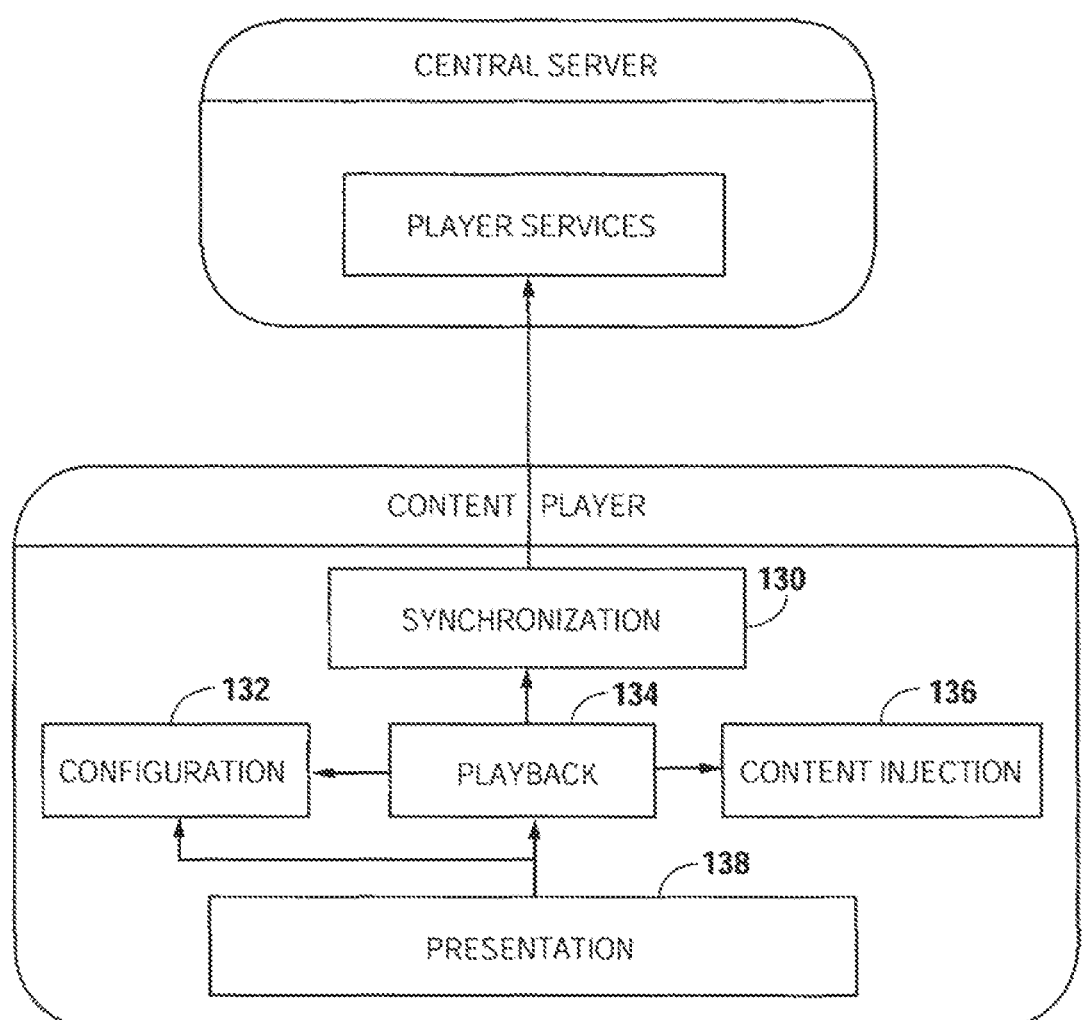
FIG. 17 depicts an exemplary content player architecture.

In one embodiment, a content player may be provided with the exemplary architecture shown in FIG. 17. A content player may include five primary components, namely, a synchronization component 130, configuration component 132, playback component 134, content injection component 136 and presentation component 138.

A synchronization component 130 may run as a background task and be responsible for obtaining user subscription settings and downloading user content. The synchronization component 130 may mostly sleep, waking up periodically to determine whether it should check for updated perishable content to perform an entire synchronization. This determination may be based on user configuration.

A configuration component 132 may be responsible for managing access to user and system configuration information. The system configuration information may be updated during each synchronization. User configuration data may be edited by the user and stored locally, e.g., as XML.

A content injection component 136 may be responsible for evaluating the current state of the system to determine whether commercials or perishable content should be injected or not. Near the end of each song, the playback component 134 may call the content injection component 136 to see if it should add commercials or perishable content to the top of a playlist. The injection of commercial content may be based on system settings that are associated with a user's subscription type. The injection of perishable content may be based on settings that the user specifies either via a PML application/website or other content distribution system website.

The playback component 134 may control the current station playlist and the audio playback threads. It may use multiple audio playback threads to handle various radio-like transitions, e.g., the cross-fading feature. For example, a song may be played with the first audio playback thread; the thread will raise an event when the song is nearing its end. This event may signal the playback component 134 to check for injectable content then play the next item in the playlist by launching a second audio playback thread.

A presentation component 138 may be responsible for rendering a player interface to the user and reacting to user actions. The presentation components may also work closely with the playback component 134 so that it may correctly display the current playback state.

Mobile Devices

Figure 18:
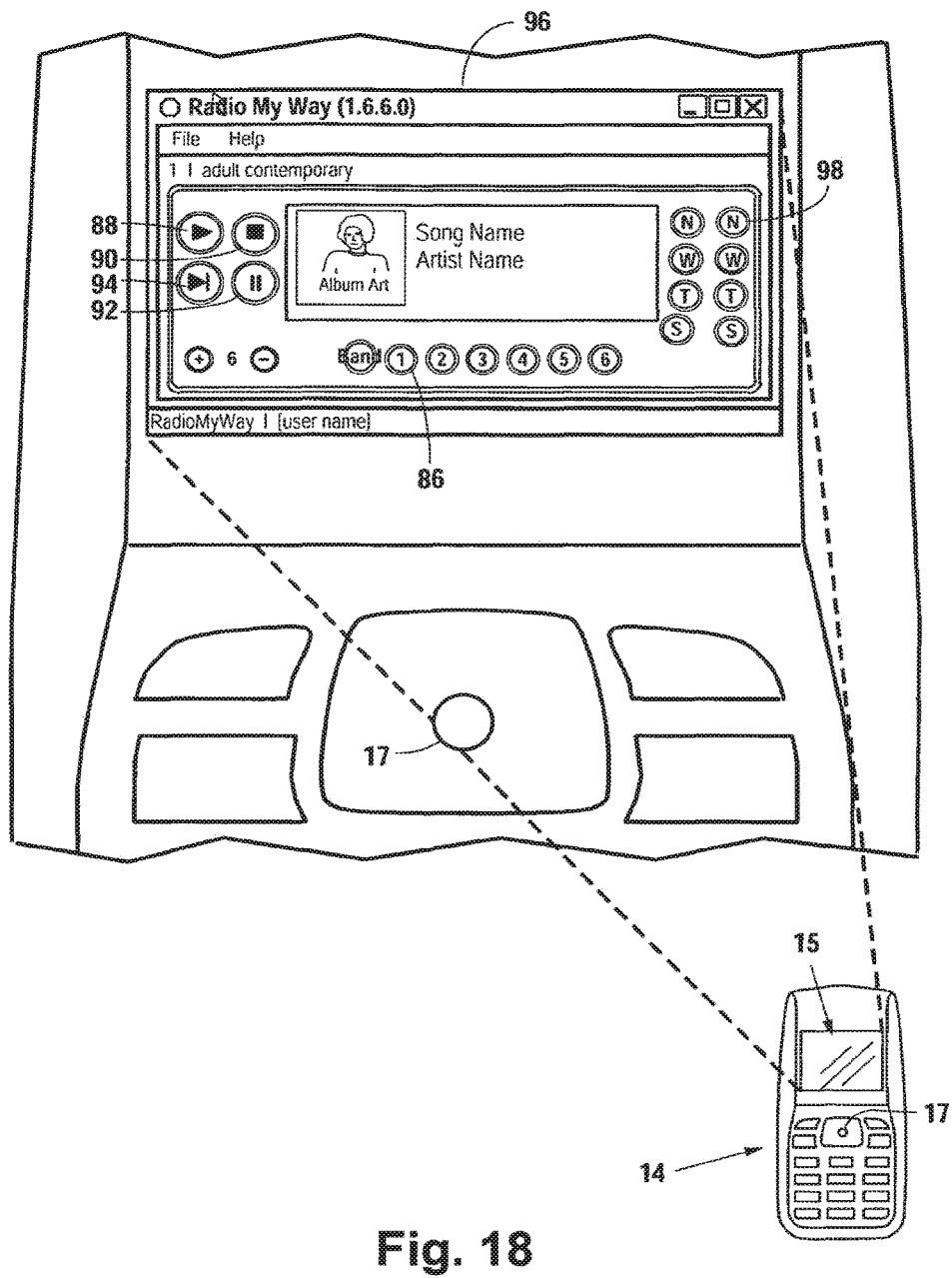
FIG. 18 depicts an embodiment of content player interface for a mobile phone.
Figure 19:
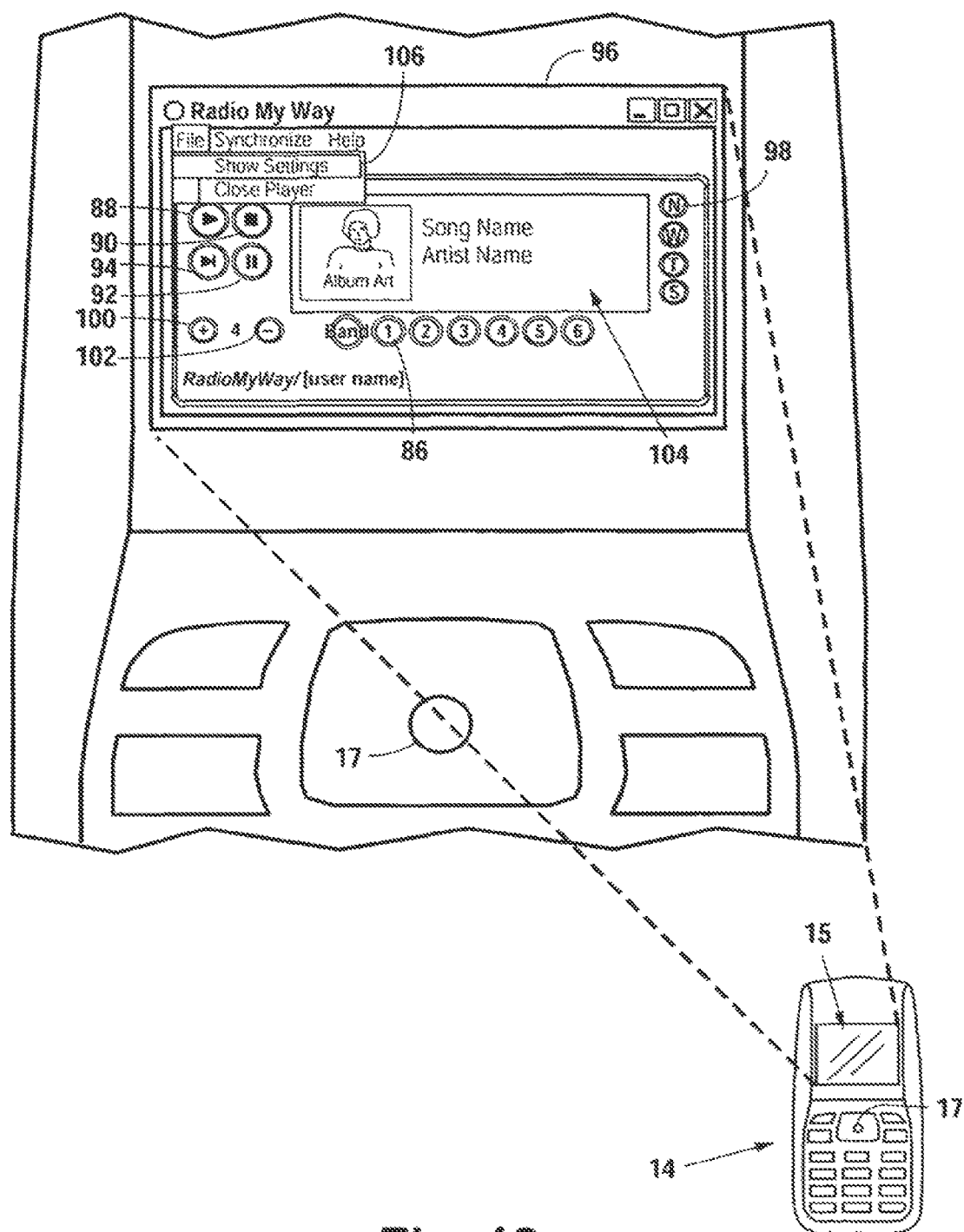
FIG. 19 depicts the settings menu of the embodiment of FIG. 18.
Figure 20:
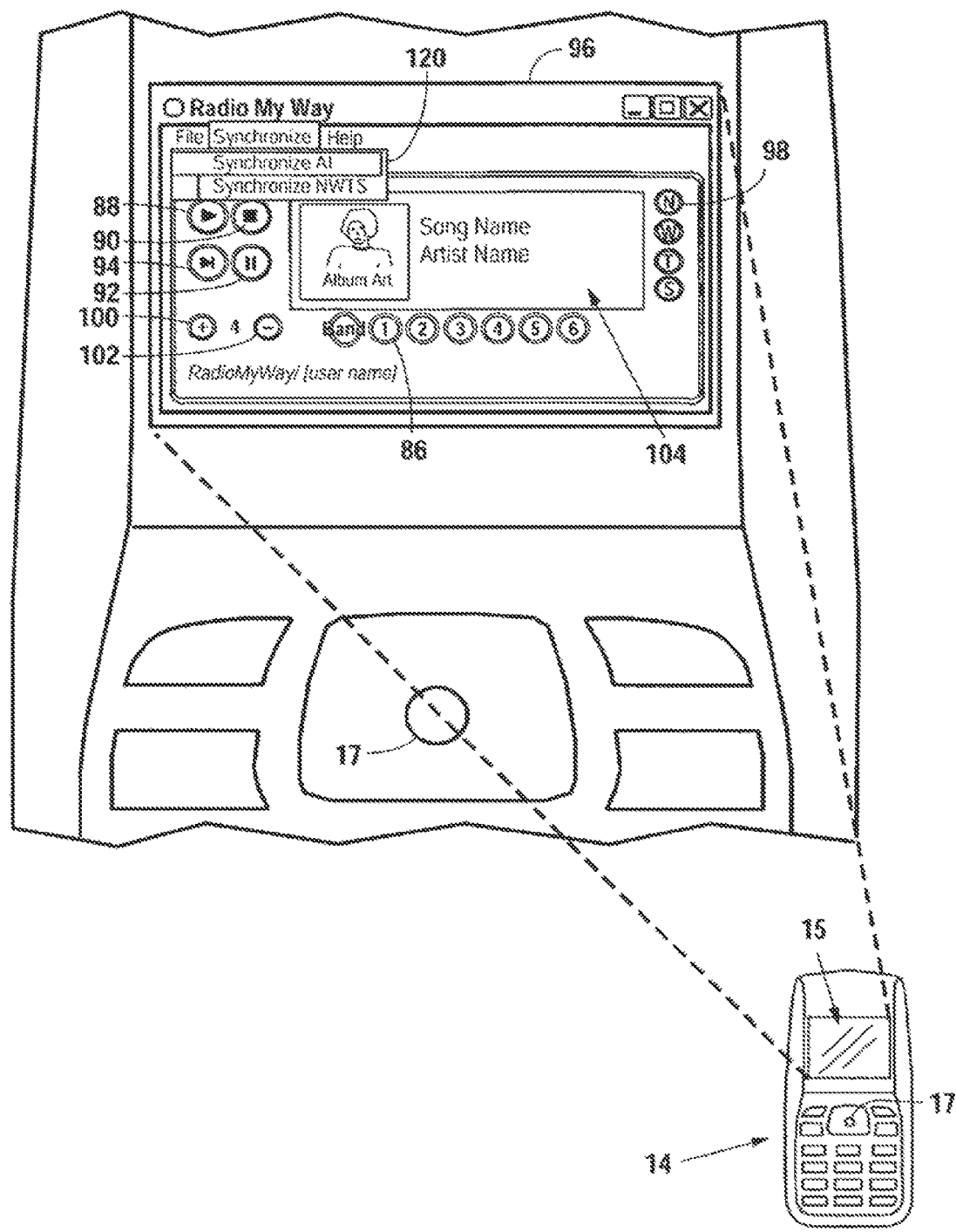
FIG. 20 depicts the synchronization menu of the embodiment of FIG. 18.

In various embodiments, a content player may also be provided to a user's mobile devices. In the embodiments of FIGS. 18-20, such a mobile device comprises a mobile phone. In that embodiment, a content player application may be provided from the central server 10 over a cellular telephone network to a user's cellular phone 14. The application may be adapted to run on a mobile phone operating system, such as, but not limited to the Windows™ Mobile Operating System, or a Symbian™ Operating System such as the Symbian™ Operating System 9.1. Likewise, the application for providing a radio-like experience may be downloaded from a central server 10 to a personal electronic device, such as a PDA. The application may be adapted to run on the personal electronic device's operating system. Such operating systems may include, for example, Windows Mobile/CE, OS X and Palm OS. Also, applications for a mobile telephone and for a personal electronic device may be software sold to or downloaded by user, or provided as already installed on the device when purchased from a retailer. Themes and stations may be set up on a mobile device 14 in the same manner as set up with a desktop computer.

As described above, a user may define the devices on which he is running each instance of the application for providing a radio-like experience. In the example shown in FIG. 12, the user may have two desktop devices, A & B, from which he may access his account. The user may also specify mobile devices, such as cellular phones. Using drop down menu 120 (FIG. 12), in this embodiment a user may specify a mobile device as an additional platform on which to run the application, such as a Cingular™ 8125 PocketPC™, a Nokia™ E60 (2.50), a Nokia™ E70 (2.50), or a PalmTreo700W (2.0.4). A user may be prompted to install the application on the device after choosing the specific device, and an installer application may be transmitted to the user's mobile device 14 (FIGS. 18-20) for installing the application. After the user downloads the application onto the device 14, a user may choose whether to enable manual or automatic synchronization with the desktop instance or with the central server. Such synchronization may allow a user to seamlessly switch from listening to a desktop instance of the application to a mobile device and may be accomplished, in various embodiments, through a wireless Internet connection or some other suitable connection. If the application is installed on the selected device 14, the server may be adapted to recognize the device 14 selected by the user and synchronize content with that device 14, as indicated by the user in set-up (either manually or automatically). Of course, various cellular phones or mobile devices 14 may be adapted to run the application. For example, the application may be adapted to run on a cellular phone or other mobile device 14 having (in example of a Nokia™ E70 cellular phone) 60 MB of memory, a miniSD™ memory card, with a display 15 having an active color matrix and a resolution of 352×416 pixels, and having the following connectivity: Integrated WLAN (IEEE 802.11g) (also known as Wi-Fi), USB (USB 2.0), Bluetooth™ version 1.2, Pop-Port connector (or a similar connector for supporting a hands-free microphone, and stereo speakers), and Infrared. The application may be synchronized using a Wi-Fi connection to or cellular signaling with a network.

Whether the user uses only the desktop application, or uses both a desktop and mobile application, the user may create a single user account (or multiple accounts, if desired) that may be accessed through every instance of the application. For example, a user may be seated at his desk listening to the desktop instance of the radio application, and, if in synchronous communication with the central server 10, continue listening on his mobile device 14 to the radio experience when he leaves his desk. In one embodiment, switching listening from one device to another may be substantially seamless to the user, e.g., there may be very little time lag or play back gap. In various embodiments, the content player interfaces shown in FIGS. 13-16 and 18-20 may be programmed to appear in a display screen 15 of a user's cellular phone or other mobile device 14 such that the user may control and play their personalized radio experience directly from a cellular phone or other mobile device 14. The various buttons in the virtual radio player interface 96, such as, but not limited to, the "①" button 86, the "▶" button 88, the "■" button 90 to stop play, the "||" button 92, and the "▶|" button 94, may be selected using a joystick, a trackball, or any other hardware component 17 associated with the cellular phone or other mobile device 14. In various embodiments, the number or character keys on a cellular phone or other mobile device 14 may be programmed to correspond to the various buttons in virtual radio player interface 96. A user's cellular phone or other mobile device 14 may have speakers adaptable to play the user's personalized radio experience at a suitable volume such that a user may place the cellular phone or other mobile device on a desk or other surface and listen to the radio station while working, studying or doing some other activity. Alternatively, a user may plug in headphones to a mobile device or use a Bluetooth™ earpiece to listen to his personalized radio experience.

User Created Content

As noted above, content specified for playback on the media player may include user created content. A user may, for example, set up a station solely for playing user created content, or may elect to have user created content inserted as personal content into a station set up for, e.g., music.

User created content may be of any type and from any source. For example, a user may create an audio blog or an RSS feed, record a speech, or read a narrative. Also, organizations, such as schools and business, may create content, such as bulletins, flashes, or news releases, for distribution.

With reference to FIG. 2, the user may upload the user created content to the publishing server 30 for inclusion in a common repository. The publishing server 30 may rely on a content database 18 to store the user created content, and rely on virus protection software to screen incoming files. Encryption may also be used to ensure the security of sensitive content.

A common repository, such as that provided on publishing server 30, may comprise a user-built "library" of audio content that may be categorized and organized in various ways for ease of retrieval and aggregation. The repository may grow as users add content (e.g., user-created content) and may be searchable. The user who uploaded a file may specify access restrictions for that file, or audio distribution lists. Other users may search for and retrieve content in the repository (depending on the user's level access), and may further request that content from certain authors be automatically injected into a particular station on their media players. The publishing server 30 may rely on a configuration database 34 to store user profile and configuration information.

Thus, in one example, the system provides a means for registered organizations or users to publish audio content to the repository. For example, a director in a multi-level distributing company or a franchisor may record a motivational message and upload the message to the publishing server 30. The director may further grant authorization for a specific group of users to access the message, or specify that the message be automatically distributed to a group of users at a certain time, or upon occurrence of a certain event. The company's product distributors or franchisees may access the message by clicking on a station set up to receive such content, or retrieve the message by accessing the publishing server 30 and downloading the message.

Other Back-End Functions and Services

In one embodiment, the central server 10 may provide a unique schedule for each station to provide a particular listening experience. Such a schedule may be used as a guideline to play the content of each station, and may contain music content, talk show content, DJ chatter content, radio long program content, commercial content, perishable content, user generated content, and any other content suitable for the station as customized by the user. Preferably, the central server 10 may apply DRM/DMCA rules to content played by the content player. Thus, a content schedule may include rules that force compliance with DRM/DMCA rules. For example, a song by a given artist may be scheduled for play only one time during a scheduled one-hour block of time. The central server 10 may limit which, and how often, content elements may be skipped in a scheduled one-hour block of time. The central server 10 may further track and report content played and skipped to facilitate royalty management. In one embodiment, such royalty information may be provided to a third-party content provider. Content may be counted as played when a user listens to a certain amount of the content. For example, if a user listens to half of a song before skipping to the next song, the song may be deemed to have been played for royalty purposes. The same rules may apply to commercials and talk show content. Preferably, the information may be reported when the user devices synchronize with a central server 10. In various embodiments, the application used to schedule a user's personal media library may be different from the application used to provide the media player interface.

Furthermore, station schedules may be adjusted to accommodate the various capabilities of a device. For example, a user's desktop computer may have greater capacity for and capability of storing and playing content than a handheld device. A content schedule may be provided to different devices with different capabilities, by altering for example, content format and compression ratio. In some embodiments, various user devices have different location tracking capabilities, settings, and options, and providing local content to a "roaming" location can, in some instances rely on the location tracking capabilities and settings of particular devices. In some such embodiments, if location tracking on the user device is unavailable or blocked, an IP address to which a custom media station is being delivered can be used to obtain a rough guess as to the user's location, unless the user has also disallowed this form of tracking. If a user has requested add-in blocks from a current/roaming location, and the current/roaming location is unavailable, the system can use the last known location of the user, or the system can default to a "static" location associated with the user, for example the home address obtained during registration, or the like.

In one embodiment, synchronization of a user device with the central server 10 may involve a number of activities. Played content based on DMCA rules may be reported to the central server 10. Played content based on DMR rules may be reported to the central server 10. Skip content may be reported to the central server 10. Scheduled subscription content, not already existing on the device, may be copied to the device in the format specified by the user (if there is available space on the device). Content that the user rates or provides feedback for may be reported to the central server 10. If content has changed from subscription to purchase content, DRM rules may be changed with respect to the purchase content before it is downloaded or streamed to the user device. The buffer or storage space in a user device may be checked. Played content may be replaced with new content or a new content schedule. Perishable content may be updated.

Figure 21:
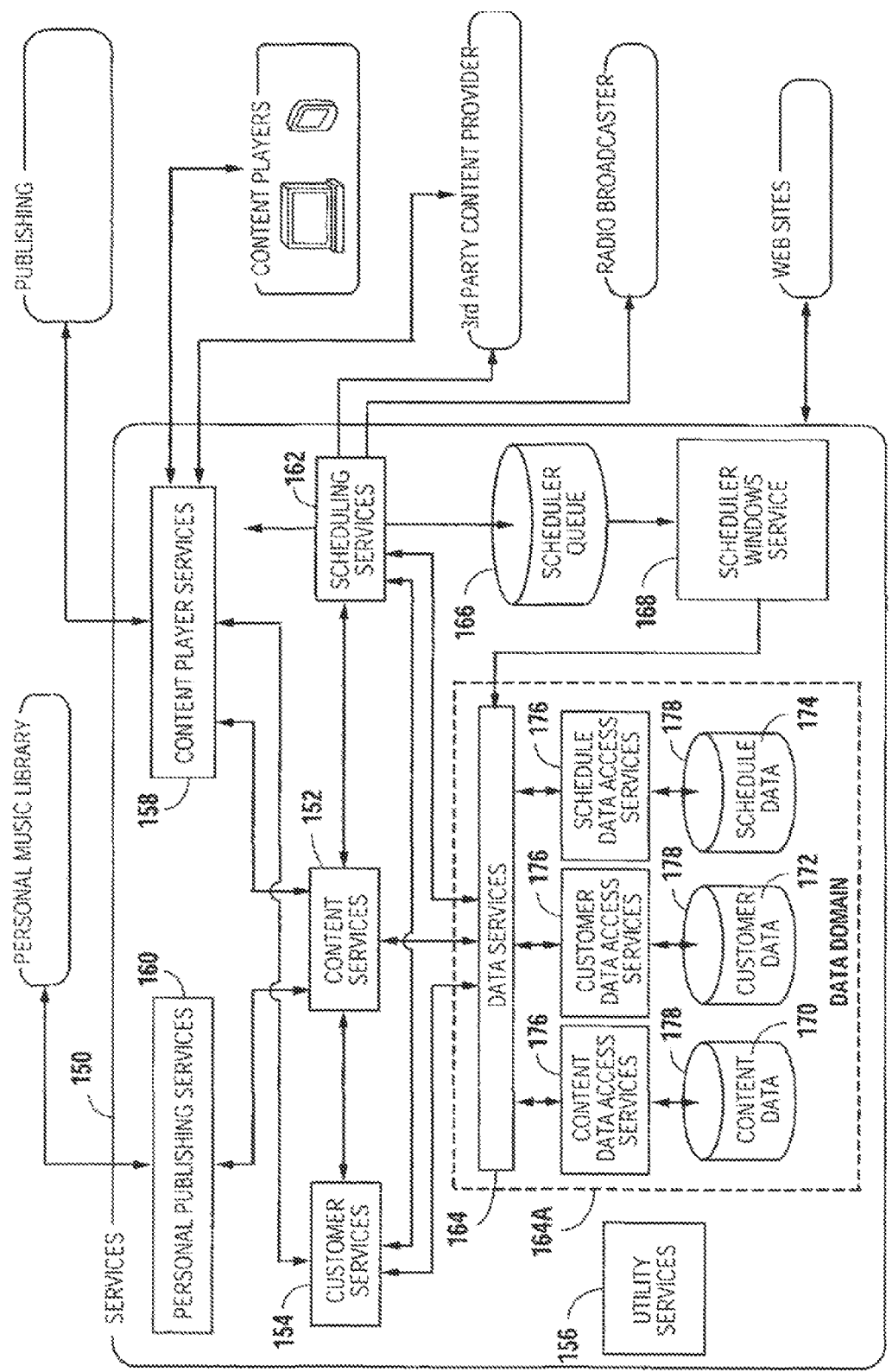
FIG. 21 depicts an embodiment of a functional diagram of a content distribution system services component.

As discussed above, a services component may, in one embodiment, provide a centralized location for accessing common content distribution system business logic and data storage functionality that is needed by all content distribution system components. In the content distribution system services embodiment 150 of FIG. 21, the services component may provide the core of the content distribution system. These services may be grouped into seven independent service centers, namely, Content Services 152, Customer Services 154, Logging Services 156, Content Player Services 158, Personal Publishing Services 160, Scheduling Services 162 and Data Services 164, that each provide unique operational and behavioral functionality. Such division allows each service center to be readily adaptable, easily distributed, and highly scalable. One embodiment of those service centers is illustrated in FIG. 20 and described in more detail below.

Content Services 152 may isolate the process of obtaining content and transforming it into files usable by the content distribution system. This content may be songs, syndicated talk, station programming, perishable, commercial, or most any other type of recoded content. Content Services 152 may obtain content from third party providers, transform the content by transcoding content codecs or container files, and aggregate and cache content metadata to facilitate access to metadata information. By encapsulating this functionality behind a set of generic services, the content distribution system may gain the ability to add or change content providers without impacting other content distribution system functionality.

Customer Services 154 may provide useful business functionality related to a customer, such as login authorization, forgotten login services, and device management/synchronization utilities.

Utility Services 156 is responsible for providing utility functionality for the content distribution system, such as encryption, configuration, service discovery, and logging may be provided here.

Content Player Services 158 may provide the main interface between the content players and content distribution system services. Content Player Services 158 may support synchronization as well as the acquisition of audio content. Service calls to Content Player Services 158 may be authenticated by means of a device key or user I.D. and password validation, or both. Authentication may be used to prevent unauthorized access to audio content.

Personal Publishing Service 160 may provide access to content available on a publishing server. The content player and PML applications may communicate with the Personal Publishing Service 160 to obtain content meta-data and the actual content item. This service may be responsible for authenticating a user with appropriate credentials to a publishing server.

Scheduling Services 162 may provide a set of services needed for creating, maintaining, and delivering schedule content for each station for subscribing users. To reduce this risk of throughput bottlenecks, Scheduling Services 162 may be segmented into the basic services for obtaining and adjusting schedules, and a Scheduler Queue 166 of prioritized requests that may be read and processed by a Scheduler Windows Service 168. This segmentation may serve to isolate the schedule generation process from the basic service needs. Thus, changes or reimplementation of a schedule generation process may occur without impacting other areas of the architecture. When Scheduling Services 162 receives a schedule generation request, instead of immediately building new schedule content, it may forward the request on to the schedule generation queue 166. This queue may be constantly monitored by the Scheduler Windows Service 168. When the Windows Service 168 discovers a request within the Scheduler Queue 166, it may retrieve it and proceed to generate the schedule information as specified.

Data Services 164 may ensure the consistency and availability of data to all content distribution system services. Data may, of course, include content data 170, user data 172, schedule data 174, and other pertinent data. Data Services 164 may serve as the data abstraction layer for data and provide for the modeling, transformation and transactional synchronization of the data within and across services. Data can be transported, persisted, and used in a variety of formats, e.g., XML, and may be programmatically used by serializing the data into instances of objects. Data Services 164 may essentially hide the persistent state of the data behind the services, which means that the persistence mechanism can be changed without impacting the rest of the content distribution system.

In various embodiments, data may take a variety of forms. In one embodiment, a message architecture may be used to manage data throughout the entire content distribution system, e.g., from initial entry, storage/persistence, modification, transfer/messaging, to eventual reporting and archival. For example, XML or serial representations of XML may be used to insure the integrity and safety of data through data persistence or storage, data transport or transfer, and data usage. Thus, Data Services 164 may transform data from, for example, a transport model into a persisted model (or vice versa), e.g., for storage by Microsoft SQL Server 2005. Data Services 164 may also ensure transactional synchronization of data updates.

By implementing certain functionality behind a single set of services, Data Services 164 may provide a single point of access for all read, write, aggregation, and transformation operations. This may ensure that data is pulled from the correct secure source and it is interpreted consistently, and correctly. Without the Data Services 164, many of the components of the content distribution system may directly communicate with, e.g., an SQL Server, and data integrity and security may be compromised.

Also, implementing a Data Services 164 component may enhance scalability. Typically, databases are easily scaled up (buying faster and larger host computers), but are not easily scaled out. The architecture 164A of Data Services 164 may provide a scale out approach by providing a single set of Data Services that may be invoked by other content distribution system services, as well as a group of content-based Data Access Services 176 that actually interface with content databases 178. Thus, as the load on the Data Access Services 176 increases, they can be scaled out to multiple machines (and even clusters), each with their own segment of the databases. This scaling out is more cost effective than scaling up.

Further, this Data Services 164 approach may also provide a non-tableized view of the data. Data Services 164 may be functionally-based services that ask for or provide large chunks of data that fit within the model exposed by the data architecture 164A. Therefore Data Services 164 may be oriented towards other service components. The Data Services 164 may then transform these requests into calls to the underlying Data Access Services 176 that are more table oriented and fixed to basic CRUD (Create, Read, Update, Delete) operations.

Personal Music Library Architecture

Figure 22:
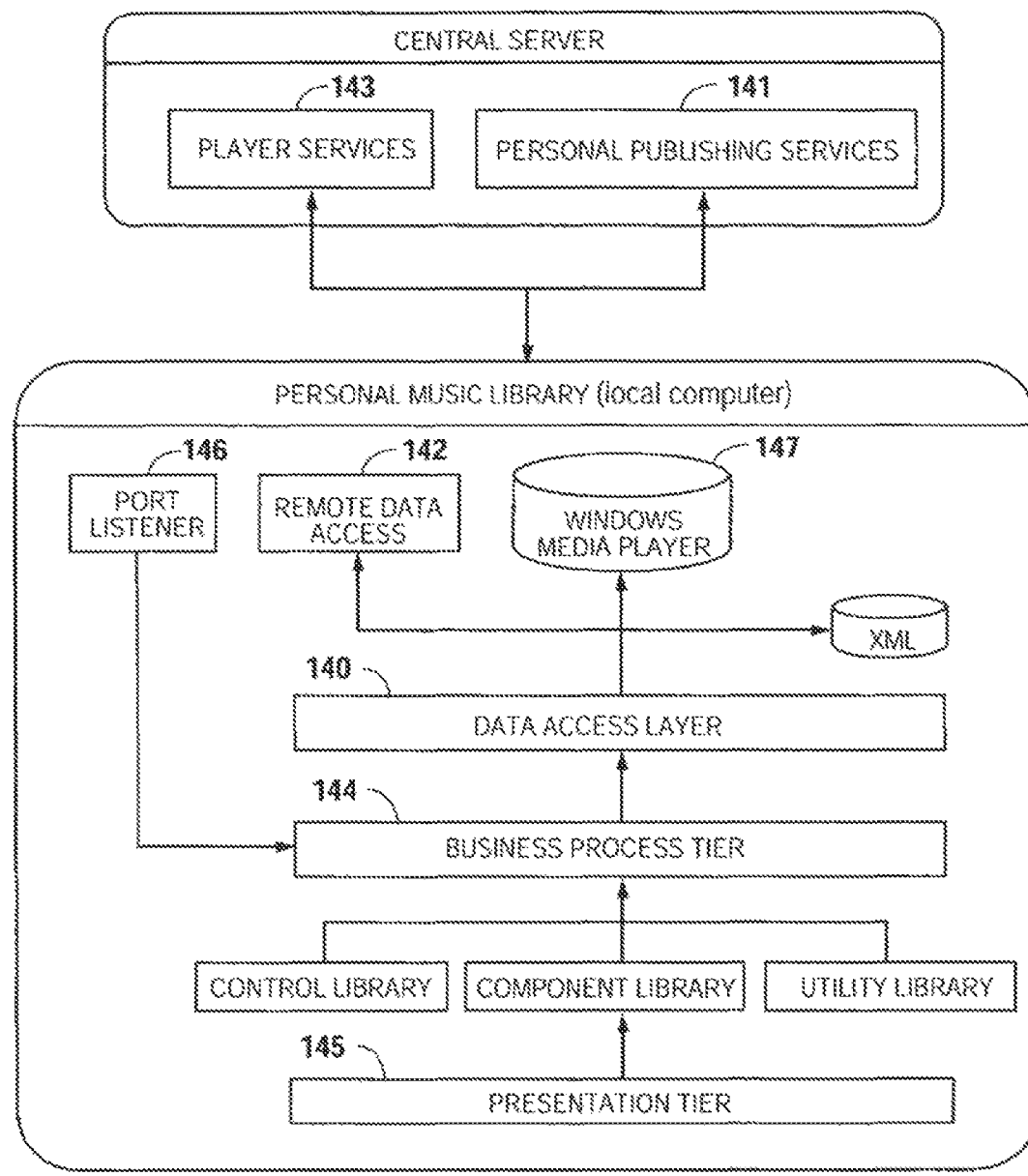
FIG. 22 depicts embodiments of a personal media library architecture.

In one embodiment, a personal music library application may have a tiered architecture as illustrated in FIG. 22. In the embodiment of FIG. 22, a data access layer 140 may use Windows Media Player ("WMP") 147, or some other suitable content player or media management application, as its primary content query source. The data access layer 140 may query WMP 147 for audio content currently on, e.g., the user's computer (or other user device). The user may then be allowed to view their library and organize it into playlists and stations. The station and playlist information may be stored as XML on the local computer.

In one embodiment, the data access layer 140 may query a personal publishing services component 141 for available perishable content. A user's perishable content preferences may be stored as XML on the local computer. Communication with the personal publishing services component may be provided through a remote data access component 142.

The remote data access component 142 may be used to communicate with a content player services component 143. As discussed above, a content player services component 143 is used to authenticate users and to register the current IP address and port number of the local computer.

A business process tier 144 may be responsible for applying and providing business rules to the data and presentation layer, and may validate and format data along with identifying where data is to be stored.

A presentation tier 145 may be responsible for interacting with a user. The presentation tier 145 may be a Multiple-Document Interface (MDI), i.e., there may be one primary windows form that is responsible for hosting other forms.

The presentation tier 145 may communicate primarily with the business process tier 144.

A port listener 146 may be responsible for processing requests from content player services component 143. Content player services 143 may call the port listener 146 when a content player tries to synchronize its content. The first call may be to obtain the player's schedule. Subsequent calls may be to obtain audio content from the local computer.

Add-In Blocks

Add-in blocks can be composed primarily, or entirely, of local perishable content, such as news, weather, or traffic. Reference to "local" perishable content herein should be understood to mean content that is believed to be of particular interest to a particular local or location. Local perishable content can include content that would normally be created and broadcast over-the air by a radio or television station physically located in the general vicinity of a consumer. Thus, a "local news" program created by a Dallas television station would be considered to be "local", while the syndicated national news program would not be considered local, even though it is also broadcast over the air by the same station.

That is not to say that the "local" news is limited to news that has no broader impact beyond the localized area. For example both a national news program and a local news program might both report on a tsunami in Japan. The story presented by the local news program may still be considered local news if the story is written by local writers, presented by local newscasters, or includes commentary that discusses issues that a syndicated news story might not include. Also note that just because a news story is syndicated does not mean that the news story is not local. For example, even syndicated news stories about a wildfire near Cheyenne Wyo. would be considered to be of local interest to media consumers living in or near Cheyenne Wyo.

Figure 23:
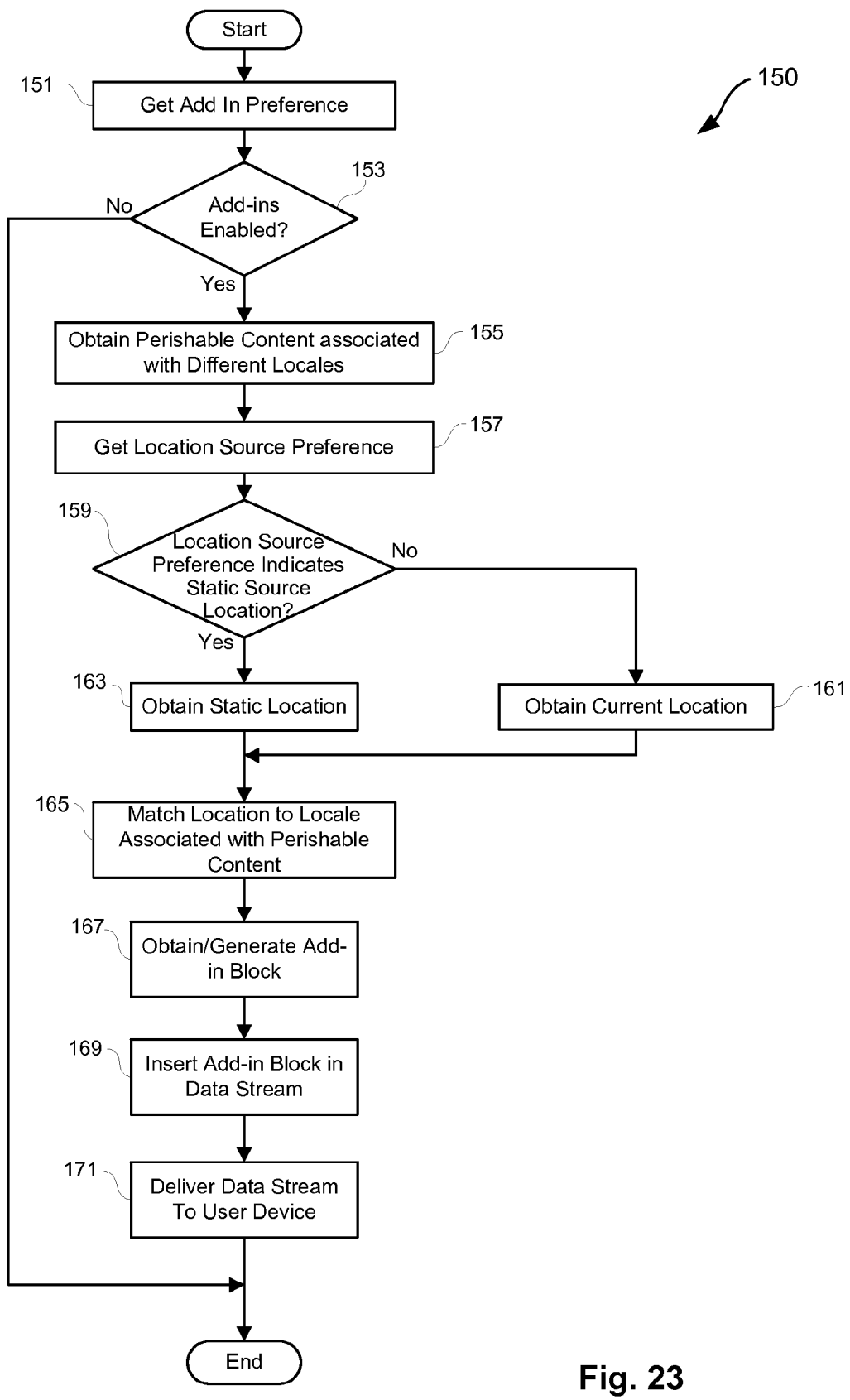
FIG. 23 depicts a method for delivering add-in blocks of perishable content, which can be realized in a system or device configured to implement a media delivery platform according to at least one embodiment of present disclosure.

Referring now to FIG. 23, a method 150 for delivering add-in blocks of perishable content, which can be realized in a system or device implementing a media delivery platform, will be discussed. Method 150 can be initiated in response to a user logging in to a device, such as a smart phone; by a user logging into a service, such as iHeart® radio; by a request from a device to change streams or stations; in response to an update request, as part of a custom media stream or station assembly process, or in response to various other occurrences related to presentation of a custom media stream to a media consumer.

As illustrated at block 151, an add-in preference is obtained. Obtaining an add-in preference can include retrieving a previously stored add-in preference from memory in the same machine that will use the add-in preference, or from a separate machine or service. For example, in at least one embodiment location preferences are stored server-side, and are available to other devices having access to the server. In some embodiments obtaining the add-in preference includes initially obtaining the add-in preference from a user during service or product registration or log-in; or obtaining updated add-in preferences provided by the user after an initial registration procedure. The process of initially obtaining the add-in preference from a user is discussed in more detail with respect to FIG. 24.

As illustrated by block 153, the add-in preference can include information that specifies whether add-ins are to be enabled. In at least one embodiment, add-in enablement is an opt-in process, while other embodiments can employ an opt-out process. If add-ins are not enabled, method 150 ends. If, however, add-in are enabled, method 150 proceeds to block 155.

As illustrated by block 155, perishable content associated with different locales is obtained. Note that in some embodiments, the perishable content is obtained for multiple different locales on a recurring basis, so that the content retrieval shown by block 155 may not need to be performed under all circumstances.

As illustrated by block 157, a location source preference is obtained. The location source preference can include multiple different levels of information, and can itself be included in the add-in preference obtained during performance of block 151.

As illustrated by block 159, a determination is made as to whether the location source preference specifies that the user wants to receive add-ins associated with a static locale, or whether the user desires add-ins to be provided on a roaming, or "follow me" basis, thereby allowing the add-ins provided in the custom media stream to be associated with a current location of the user.

As illustrated by block 163, if the user prefers a static location, the static location chosen by the user can be retrieved from storage or obtained from a service. As illustrated by block 161, if the location source preference indicates that the user prefers a non-static locale for the add-ins, the current location of the user is obtained. Where available, the user's current location can be obtained from the user's mobile device. In cases where the user's mobile device cannot provide the user's location, or where the user has blocked location services, the user's current location can be determined from a communication carrier's home location record (HLR) or visiting location record (VLR) databases, or from a network address to which a customized media stream or station, into which the add-ins are to be inserted, is being delivered. Other methods of determining the user's current location can also be used.

As illustrated by block 165, once the appropriate location to use is identified, perishable content is selected based on a matching process in which a locale associated with the perishable content is compared to the identified location. In some embodiments, there may be more local perishable content that satisfies the locale matching process than can be reasonably inserted into a custom content stream. In some such cases, additional qualifiers, such as user profiles and preferences can be used to pare down the amount of local perishable content. In other implementations, the number of matching content items can be randomly or pseudo-randomly reduced. The number of content items can also be reduced by reducing the geographic area considered to be local. For example, if the user's current location is broadly identified as the Dallas-Fort Worth metropolitan area, but the user is currently located in a suburb of Fort Worth, the locale associated with selected perishable content items can be limited to items local to Fort Worth. Various combinations of limiting criteria can be used to select appropriate local perishable content for insertion into a media stream or custom radio station.

As illustrated by block 167, one or more add-in blocks are generated or obtained based on the match between the locale associated with the perishable content items and the user's location source preference. In at least some embodiments, a media delivery platform including a cloud based service, such as iHeart® radio, receives the perishable content items from a media automation system, such as NexGen®, and assembles the content items into an add-in block to be inserted into a custom media stream or radio station. In other embodiments, a device configured to implement a media delivery platform can send enough information to the media automation system so that the media automation system can generate the add-in blocks, and send the add-in blocks back to the media delivery platform.

The add-in blocks generated or otherwise obtained by the media delivery platform are, in some embodiments, comprised of news, weather, and traffic. If, however, a user desired to hear only traffic information, then an add-in block can be limited to only traffic information. Likewise, the add-in blocks can be limited to any combination of news, weather, or traffic as specified by a user. Each of the perishable content items in the add-in block can be limited only to items of perishable content generated in, or associated with, locales that match the user's specified location source preference.

Regardless of whether the media automation system generates the add-in blocks locally, or receives the add-in blocks from another source, as illustrated by block 169 the media automation system inserts the add-in block into a data stream of a customized media channel or custom radio station. The add-in block can be scheduled to play at times relative to a station start times, for example 15 minutes after a customized station begins to play. In at least one embodiment, the same add-in blocks will be inserted across all different custom radio stations or media streams associated with a particular user, and will likewise be inserted into a custom radio station or media stream regardless of which device the user is employing to receive the custom media channel. In other embodiments, a user can select different location source preferences for different types of radio stations or media streams, resulting in different add-in blocks for different media channel types (e.g. talk or music).

As illustrated by block 171, once the add-in block is inserted into the media stream, the media stream is delivered to the user. In many embodiments, the add-in blocks are inserted during predefined, or scheduled, breaks in presenting non-perishable content to a user. In other embodiments, the add-in blocks can be used as filler to ensure synchronization with a master schedule.

In some embodiments, although not specifically illustrated, a user who is consuming the custom media stream can cause his device to issue a "skip" command, which results in a currently playing perishable content item included in an add-in-block being skipped, and the following item in the add-in block to be presented. In some embodiments, the skip command can result in the entire add-in block being skipped, and the next scheduled non-perishable item to begin playing. A media player presented to the user can also present an option for "skip one" or "skip all."

Figure 24:
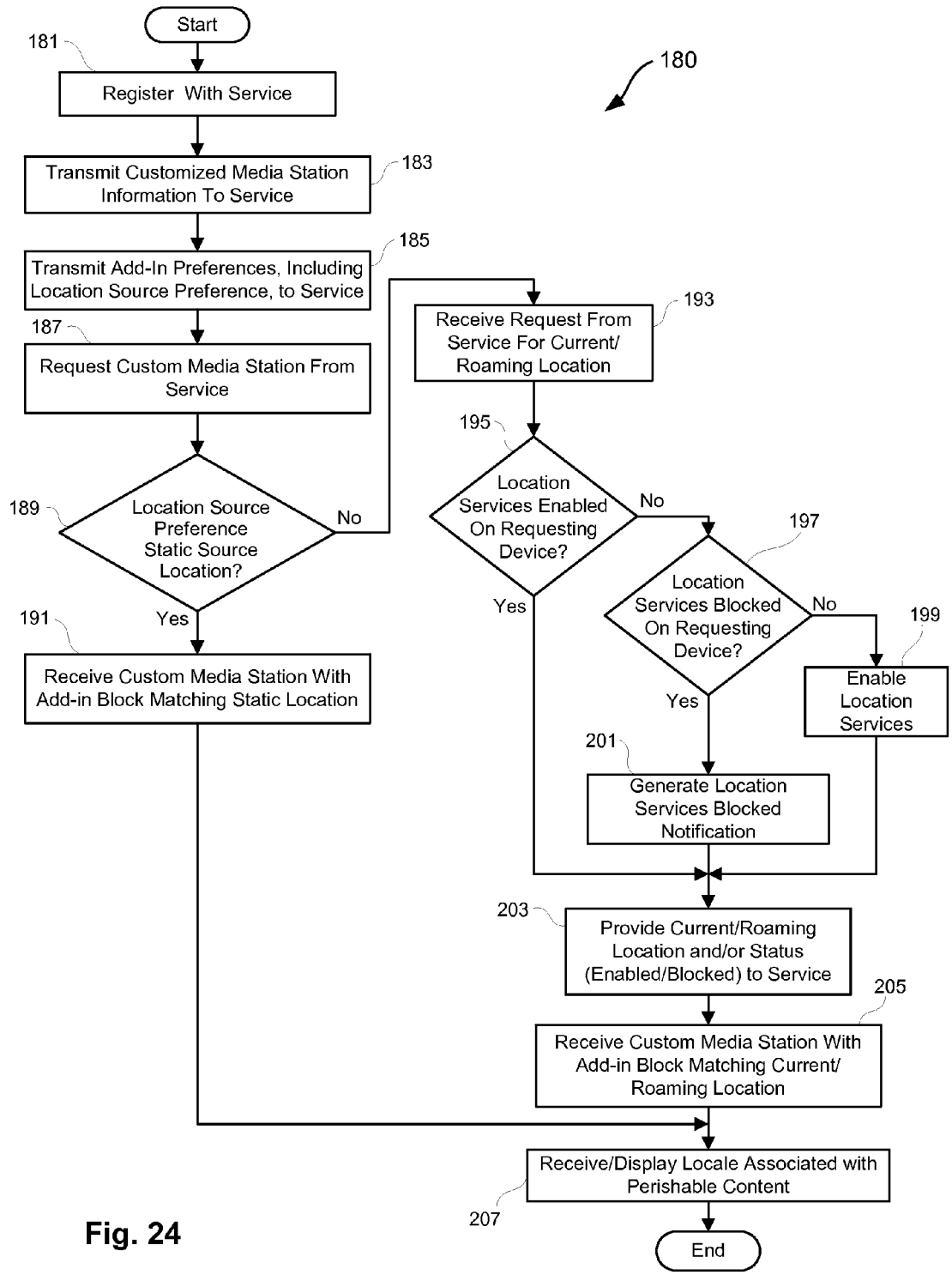
FIG. 24 depicts a method for presenting add-in blocks of perishable content at one or more user devices according to at least one embodiment of present disclosure.

Referring next to FIG. 24, a method 180 for presenting add-in blocks of perishable content at one or more user devices is discussed according to at least one embodiment of present disclosure. As illustrated by block 181, a user registers with a media delivery service or platform using a computing device. This device could be a laptop, a notebook, a smartphone, a tablet, a desktop computer, or the like. The registration can include providing information associated with devices to be registered for reception of streaming media content, and information associated with local perishable content, for example a preference specifying whether or not to receive add-in blocks in custom media streams or customized radio stations.

In some embodiments, registering with a service at block 181 can include instructing a notification or update service to provide personalized, or individually customized, notifications or updates to a media automation system or ad server for insertion into one or more live media broadcast streams. In some cases, the notification or update service can push notifications and updates to the media automation system or ad server periodically, or as the updates become available. In other embodiments, the notification or update service can be instructed to respond to media automation system or ad server requests. In various embodiments, registering with a service at block 181 can include providing login credentials for one or more notification or update services to facilitate obtaining notifications or updates from those services.

In addition to specifying whether or not to receive add-in blocks in media streams, a user can provide preferences related to the content of the add-in blocks during registration. For example, the user can specify a location source preference, which indicates whether the perishable content included in the add-in blocks should come from a static location, or from the user's roaming/current location. The location source preference can also identify the static location, if that option is selected. If the user has not selected a static location, the user's network address can be used to set an assumed/default preference for location. In addition, during registration the user can specify whether certain add-ins should be provided only for particular categories of content. In some embodiments, these values may be set to default values, which are used unless the user changes the values from default. Furthermore, in various embodiments users are provided an opportunity to change these values after registration. The values related to add-in blocks can be applied globally, across each media stream provided to the user by the media delivery service or platform, regardless of the device to which it is delivered.

The media delivery platform or service can also present options to the user regarding customized media stations, many of which have been discussed previously. As illustrated by block 183, the device employed by the user transmits the customized media station information to the media delivery service or platform. As illustrated by block 185, the user's device can also transmit the information regarding add-in preferences, including the location source preference information or notification service identifiers and login information, to the media delivery platform or service. The add-in preferences can be transmitted concurrently with, or separately from, the customized media station information.

As illustrated by block 187, at some time after registration, the user employs one of his devices to request a custom media station from the media delivery service or platform. In some embodiments, at the time the request is received, a determination is made regarding whether the user's location source preference is for perishable content associated with a static locale, or perishable content associated with a locale that matches the user's current location.

As illustrated by block 191, if the user selected the "static" option, the user will receive the custom media stream modified to include add-in blocks associated with a locale matching the user specified, or in some cases default, static location. In association with the custom media station, or embedded within the data comprising the custom media station, the user's device can also receive an indication of the static location used to select the items included in the add-in blocks. As illustrated by block 207, the static location can be displayed on the user's device during the time that the add-in block is being presented to the user.

Returning to the discussion of block 189, if the user selected a "roaming" or "follow me" location source preference instead of the static preference, the user's device can receive a request for the user's current location, as illustrated by block 193. In response to receiving the location request, a check can be made to determine whether location based services are enabled on the user's device, as illustrated by block 195.

In some cases, a user's current location can be within the reach of multiple different markets. Various techniques of selecting the locale with which perishable content is associated can be employed. One such technique includes determining a center of each of the multiple different markets. The market having a center closest to the user's current location can be used as the locale for selecting perishable content. In other embodiments, various selection factors can be used in place of, or in addition to, the "center-point" technique. For example, if one of the multiple markets corresponds to a "home market" or "home locale" associated with the user, perishable content associated with the home locale can be used in preference to other markets that could have been selected. In other embodiments, each of the markets can be weighted based on the revenue associated with the market, based on the size of the market, the number of registered users in the market, or otherwise.

If the location services are enabled, the user's device can provide the user's current location information to the requesting media delivery platform or service, as illustrated in block 203. If location services are not enabled, a check can be made, as illustrated by block 197, to determine whether the services are affirmatively blocked, for example by refusing access to the particular application receiving the custom media station, or if the location services are simply not enabled. If the location services can be enabled on the user's device, they are enabled as shown by block 199. If the location services are blocked, a "location blocked" notification is generated, as illustrated by block 201. As shown by block 203, either the location or the "location blocked" notification can be provided to the media delivery service or platform.

As illustrated by block 205, the user's device then receives the custom media station with add-in blocks that include perishable content associated with the appropriate locale. In cases where the location is blocked, the add-in blocks may correspond to a fall-back static location specified by the user, a default location, a last known location of the user, a location associated with the network address of the user's device, or the like. In some embodiments, perishable content may not be provided. The custom media station transmitted to the user's device can include information about the locale used to select the perishable content, and information about whether a static location, a roaming location, a default location, or a substituted location has been used to select the perishable content.

As illustrated by block 207, the user's device displays the locale associated with the perishable content items included in the add-in block. Other messages, such as "location blocked, please enable location services" can also be presented.

Figure 25:
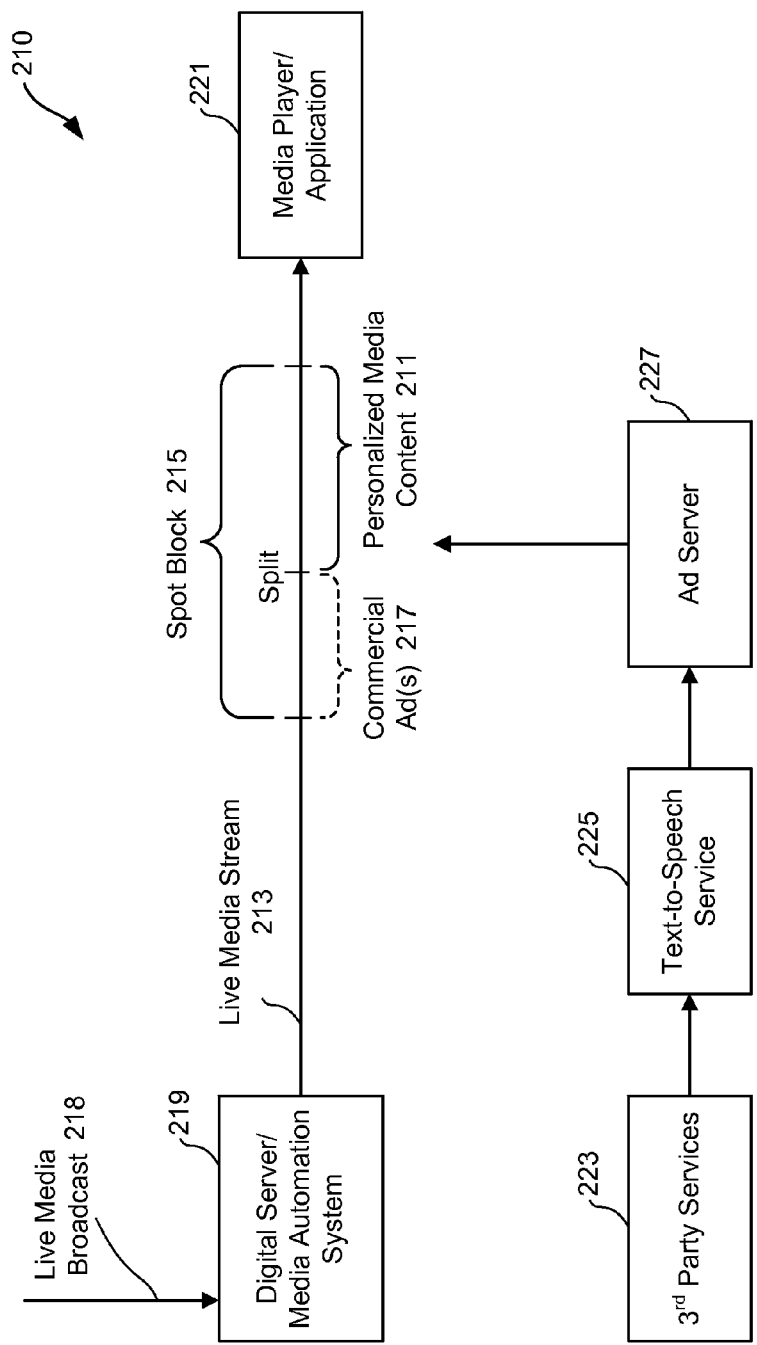
FIG. 25 depicts a system for inserting personalized audio content and notifications into a broadcast media stream according to at least one embodiment of the present disclosure.

Referring next to FIG. 25, a system 210 for inserting personalized audio content into a broadcast media stream will be discussed according to various embodiments of the present disclosure. As illustrated, system 210 includes media automation system 219, which can be used to transmit a media stream to media player 221; third party notification services 223, which can be used to provide text-based notifications for delivery to particular users via various different platforms such as email, short messaging service (SMS), or from within various computer applications; text-to-speech service 225, which can be used to convert notification from third party notification services 223 into personalized media content suitable for inserting into an audio or audio visual media stream; ad server 227, which can be used to provide the personalized media content generated by text-to-speech service 225 to media automation system 219 for insertion into live media stream 213; and media player 221, which can be used to play out live media stream 213, including playing out the personalized media content during spot breaks, so that notifications are provided from within a stream being processed by media player 221.

Media automation server 219 can include server devices, databases, communications interfaces, or other hardware configured to facilitate delivery of streaming media to consumers. In operation, media automation server 219 can obtain a live media broadcast 218, which can include core content and spot blocks, and generate multiple live media streams 213 to be transmitted via a communication network to multiple different consumers. In some embodiments content delivery networks (not shown in FIG. 25) may temporarily store or cache the live media broadcast 218 or live media stream 213. Each live media stream 213 can include core content from the live media broadcast, and spot blocks, such as spot block 215, to be filled with commercial ads 217, personalized media content 211, filler (not illustrated), or some combination of the three. In some embodiments, media automation system 219 is responsible for streaming both core content and the content inserted into spot block 215. In other embodiments, media automation system 219 transmits spot block markers (e.g., at the start and/or end of the spot block, or anywhere during the spot block) that allow another device or system, for example ad server 227, to insert commercial ads 217 and personalized media content 211 into live media stream 213. Media automation system 219 can pause its streaming, or pass control of the stream to ad server 227 during the time ad server 227 is inserting content into spot block 215. In some instances, responsibility for inserting commercial ads can be split between media automation system 219 and ad server 227, with ad server 227 inserting customized content while media automation system 219 inserts universally delivered advertisements.

Ad server 227 can, in various embodiments, provide customized advertisements, customized filler, personalized notifications, or some combination thereof. The customized advertisements can include advertisements targeted to a group of consumers, or targeted to consumers on an individual basis. Likewise, filler can be selected on a group or individual basis, independent of whether the customized advertisements are targeted to a group or to individuals.

In at least one embodiment, personalized notifications originate from third party services 223, are converted to audio content by text-to-speech service 225, and then packaged for delivery to media player 221 via live media stream 213 through ad server 227. For example, if a consumer associated with media player 221 subscribes to an intelligent personal assistant application that provides text-based notifications, the notifications for that consumer can be sent to text-to-speech service 225 for conversion to an audio format. Text-to-speech service 225 can deliver the audio notification, or personalized media content, to ad sever 227, with ad sever 227 delivering the audio notification to media automation system 219. In some embodiments, text-to-speech service 225 can be implemented as part of ad server 227 or third party services 223.

As part of preparing, or packaging, an update for inclusion in live media stream 213, ad server 227 can map received updates or notifications to media player 221 based on login or other information linking or associating a particular consumer to both a media player 221 and a particular third party account. This information can include consumer login information for the third party services 223, login information associated with media player 221, registration information for a streaming radio service, such as iHeartRadio®, or from some other suitable source. In at least one embodiment, media automation system appends, inserts, prepends, or otherwise includes in live media stream 213 information needed to match notifications to particular media players and consumers. In other embodiments, the information needed to associate notifications from third party services 223 with a particular media player 221 can be sent to ad server 227 separately.

Ad server 227 can also modify received notifications during the packaging process to include an intro, such as "and now your third party service updates from 'X'", or to include other information that alerts the user to the fact that specifically customized content is about to be played out.

In other embodiments that are not explicitly illustrated, third party services 223 can send notifications to media automation system 219 or the content delivery network. In some such embodiments, media automation system can include ad server 227, or can include a device configured to provide some or all of the functionality described herein as being performed by ad server 227.

The notifications provided by third party services 223 can include, but are not limited to, various types of pushed notifications or updates, for example television show reminders, calendar alerts, weather, traffic, and news alerts, reservation status, stock ticker alerts, or the like. In other embodiments, notifications or updates can be pulled by ad server 227 from third party services 223, or obtained from a notification "proxy" application that can be used to login to one or more notification services periodically or on an as-needed basis to pull notifications. Obtaining notifications on an as-needed basis can help to limit unnecessary network traffic when a consumer is, for example, not consuming live media stream 213.

In some embodiments, a user can specify that notifications are to be delivered to the ad server 227 or to a notification proxy. Thus, for example, if a user specifies that third party banking text messages are to be sent to a streaming notification proxy (not illustrated) included in media automation system 219 or ad server 227, the banking text messages can be converted to audio and provided to the user during the next commercial break in the core content being streamed via live media stream 213. If the consumer is not currently viewing live media stream 213, a forwarding process can be included in the notification proxy to allow text message notifications to be forwarded to the consumer's device.

Figure 26:
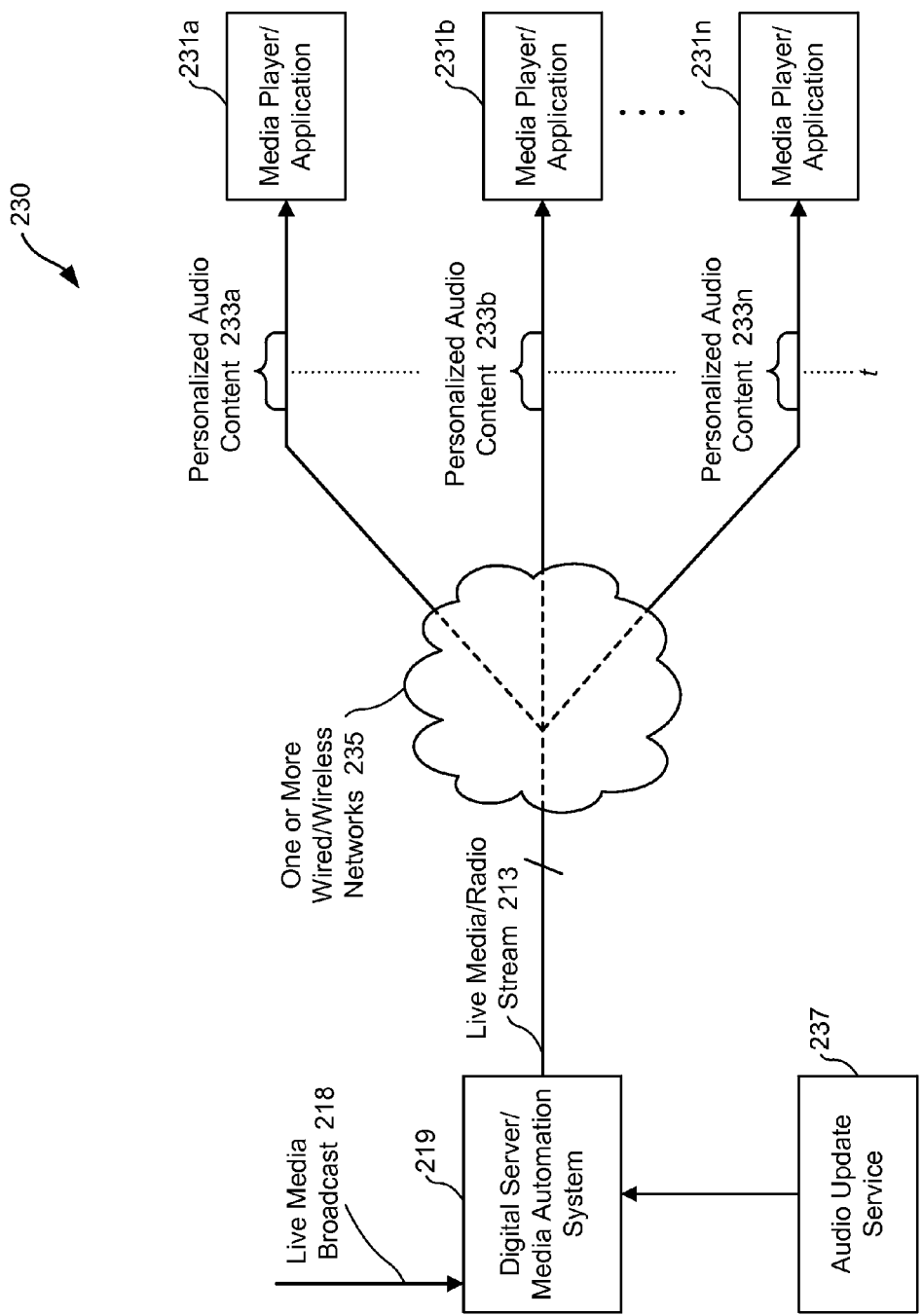
FIG. 26 depicts a media delivery platform providing a plurality of broadcast media streams having personalized audio content according to at least one embodiment of the present disclosure.

Referring next to FIG. 26, a media delivery platform 230 providing a plurality of broadcast media streams having personalized audio content will be discussed according to embodiments of the present disclosure. Media delivery platform 230 includes media automation system 219 that receives live media broadcast 218, inserts individually personalized content into spot blocks, and streams the live media broadcast in multiple streams to multiple media players 231a-231n via communications network 235. In at least one embodiment, each of the streams can include different individualized content provided by third party notification services with which the different consumers are associated, have subscribed, joined, or the like. Thus, a first consumer associated with media player 231b can receive personalized content 233b, which includes an audible calendar reminder inserted into the media stream, while a second consumer associated with media player 231a can receive personalized content 231a, which could include an audible social network notification that a friend has uploaded a new picture to the social network. In both examples, the two consumers can receive the same core content, but different personalized content. Also in both examples, the core content and the personalized content are both played out by the media player, and are presented to the consumers in the same medium, e.g. audio, as part of the same stream.

In at least some embodiments, personalized audio content 233a-233n is played out by media players 231a-231n during the same, or approximately the same, block of time. Thus, in some embodiments the consumers will each receive their notifications, if there are any, at substantially the same time, or approximately the same time. Furthermore, the personalized audio content 233a-233n can be inserted into spot blocks included in the individual streams that are coincident in time with spot blocks included in the live media broadcast from which the individual streams are derived. In some instances, personalized content 233a-233n may not be time aligned. In this way, core content in the live media stream is not interrupted for presentation of most notifications, although provisions can be made for emergency notifications that preempt core content in special circumstances.

Figure 27:
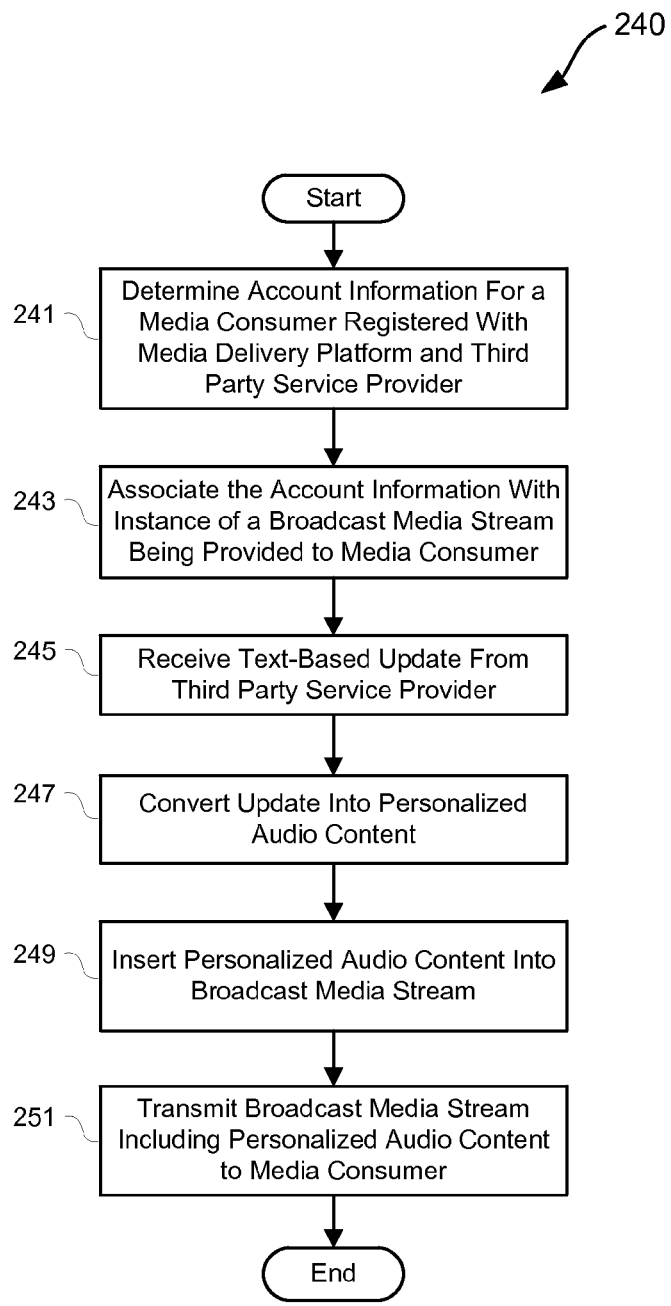
FIG. 27 depicts a method for inserting personalized audio content into a broadcast media stream in accordance with at least one embodiment of the present disclosure.

Referring now to FIG. 27, a method 240 of inserting personalized audio content into a broadcast media stream will be discussed in accordance with at least one embodiment of the present disclosure. Method 240 can be initiated by an indication that the user is capable of receiving a live stream. For example, method 240 can be initiated in response to a user logging into a media player/application or device such as a smart phone; by a user logging into a service, such as iHeart® radio; by a request from a device to change streams or stations, or in response to various other occurrences related to presentation of a live broadcast media stream.

As illustrated at block 241, account information can be determined for a media consumer registered with a media delivery platform and a third party service provider. As illustrated at block 243, the consumer's account information for the third party service provider and the media delivery platform can be associated with a live media broadcast stream being streamed to the consumer. Associating, or linking, the account information provides a way to identify which notifications are to be delivered to which media player as personalized media content. For example, when a consumer logs into a media streaming service, the fact that that user is also registered with a social networking service can be used to control insertions of notifications from that social network into the appropriate media stream.

As illustrated by block 245, a text-based notification or update associated with a particular consumer can be received from a third party service provider. The text-based notification associated with the consumer can be converted to audio content, as illustrated at block 247. As shown by block 249, the audio content, which can be an example of personalized media content, can be inserted into a spot block of a live media broadcast stream associated with that same consumer.

The personalized media content can be inserted by an ad server, by a media automation system, content delivery network, or by another device or system included in a media delivery platform. In some instances, the consumer's media player can be configured to detect tags within the stream, and send requests to the ad server for ads, filler, and/or personalize media content to be played out during the spot block.

Figure 28:
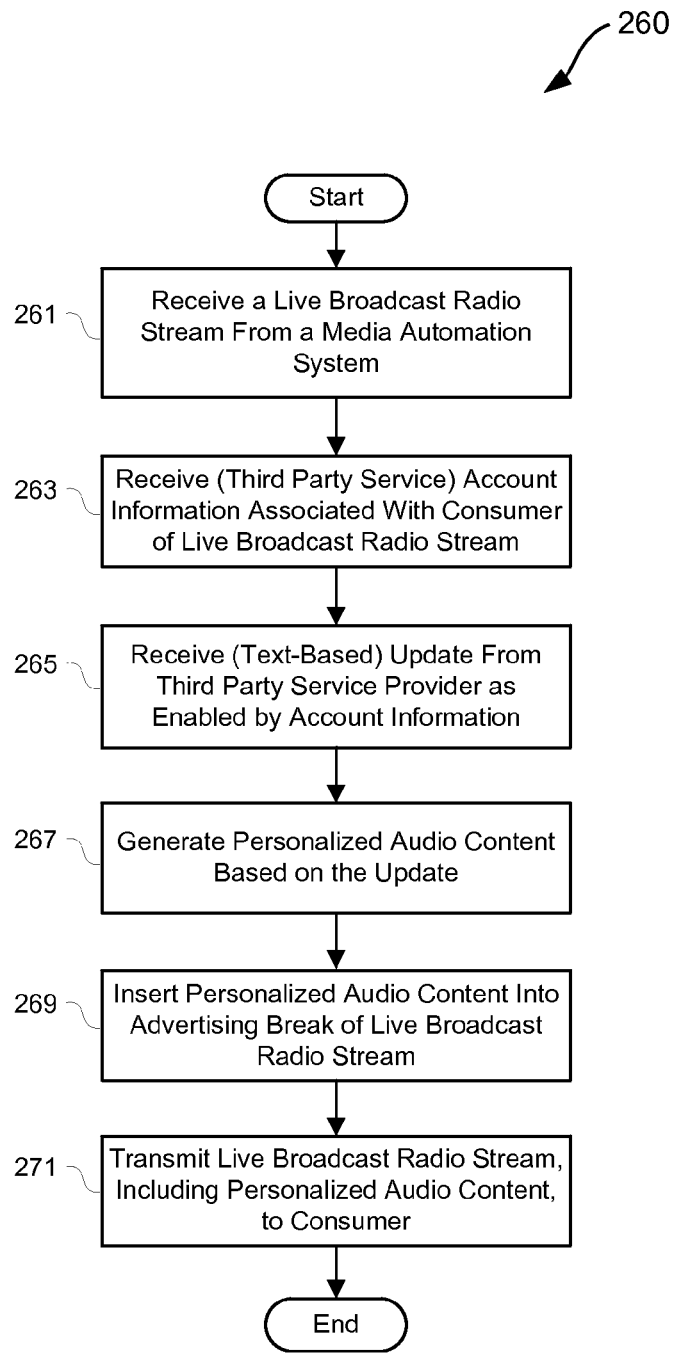
FIG. 28 depicts an exemplary method for inserting personalized audio content into a live broadcast radio stream from a media automation system in accordance with at least one embodiment of the present disclosure.

Referring now to FIG. 28, a method 260 for inserting personalized audio content into a live broadcast radio stream from a media automation system will be discussed in accordance with embodiments of the present disclosure.

As illustrated at block 261, an ad server or other device receives a live broadcast radio stream from a media automation system. As illustrated by block 263, the ad server or other device can receive account information associated with a consumer receiving the live broadcast radio stream. This account information can, in some embodiments, be provided by the consumer to the media automation system as part of a registration process. In some such embodiments, the account information can be transmitted to the ad server or other device or system as information embedded in the live broadcast radio stream. Other implementations deliver the information separately. If the account information is delivered to the ad server in advance, then a consumer identifier can be used to look up the previously provided account information.

As illustrated by block 265, a text-based notification or update can be received from the third party service provider, as enabled by the account information. The notification can be received directly from the third party service provider, from a proxy such as an update service 237, from a text-to-speech service, or can be forwarded from a consumer's device. For example, a consumer can set a preference in his smart phone that all text notifications related to a particular electronic assistant provider should be forwarded to an ad server for conversion and inclusion in a media stream.

As illustrated at block 267, personalized audio content can be generated from the text notification, and inserted into a spot break in a live broadcast radio stream, as illustrated at block 269. As illustrated by block 271, the live broadcast radio stream, including both core content and personalized media content, can be streamed to a consumer's media player.

Although the foregoing specific details describe certain embodiments of this invention, persons of ordinary skill in the art will recognize that various changes may be made in the details of this invention without departing from the spirit and scope of the invention as defined in the appended claims and considering the doctrine of equivalents. Therefore, it should be understood that this invention is not to be limited to the specific details shown and described herein.

What is claimed is:

1. A system comprising:
at least a first processing device including a processor and associated memory, the at least a first processing device programmed to implement a media automation system configured to transmit instances of a live media broadcast stream to a plurality of individual media consumer devices, wherein the instances of the live media broadcast stream are associated with particular consumer devices, and wherein the live media broadcast stream includes core content common to each of a plurality of different media streams, and a plurality of spot blocks interspersed through the live media broadcast stream for providing a plurality of natural breaks in the core content;
at least a second processing device including a processor and associated memory, the at least a second processing device programmed to implement an ad server configured to:
obtain first account information associated with a media delivery platform account of a first individual consumer;
obtain second account information associated with a consumer notification service account of the first individual consumer;
link the first account information and the second account information to generate linked information;
receive notifications from the consumer notification service, including specific information related to an individual media consumer device associated with the first individual consumer;
map the notifications received from the consumer notification service to the individual media consumer device based on the linked information;
convert the notifications to generate individually personalized audio content to be inserted into a media stream delivered to the individual media consumer device of the plurality of individual media consumer devices; and
transmit the individually personalized audio content to the media automation system; and
the media automation system further configured to receive and insert the individually personalized audio content into an available streaming spot block of a plurality of streaming spot blocks included in particular instances of the live media broadcast stream, wherein the particular instances of the live media broadcast stream are associated with the individual media consumer device, and wherein the plurality of streaming spot blocks included in the particular instances of the live media broadcast stream correspond to spot blocks in a live media broadcast.

2. The system of claim 1, wherein:
the plurality of streaming spot blocks each include an advertising spot block delineated by markers embedded in the instances of the live media broadcast stream;
the media automation system is further configured to:
detect the advertising spot block based on at least one of the markers;
in response to detecting the advertising spot block, request the ad server to provide customized content; and
the ad server is further configured to transmit to the media automation system, in response to the request, the customized content, wherein the customized content includes targeted advertisements and the individually personalized audio content.

3. The system of claim 1, wherein the media automation system is further configured to:
receive the second account information of the consumer notification service; and
transmit the second account information to the ad server.

4. The system of claim 3, wherein the ad server further includes:
a text-to-speech translation module configured to convert text-based notifications into the individually personalized audio content.

5. A method for use in a system including a plurality of processing devices, each processing device including a processor and associated memory, the method comprising:
at a first processing device configured to implement a media automation system:
transmitting instances of a media broadcast stream to a plurality of individual media consumer devices, wherein the instances of the media broadcast stream are associated with particular consumer devices, and wherein the media broadcast stream includes core content common to each of a plurality of different media streams, and a plurality of spot blocks interspersed through the media broadcast stream for providing a plurality of natural breaks in the core content;

at a second processing device programmed to implement an ad server:
  obtaining first account information associated with a media delivery platform account of a first individual consumer;
  obtaining second account information associated with a first consumer notification service account of the first individual consumer;
  linking the first account information and the second account information to generate linked information;
  receiving a first notification from the first consumer notification service account, including specific information related to an individual media consumer device associated with the first individual consumer;
  mapping the first notification received from the first consumer notification service account to the individual media consumer device based on the linked information;
  converting the first notification from the first consumer notification service account to generate first individually personalized audio content to be inserted into a media stream delivered to the individual media consumer device of the plurality of individual media consumer devices;
  transmitting the first individually personalized audio content to the media automation system; and at the first processing device:
  receiving and inserting the first individually personalized audio content into a first available spot block of a first media stream of the plurality of different media streams.

6. The method of claim 5, further comprising:
receiving a second notification from a second consumer notification service account;
converting the second notification from the second consumer notification service account to generate second individually personalized audio content; and
inserting the second individually personalized audio content into a second available spot block of a second media stream of the plurality of different media streams for playback by a second consumer device without interrupting the core content, wherein the second media stream is associated with a second individual consumer device.

7. The method of claim 6, wherein the first available spot block and the second available spot block are coincident in time.

8. The method of claim 5, further comprising:
inserting markers into the plurality of different media streams, the markers indicating placement of the plurality of spot blocks within the plurality of different media streams;
detecting, based on at least one of the markers, the first available spot block; and
inserting the first individually personalized audio content into at least a portion of the first available spot block.

9. The method of claim 5, further comprising:
inserting an advertisement selected specifically for the first individual consumer into a first portion of the first available spot block; and
inserting the first individually personalized audio content into a second portion of the first available spot block.

10. The method of claim 5, wherein the live media broadcast stream is an encoded live radio broadcast, and the first available spot block of the first media stream is coincident in time with another available one of the plurality of spot blocks in the streaming media broadcast.

11. The method of claim 5, wherein the first individually personalized audio content is converted from a text-based notification generated by a third party service configured to provide alerts tailored to preferences of the first individual consumer.

12. The method of claim 5, further comprising:
receiving a first text-based notification at an ad server;
converting, by the ad server, the first text-based notification to the first individually personalized audio content; and
transmitting the first individually personalized audio content from the ad server to a streaming server operable to insert the first individually personalized audio content into the first available spot block of the first media stream of the plurality of different media streams.

13. A media system comprising:
a first processing device including a processor and associated memory, the first processing device configured to transmit instances of a live media broadcast stream to a plurality of individual media consumer devices, wherein the instances of the live media broadcast stream are associated with particular consumer devices, and wherein the live media broadcast stream includes core content common to each of a plurality of different media streams, and a plurality of spot blocks interspersed through the live media broadcast stream for providing a plurality of natural breaks in the core content;
a second processing device including a processor and associated memory, the second processing device configured to:
  obtain first account information associated with a media delivery platform account of a first individual consumer;
  obtain second account information associated with a consumer notification service account of the first individual consumer;
  link the first account information and the second account information to generate linked information;
  receive notifications from the consumer notification service, including specific information related to an individual media consumer device associated with the first individual consumer;
  map the notifications received from the consumer notification service to the individual media consumer device based on the linked information;
  convert the notifications to generate individually personalized audio content to be inserted into a media stream delivered to the individual media consumer device of the plurality of individual media consumer devices; and
  transmit the individually personalized audio content to the first processing device; and
the first processing device further configured to:
  receive and insert the individually personalized audio content into an available streaming spot block of a plurality of streaming spot blocks included in particular instances of the live media broadcast stream, wherein the particular instances of the live media broadcast stream are associated with the individual media consumer device, and wherein the plurality of streaming spot blocks included in the particular instances of the live media broadcast stream correspond to spot blocks in a live media broadcast.

14. The media system of claim 13, wherein:
at least one of the first and second account information include information enabling receipt of-text-based notification service content.

15. The media system of claim 13, wherein the live broadcast media stream includes a live broadcast radio stream including at least one advertising spot block, the second processing device further configured to:
insert audio notification service content in the at least one advertising spot block.

16. The media system of claim 15, wherein the advertising spot block is delineated by markers embedded in the broadcast media stream, the second processing device further configured to:
detect the markers embedded in the broadcast media stream.

17. The media system of claim 15, the second processing device further configured to:
insert, in advance of the individually personalized audio content, an advertising lead-in.

18. The media system of claim 15, the second processing device further configured to:
buffer an advertisement included in the at least one advertising spot block of the live media broadcast stream; and
insert, at a location other than the advertising spot block, the buffered advertisement into the live media broadcast stream.

19. The media system of claim 13, wherein the individually personalized audio content includes a text-to-speech translation of a text-based notification.

20. The media system of claim 13, wherein the first processing device includes a cloud-based content distribution system coupled to an automotive application platform.

* * * * *